(12) United States Patent
Ishii et al.

(10) Patent No.: US 8,306,544 B2
(45) Date of Patent: Nov. 6, 2012

(54) BASE STATION APPARATUS AND COMMUNICATION CONTROL METHOD

(75) Inventors: Hiroyuki Ishii, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 546 days.

(21) Appl. No.: 12/528,805

(22) PCT Filed: Feb. 26, 2008

(86) PCT No.: PCT/JP2008/053316
§ 371 (c)(1),
(2), (4) Date: Nov. 9, 2009

(87) PCT Pub. No.: WO2008/105416
PCT Pub. Date: Sep. 4, 2008

(65) Prior Publication Data
US 2010/0113082 A1 May 6, 2010

(30) Foreign Application Priority Data

Mar. 1, 2007 (JP) .................. 2007-052115
Jun. 19, 2007 (JP) .................. 2007-161938
Dec. 20, 2007 (JP) .................. 2007-329024

(51) Int. Cl.
*H04W 72/00* (2009.01)
*H04W 4/00* (2009.01)
*H04B 7/00* (2006.01)

(52) U.S. Cl. ........ 455/450; 455/464; 455/509; 455/513; 370/329

(58) Field of Classification Search .................. 455/522, 455/69, 127.1, 68, 450, 464, 509, 513; 370/329, 370/332, 331
See application file for complete search history.

(56) References Cited

U.S. PATENT DOCUMENTS

| 7,848,295 | B2 * | 12/2010 | Kang et al. | 370/332 |
| 8,036,110 | B2 * | 10/2011 | Ishii et al. | 370/229 |
| 8,073,451 | B2 * | 12/2011 | Nobukiyo | 455/450 |
| 8,145,271 | B2 * | 3/2012 | Ishii | 455/561 |

(Continued)

FOREIGN PATENT DOCUMENTS

CN 1343427 A 4/2002

(Continued)

OTHER PUBLICATIONS

International Search Report w/translation from PCT/JP2008/053317 dated Apr. 22, 2008 (4 pages).

(Continued)

*Primary Examiner* — Tilahun B Gesesse
(74) *Attorney, Agent, or Firm* — Osha Liang LLP

(57) ABSTRACT

A disclosed base station apparatus includes a resource allocation unit allocating radio resources using a first resource allocation method for dynamically allocating the radio resources and a second resource allocation method for allocating the radio resources at a constant period, wherein when a size of data to be transmitted is equal to or greater than a first threshold value, the resource allocation unit allocates the radio resources using the first resource allocation method, otherwise, the resource allocation unit allocates the radio resources using the second resource allocation method, and when the size of the data to be transmitted is equal to or greater than a second threshold value, the resource allocation unit allocates radio resources reserved as radio resources to be allocated using the second resource allocation method as radio resources to be allocated using the first resource allocation method.

4 Claims, 15 Drawing Sheets

U.S. PATENT DOCUMENTS

| | | | | |
|---|---|---|---|---|
| 8,195,180 B2* | 6/2012 | Higuchi | | 455/450 |
| 2003/0139145 A1* | 7/2003 | Lee et al. | | 455/69 |

FOREIGN PATENT DOCUMENTS

| | | |
|---|---|---|
| EP | 1 865 733 A1 | 12/2007 |
| EP | 1 892 856 A1 | 2/2008 |
| JP | 2001-320411 A | 11/2001 |
| JP | 2002-78012 A | 3/2002 |
| JP | 2003-070055 A | 3/2003 |
| JP | 2003-134550 A | 5/2003 |
| JP | 2003-152630 A | 5/2003 |
| JP | 2004-147275 A | 5/2004 |
| JP | 2006-303699 A | 11/2006 |
| WO | 2006/109439 A1 | 10/2006 |
| WO | 2006/134984 A1 | 12/2006 |

OTHER PUBLICATIONS

Written Opinion from PCT/JP2008/053317 dated Apr. 22, 2008 (5 pages).
Patent Abstracts of Japan; Publication No. 2004-147275 dated May 20, 2004; Matsushita Electric Industrial Co., Ltd. (1 page).
Patent Abstracts of Japan; Publication No. 2003-152630 datd May 23, 2003; NTT DoCoMo, Inc. (1 page).
Patent Abstracts of Japan; Publication No. 2002-078012 dated Mar. 15, 2002; Matsushita Electric Industrial Co., Ltd. (1 page).
Patent Abstracts of Japan; Publication No. 2003-134550 dated May 9, 2003; Fujitsu Ltd. (1 page).
Patent Abstracts of Japan, Publication No. 2006-303699, dated Nov. 2, 2006, 1 page.
Patent Abstracts of Japan, Publication No. 2003-070055, dated Mar. 7, 2003, 1 page.
International Search Report w/translation from PCT/JP2008/053318, dated May 1, 2008 (9 pages).
Written Opinion from PCT/JP2008/053318 dated May 1, 2008 (5 pages).
International Search Report w/translation from PCT/JP2008/053319 (2 pages).
Written Opinion from PCT/JP2008/053319 dated May 1, 2008 (3 pages).
Chinese Office Action for Application No. 200880014422.7, mailed on Nov. 24, 2011 (7 pages).
Qualcomm Europe, "Scheduling of Measurements in LTE", 3GPP TSG-RAN2 Meeting #52, R2-060987, Athens, Greece, Mar. 27-31, 2006.
International Search Report w/translation from PCT/JP2008/053316 dated Apr. 22, 2008 (2 pages).
Written Opinion from PCT/JP2008/053316 dated Apr. 22, 2008 (3 pages).
Patent Abstracts of Japan; Publication No. 2001-320411 dated Nov. 16, 2001; Mitsubishi Electric Corp. (1 page).
3GPP TR 25.814 V7.0.0; "Physical Layer Aspects for Evolved Universal Terrestrial Radio Access (UTRA)"; Jun. 2006 (126 pages).

* cited by examiner

FIG.6

DL TF Related Table (for CQI=1)

| Number of PB | DL_Table_TF_SIZE | DL_Table_TF_Mod |
|---|---|---|
| 1 | | QPSK |
| 2 | | QPSK |
| 3 | | QPSK |
| 4 | | QPSK |
| 5 | | QPSK |
| 6 | | QPSK |
| : | | |
| 100 | | |

BASE STATION APPARATUS AND COMMUNICATION CONTROL METHOD

TECHNICAL FIELD

The present invention generally relates to a mobile communication system employing an Orthogonal Frequency Division Multiplexing (OFDM) scheme, and more particularly to a base station apparatus and a communication control method to be used in the same system.

BACKGROUND ART

As a next-generation system of the W-CDMA (Wideband Code Division Multiple Access) and the HSDPA (High Speed Downlink Packet Access), an LTE system has been studied by 3GPP ($3^{rd}$ Generation Partnership Project) which is a standards body of the W-CDMA. In the LTE system as a radio access system, an OFDM (Orthogonal Frequency Division Multiplexing) scheme and an SC-FDMA (Single-Carrier Frequency Division Multiple Access) scheme have been studied to be applied to the downlink communications system and the uplink communications system, respectively (see, for example, Non Patent Document 1).

In the OFDM scheme, a frequency band is divided into plural sub-carriers having narrower frequency bands, and data are transmitted on each sub sub-carrier and the sub-carriers are closely arranged so as not to interfere with each other, so that fast data transmission can be achieved and an efficiency use of the frequency band can be improved.

In the SC-FDMA scheme, a frequency band is divided in a manner so that different frequencies can be separately used among plural terminals (user equipment terminals) and as a result, interferences between terminals can be reduced. Further, in the SC-FDMA scheme, a range of transmission power fluctuation can be made smaller; therefore lower energy consumption of terminals can be achieved and a wider coverage area can be obtained.

The LTE system is a communication system using shared channels in both downlink and uplink. For example, in downlink, a base station apparatus selects a mobile station (user equipment terminal) to communicate using the shared channel with respect to each sub-frame (each 1 ms) and transmits the shared channel to the selected mobile station. In this case, a process of selecting the mobile station to communicate as described above is called a scheduling process.

Further, in the LTE system, so-called Adaptive Modulation and Coding (AMC) is applied; therefore, transmission formats of the shared channels may vary among different sub-frames. Herein, the transmission format includes various information items indicating such as allocation information of the resource blocks which are frequency resources, modulation scheme, payload size, HARQ (Hybrid Automatic Repeat reQuest) information such as a Redundancy version parameter, a process number and the like, the number of streams, and a Pre-coding vector.

In the LTE system, identification information identifying the mobile station that communicates by using the shared channel in the sub-frame and the transmission format of the downlink shared channel are reported using Downlink Scheduling Information to be mapped to a Physical Downlink Control Channel (PDCCH). The Physical Downlink Control Channel (PDCCH) may also be called a DL L1/L2 Control Channel.

Non Patent Document 1: 3GPP TR 25.814 (V7.0.0), "Physical layer Aspects for Evolved UTRA," June 2006

DISCLOSURE OF INVENTION

Problems to be Solved by the Invention

When the scheduling process or a process of determining the transmission format is not adequately controlled, the transmission characteristics or radio capacity of the system may be impaired.

Further, all the user equipment terminals being connected are treated as targets of the scheduling; therefore, effective scheduling may not be feasible.

The present invention is made in light of the problems and may provide a base station apparatus and a communication control method capable of, in LTE downlink, adequately performing the scheduling process and the determination process of the transmission formats in the AMC (Adaptive Modulation and Coding) scheme.

Means for Solving the Problems

According to an aspect of the present invention, there is provided a base station apparatus capable of communicating with a user equipment terminal using a downlink shared channel. The base station apparatus includes a resource allocation unit allocating radio resources using a first resource allocation method for dynamically allocating the radio resources and a second resource allocation method for allocating the radio resources at a constant period, wherein when a size of data to be transmitted is equal to or greater than a threshold value, the resource allocation unit allocates the radio resources using the first resource allocation method, when the size of the data to be transmitted is less than the threshold value, the resource allocation unit allocates the radio resources using the second resource allocation method, and when the size of the data to be transmitted is equal to or greater than a threshold value, the resource allocation unit allocates radio resources reserved as radio resources to be allocated using the second resource allocation method as radio resources to be allocated using the first resource allocation method.

According to another aspect of the present invention, there is provided a base station apparatus capable of communicating with a user equipment terminal using a downlink shared channel. The base station apparatus includes a resource allocation unit configured to allocate radio resources using a first resource allocation method for dynamically allocating the radio resources and a second resource allocation method for allocating the radio resources at a constant period, wherein in a case where a size of data to be transmitted is equal to or greater than a predetermined threshold value at a timing when resource allocation using the second resource allocation method is not performed or in a case where there are data to be retransmitted at a timing when resource allocation using the second resource allocation method is not performed, the resource allocation unit assumes that there are data to be transmitted using the first resource allocation method, and in a case where the size of the data to be transmitted is less than the predetermined threshold value and there are no retransmittable data, the resource allocation unit assumes that there are no data to be transmitted using the first resource allocation method.

According to another spect of the present invention, there is provided a communication control method of allocating radio resources using a first resource allocation method for dynamically allocating the radio resources and a second resource allocation method for allocating the radio resources at a constant period, the method being used in a base station apparatus capable of communicating with a user equipment terminal using a downlink shared channel. The method includes a first radio resource allocating step of, when a size of data to be transmitted is equal to or greater than a threshold value, allocating the radio resources using the first resource allocation method;

a second radio resource allocating step of, when the size of the data to be transmitted is less than the threshold value, allocating the radio resources using the second resource allocation method; and a third radio resource allocating step of, when the size of the data to be transmitted is equal to or greater than a threshold value, allocating radio resources reserved as radio resources to be allocated using the second resource allocation method as radio resources to be allocated using the first resource allocation method.

According to another aspect of the present invention, there is provided a communication control method used in a base station apparatus capable of communicating with a user equipment terminal using a downlink shared channel. The method includes a selection step of selecting a user equipment terminal to which a shared channel is to be allocated from among user equipment terminals other than:

a user equipment terminal in which a time frame to transmit the shared channel or a time frame to receive acknowledgement information with respect to the shared channel overlaps with a time interval to measure cells operating at a different frequency, a user equipment terminal in sleep mode of discontinuous reception mode, a user equipment terminal which is out of synchronization, a user equipment terminal that has not received radio quality information, and a user equipment terminal having no data to be transmitted; and a transmission step of transmitting the shared channel to the user equipment terminal selected in the selection step.

ADVANTAGEOUS EFFECT OF THE INVENTION

According to an embodiment of the present invention, there may be provided a base station apparatus and a communication control method capable of, in LTE downlink, adequately performing the scheduling process and the determination process of the transmission formats in the AMC.

BRIEF DESCRIPTION OF THE DRAWINGS

FIG. 6 shows a DL TF Related Table;

Figure 1:
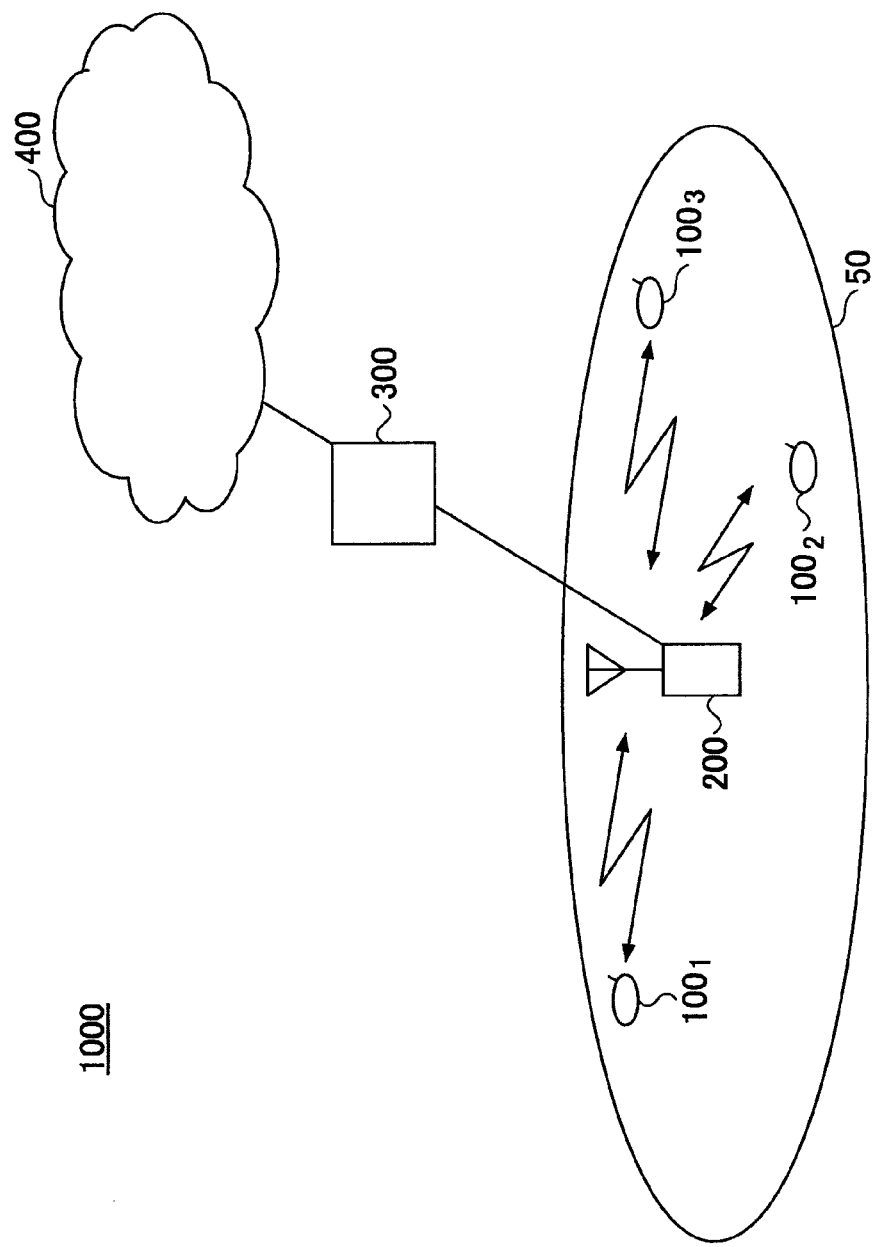
FIG. 1 is a schematic diagram showing a configuration of a radio communication system according to an embodiment of the present invention.

EXPLANATION OF REFERENCES $100_1$, $100_2$, $100_3$, $100_n$: USER EQUIPMENT TERMINAL(S)
104: AMPLIFIER
106: TRANSMISSION/RECEIVING SECTION
108: BASEBAND SIGNAL PROCESSING SECTION
110: APPLICATION SECTION
200: BASE STATION APPARATUS
202: MBMS SUBFRAME DETECTION SECTION
204: PCH RACH RESPONSE DETECTION SECTION
206: SCHEDULING COEFFICIENT CALCULATION SECTION
208: MULTIPLEXED UE NUMBER COUNTING SECTION
210: TRANSPORT FORMAT/RESOURCE BLOCK SELECTION SECTION
252: LAYER 1 PROCESSING SECTION
254: USER EQUIPMENT STATUS MANAGEMENT SECTION
256: SCHEDULING COEFFICIENT CALCULATION SECTION
258: UE SELECTION SECTION
260: MAC CONTROL SIGNAL GENERATION SECTION
262: COMMON CH/MCH RESOURCE MANAGEMENT SECTION
264: FREQUENCY RESOURCE MANAGEMENT SECTION
266: PERSISTENT RESOURCE MANAGEMENT SECTION
268: TFR SELECTION SECTION
270 ($270_1$, $270_2$, ..., $270_n$): HARQ CONTROL SECTION
272: RLC/PDCP PROCESSING SECTION
$2721_{n,k}$: RLC BUF

300: ACCESS GATEWAY APPARATUS
400: CORE NETWORK

BEST MODE FOR CARRYING OUT THE INVENTION

Next, a best mode for carrying out the present invention is described based on the embodiments described below with reference to the accompanying drawings.

Throughout the figures for illustrating the embodiments of the present invention, the same reference numerals are used for the same or equivalent elements and the repeated descriptions thereof may be omitted.

First, a radio communication system having a base station apparatus according to an embodiment of the present invention is described with reference to FIG. 1.

First Embodiment

As shown in FIG. 1, the radio communication system 1000, which may be an Evolved UTRA (Universal Terrestrial Radio Access) and UTRAN (UTRA Network) system (a.k.a an LTE (Long Term Evolution) system or a super 3G system), includes a base station apparatus (eNB: eNode B) 200 and plural user equipment (UE) 100 ($100_1$, $100_2$, $100_3$, ... $100_n$; n: an integer greater than zero (0)) (hereinafter, the user equipment (UE) may be referred to as a user equipment terminal(s)). The base station apparatus 200 is connected to an upper node station such as an access gateway apparatus 300. The access gateway apparatus 300 is connected to a core network 400. In this case, the user equipment (UE) terminals $100_n$ are in communication with the base station apparatus 200 in a cell 50 based on the Evolved UTRA and UTRAN radio communication scheme.

Each of the user equipment terminals ($100_1$, $100_2$, $100_3$, ... $100_n$) has the same configuration, functions, and status. Therefore, unless otherwise described, the term user equipment (UE) $100_n$ may be collectively used in the following descriptions.

As the radio access scheme in the radio communication system 1000, the OFDM (Orthogonal Frequency Division Multiplexing) scheme and the SC-FDMA (Single-Carrier Frequency Division Multiplexing Access) scheme are used in downlink and uplink communications, respectively. As described above, the OFDM scheme is a multi-carrier transmission scheme in which a frequency band is divided into plural sub-carriers having narrow frequency bands and data are mapped on each sub-carrier to be transmitted. The SC-FDMA scheme is a single-carrier transmission scheme in which a frequency band is divided so that different frequencies can be used among plural terminals and as a result, interferences between terminals can be reduced.

Next, communication channels used in the Evolved UTRA and UTRAN radio communication scheme are described.

In downlink communications, a Physical Downlink Shared Channel (PDSCH) that is shared among the user equipment terminals $100_n$ and a Physical Downlink Control Channel (PDCCH) are used. In downlink, user information and transport format information of a Downlink Shared Channel, the user information and the transport information of an Uplink Shared Channel, acknowledgement information of the Uplink Shared Channel and the like are reported via the Physical Downlink Control Channel (PDCCH). User data are transmitted via the Physical Downlink Shared Channel (PDSCH). The user data are transmitted via a Downlink Shared Channel (DL-SCH) as a transport channel.

In uplink communication, a Physical Uplink Shared Channel (PUSCH) that is shared among user equipment terminals $100_n$ and an LTE control channel are used. The LTE control channel has two types, one is to be time-domain multiplexed with the Physical Uplink Shared Channel (PUSCH) and the other is to be frequency-domain multiplexed with the Physical Uplink Shared Channel (PUSCH). The control channel to be frequency-domain multiplexed with the Physical Uplink Shared Channel (PUSCH) is called a Physical Uplink Control Channel (PUCCH).

In uplink communication, a downlink Channel Quality Indicator (CQI) to be used for scheduling in downlink and an Adaptive Modulation and Coding (AMC) and acknowledgement information of the Downlink Shared Channel (HARQ (Hybrid Automatic Repeat reQuest) ACK information) are transmitted via the LTE control channel. Further, the user data are transmitted via the Physical Uplink Shared Channel (PUSCH). The user data are transmitted via an Uplink Shared Channel (UL-SCH) as a transport channel.

Next, a Downlink MAC (DL MAC) data transmission procedure as a communication control method performed in a base station apparatus according an embodiment of the present invention is described.

In this embodiment, a logical channel corresponds to, for example, a Radio bearer; and a Priority class corresponds to, for example, a priority level.

Next, an allocation unit of the transmission bandwidth of the Physical Downlink Shared Channel (PDSCH) is described. The allocation of the Physical Downlink Shared Channel (PDSCH) is performed with respect to each sub-frame by treating, for example, a Resource block group (hereinafter may be referred to as RB group) as a unit, the RB group being defined as a system parameter. Each RB group includes plural Resource Blocks (RBs), and a corresponding relationship between the RBs and the RB group is set as a system parameter via an external input interface (I/F). The allocation of the transmission bandwidth by treating the RB group as a unit is also performed on the Physical Downlink Shared Channel (PDSCH) to which Persistent scheduling is applied. In the following, a case is described where the RB group is configured. However, without configuring the RB block, the allocation of the Physical Downlink Shared Channel (PDSCH) may be performed by treating the resource block as a unit.

Further, in the descriptions below, a dynamic scheduling corresponds to a first resource allocation method of dynamically allocating radio resources. When the dynamic scheduling is applied to the Downlink Shared Channel (DL-SCH), radio resources are allocated to arbitrary sub-frames with respect to the user equipment (UE). Further, in this case, various values may be set as the values of the transmission format including the allocation information of the resource blocks as frequency resources, modulation scheme, payload size, HARQ information items, such as a Redundancy version parameter, a process number and the like, and information items of an MIMO and the like.

On the other hand, the Persistent scheduling is a scheduling method of allocating transmission opportunities at a predetermined cycle in accordance with a type of data or features of the application to transmit/receive data and corresponds to a second resource allocation method of allocating radio resources at the predetermined cycle. Namely when the Persistent scheduling is applied to the Downlink Shared Channel (DL-SCH), the Downlink Shared Channel (DL-SCH) is transmitted using predetermined sub-frames with respect to the user equipment (UE). Further, in this case, predetermined values are set as the values of the transmission format including the allocation information of the resource blocks as frequency resources, modulation scheme, payload size, HARQ information items, such as the Redundancy version parameter, the process number and the like, and the information items of the MIMO and the like. Namely, the shared channel (radio resource) is allocated to the predetermined sub-frames, and the Downlink Shared Channel (DL-SCH) is transmitted using the predetermined transmission format. In this case, the predetermined sub-frames may be arranged, for example, at a predetermined cycle. Further, the predetermined transmission format is not necessarily fixed to one type, and so, plural types of transmission formats may be provided.

Figure 2:
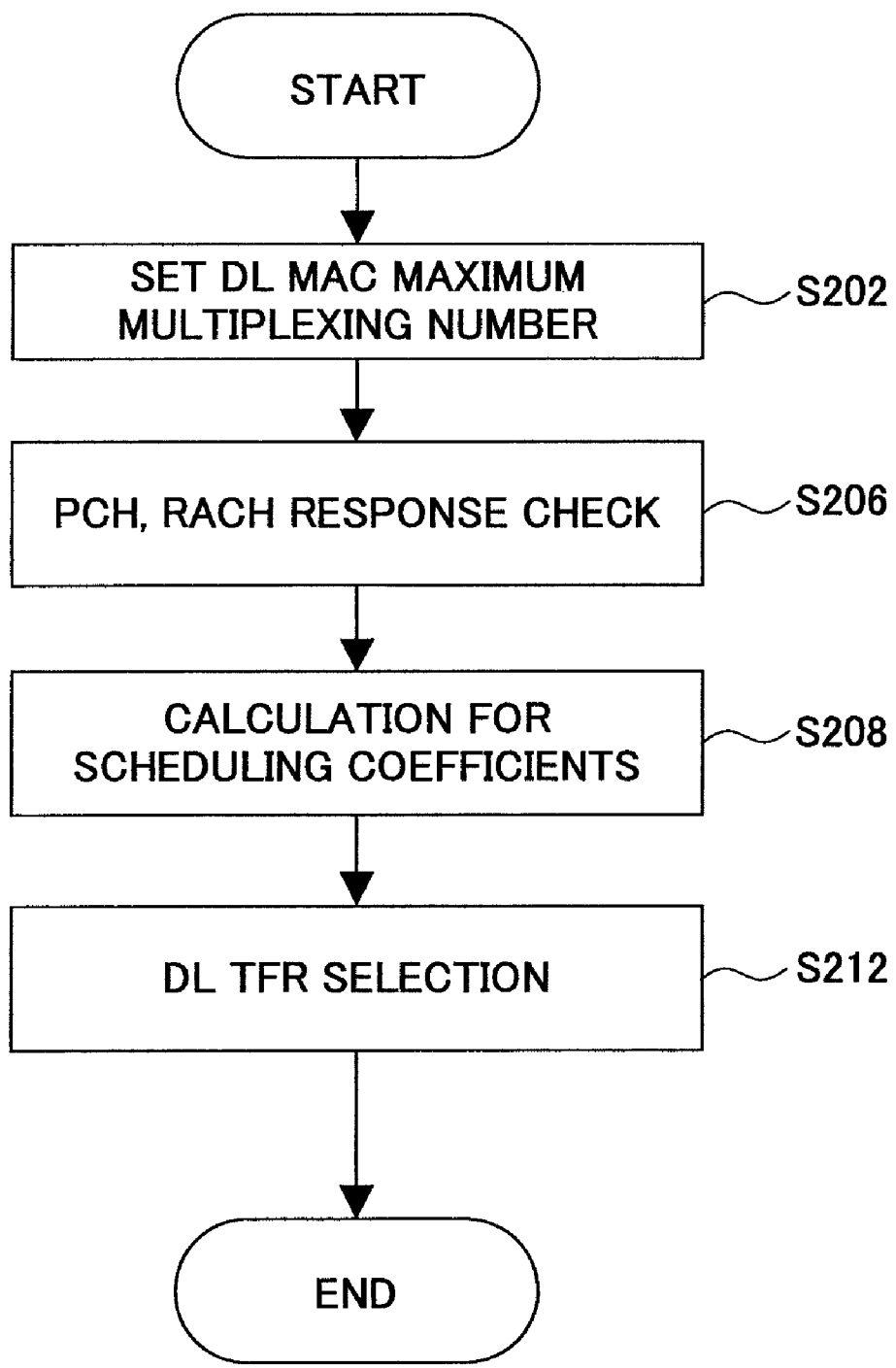
FIG. 2 is a flowchart showing a process of a DL MAC data transmission according to an embodiment of the present invention.

Next, a downlink MAC data transmission procedure is described with reference to FIG. 2. FIG. 2 shows a procedure, starting from a scheduling process performed by calculating scheduling coefficients, to a DL TFR selection process of determining the transport format and the RB group to be allocated.

As shown in FIG. 2, in step S202, a DL MAC maximum multiplexing number $N_{DLMAX}$ is set in the base station apparatus 200. The DL MAC maximum multiplexing number $N_{DLMAX}$ is the maximum multiplexing number in one sub-frame of the Downlink Shared Channel (DL-SCH) to which the Dynamic Scheduling is applied and is designated via the external input interface (I/F).

Next, in step S206, the base station apparatus 200 counts a PCH (Paging Channel) number and an RACH (Random Access Channel) response number in the sub-frame and defines the numbers as $N_{PCH}$ and $N_{RACHres}$, respectively. In this case, instead of using actual PCH number and RACH response number, the number of Downlink Scheduling Information for the PCH and the number of Downlink Scheduling Information for the RACH response may be calculated as the PCH number and the RACH response number, respectively.

Next, in step S208, calculation of scheduling coefficients is performed in the base station apparatus 200. The user equipment (UE) terminals in which radio resources are allocated based on the Dynamic scheduling in the sub-frame are selected. The number of user equipment (UE) terminals in which the radio resources are allocated based on the Dynamic scheduling in the sub-frame is defined as $N_{DL-SCH}$.

In step S212, a Downlink Transport format and Resource selection (DL TFR) is performed. Namely transmission formats are determined and the radio resources area allocated with respect to each of a Synchronization signal (also called a Synchronization Channel (SCH)), a Broadcast Channel (BCH), a Paging Channel (PCH), a Random Access Channel (RACH) response (RACH response, or message2 in random access procedure), the Downlink Shared Channel (DL-SCH) to which the Persistent Scheduling is applied, and the Downlink Shared Channel (DL-SCH) to which the Dynamic Scheduling is applied.

Next, the Calculation for Scheduling coefficients performed in step S208 is described with reference to FIG. 3.

Figure 3:
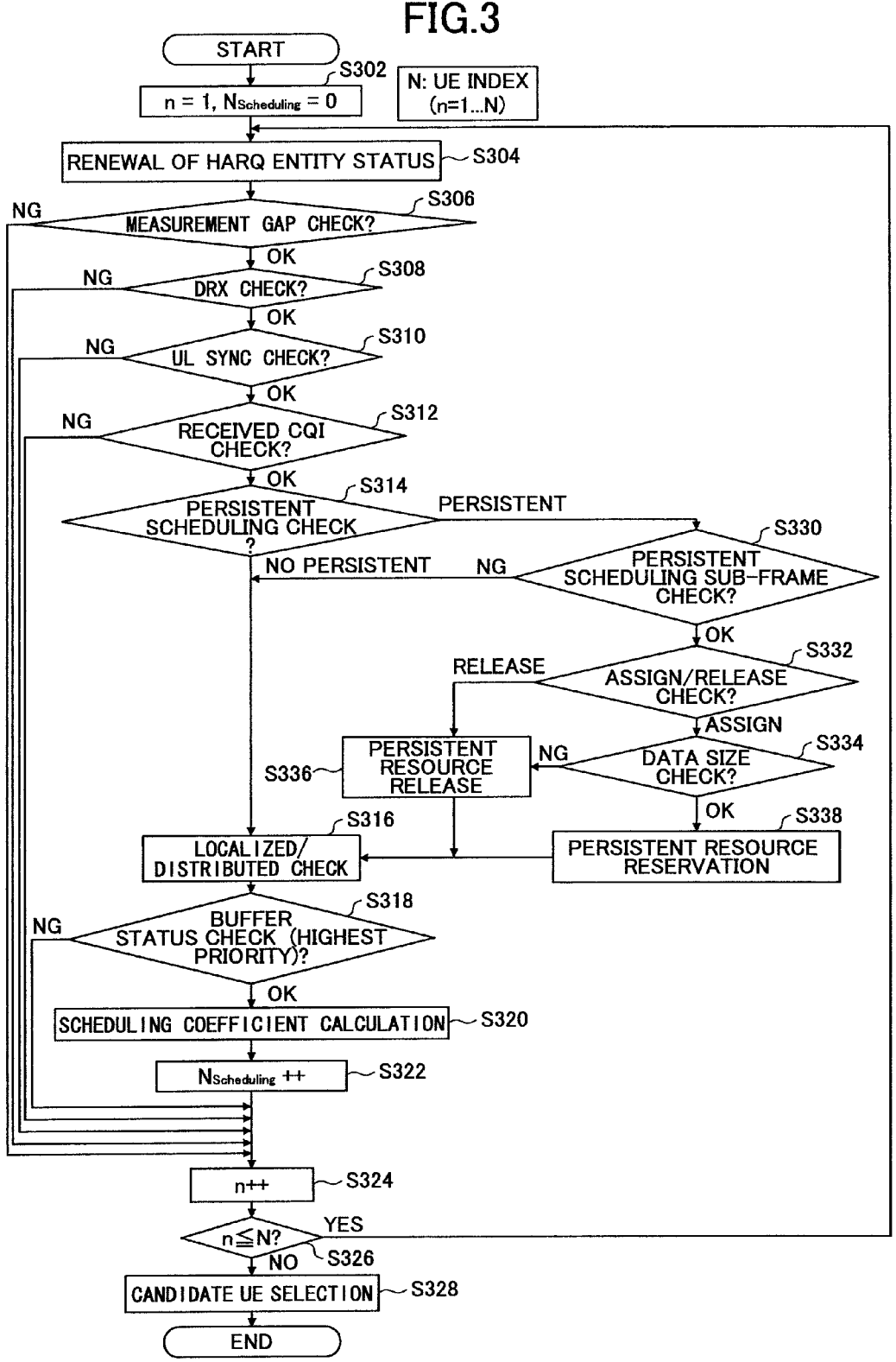
FIG. 3 is a flowchart showing process of scheduling coefficient calculation and candidate UE selection according to an embodiment of the present invention.

FIG. 3 shows a process of selecting the user equipment (UE) terminal(s) in which radio resources are allocated based on the Dynamic scheduling by calculating the Scheduling coefficients. The base station apparatus 200 performs the following processes with respect to all the user equipment (UE) terminals in an LTE active state including, for example, in an RRC (Radio Resource Control) connecting state.

As shown in FIG. 3, in step S302, formulas of n=1 and $N_{scheduling}$=0 are provided; where n denotes an index of the user equipment terminals $100_n$ and n=1, ..., N (N is an integer greater than 0).

Next, in step S304, Renewal of HARQ (Hybrid Automatic Repeat reQuest) Entity Status is performed. In this step, in the user equipment (UE), a process receiving ACK as the acknowledgement information with respect to the Downlink Shared Channel (DL-SCH) is released. Further, a process in which the maximum number of retransmissions has been reached is also released and the user data in the process are discarded. The maximum number of retransmissions is set with respect to each Priority class via the external input interface (I/F). Further, it is assumed that the maximum number of retransmissions of MAC PDU (Protocol Data Unit), with which plural logical channels are multiplexed, complies with the maximum number of retransmissions of a logical channel having the highest Priority Class.

Next, in step S306, a Measurement Gap Check is performed. More specifically, it is determined whether the sub-frame (i.e., the sub-frame transmitting the Downlink Shared Channel (DL-SCH)) is included in the Measurement Gap or whether the sub-frame receiving the acknowledgement information (ACK/NACK) with respect to the Downlink Shared Channel (DL-SCH) is included in the Measurement Gap. When determining that the sub-frame is included in the Measurement Gap or that the sub-frame receiving the acknowledgement information (ACK/NACK) is included in the Measurement Gap, an NG (signal) is returned, otherwise, an OK (signal) is returned. The Measurement Gap refers to a time interval when cells operating at a different frequency are measured for a different-frequency handover of the user equipment (UE), and during the time interval, communications cannot be performed and therefore, the user equipment (UE) cannot receive the Downlink Shared Channel (DL-SCH). Further, during the time period when measuring the cells operating at a different frequency, the user equipment (UE) cannot transmit the acknowledgement information (ACK/NACK). As a result, the base station apparatus 200 cannot receive the acknowledgement information (ACK/NACK). Accordingly, when a result of the Measurement Gap Check is NG (NG in step S306), the user equipment (UE) terminal is excluded from a target of the scheduling process.

In this case, the cell operating at a different frequency may be a cell of the Evolved UTRA and UTRAN system or a cell of another system such as, for example, GSM, WCDMA, TDD-CDMA, CDMA 2000, or WiMAX system.

Next, in step S308, a discontinuous reception (DRX) is checked. Namely it is determined whether the user equipment (UE) is in DRX (Discontinuous Reception) mode. When determining that the user equipment (UE) is in DRX mode, it is further determined whether the sub-frame is included in a DRX reception timing. When determining that the user equipment (UE) is in DRX (Discontinuous Reception) mode and the sub-frame is not included in the DRX reception timing, the "NG" is returned, otherwise the "OK" is returned. Namely when determining that the user equipment (UE) is not in DRX mode or that the user equipment (UE) is in DRX mode and the sub-frame is included in the DRX reception timing, the OK is returned. Further, in a case of not being in DRX mode, a value of flag described below is set to 0 (zero); and in a case of being in DRX mode and in DRX reception timing, the value of $flag_{DRX}$ is set to 1 (one). Herein, the DRX reception timing refers to a timing when data can be received during in DRX mode. Further, when a state is in DRX mode and not in the DRX reception timing, the state corresponds to a sleep mode.

When a result of the DRX check is NG (NG in step S308), the user equipment is excluded from a target of the scheduling process.

Next, in step S310, an Uplink Synchronization Check (UL Sync Check) is performed. More specifically, it is determined whether the uplink synchronization state of the user equipment (UE) is classified as "Synchronization loss Type B". When determining that the uplink synchronization state is Synchronization loss Type B, the NG is returned, and when determining that the uplink synchronization state is not Synchronization loss Type B, the OK is returned.

When a result of the UL Sync Check is NG (NG in step S310), the user equipment is excluded from a target of the scheduling process. Further, when the uplink synchronization state of the user equipment (UE) is classified as "Synchronization loss Type A", the user equipment is not excluded from a target of the scheduling process.

The base station apparatus (eNB) 200 performs the following two kinds of detections (determinations) for the uplink synchronization state with respect to all the user equipment terminals 100$_n$ in RRC_connected state.

First, the base station apparatus (eNB) 200 performs Power detection of a Sounding RS (Reference signal) of the user equipment (UE) within a range of Window 1 determined by taking the cell radius into consideration and having a similar size of a Window to wait for a RACH preamble. Namely when a metric used in the Power detection of the user equipment exceeds a predetermined threshold value, it is determined as Power detection OK, otherwise, it is determined as Power detection NG. Further, a reflection time (which is a time period required to determine OK or NG) in this detection is typically in a range from 200 ms to 1,000 ms in a state while the Sounding RS is continuously received.

Second, the base station apparatus (eNB) 200 performs FFT timing detection to detect whether a signal of the user equipment (UE) is included within a range of Window 2 defined based on an FFT timing and a CP (Cyclic Prefix) length. Therefore, when the signal of the user equipment (UE) is included in the Window 2, it is determined as FFT timing detection OK, and when there is no main path of the user equipment (UE), it is determined as FFT timing detection NG. Further, the reflection time (which is a time period required to determine OK or NG) in this detection is typically in a range from 1 ms to 200 ms in a state while the Sounding RS is continuously received.

The "Synchronization loss Type A" refers to a Synchronization state of the user equipment (UE) in which the result of Power detection is determined as OK and the result of FFT timing detection is determined as NG. On the other hand, the "Synchronization loss Type B" refers to a Synchronization state of the user equipment (UE) in which the result of Power detection is determined as NG and the result of FFT timing detection is determined as NG.

Next, in step S312, a Received CQI (Channel Quality Indicator) Check is performed. More specifically, the base station apparatus (eNB) 200 determines whether CQI across the system bandwidth is received from the user equipment (UE). In a case where the CQI across the system bandwidth is received in the sub-frame or in a sub-frame preceding the sub-frame and the CQI across the system bandwidth is determined as OK at least one time according to a CQI reliability determination result, the OK is returned, otherwise, the NG is returned. The CQI reliability determination may be performed by, for example, calculating an SIR (Signal-interference Ratio) of the received signal of the CQI and determining the reliability of the CQI based on the calculated SIR. In this case, for example, when the SIR is less than a predetermined threshold value, the reliability of the CQI is determined as NG, and when the SIR is equal to or greater than the predetermined threshold value, the reliability of the CQI is determined as OK.

When a result of the Received CQI Check is NG (NG in step S312), the user equipment is excluded from a target of the scheduling process. Further, in a case where the result of the Received CQI Check is NG, even when the user equipment (UE) has a logical channel to which Persistent Scheduling is applied, the user equipment is excluded from a target of the scheduling process. Further, in this case, when a Persistent Resource allocated to the user equipment (UE) is included (allocated) in the sub-frame, the Persistent Resource is released. Herein, the Persistent Resource refers to a Resource block reserved for the Persistent Scheduling.

Next, in step S314, a Persistent Scheduling Check is performed. The Persistent scheduling is a scheduling method of allocating transmission opportunities at a predetermined cycle in accordance with a type of data or features of the application to transmit/receive data. Further, the type of data may include data of Voice Over IP, Streaming data or the like. The Voice Over IP and the Streaming data correspond to the applications.

In step S314, it is determined whether the user equipment (UE) has a logical channel to which Persistent Scheduling is applied. When determining that the user equipment (UE) has a logical channel to which Persistent Scheduling is applied, the process goes to step S330 in which a Persistent scheduled Sub-frame Check is performed. Otherwise, the process goes to step S316 in which a Localized/Distributed Check is performed. In localized (transmission), it may be advantageous to allocate relatively consecutive frequency blocks (resource blocks) based on CQI because a fading frequency in a propagation environment between the user equipment (UE) and the base station apparatus 200 is (relatively) small. On the other hand, in Distributed (transmission), it may be advantageous to allocate frequency blocks (resource blocks) which are relatively discretely distributed (separated) from each other regardless of the CQI values because the fading frequency in a propagation environment between the user equipment (UE) and the base station apparatus 200 is (relatively) large.

In step S330, it is determined in the sub-frame whether the Persistent resource is allocated to a logical channel to which Persistent scheduling is applied, the user equipment (UE) having the logical channel. When determining that the Persistent resource is allocated to the logical channel (OK in step S330), the process goes to step S332 in which an Assign/Release Check is performed. When determining that the Persistent resource is not allocated to the logical channel (NG in step S330), the process goes to step S316 in which the Localized/Distributed Check is performed.

In step S332, it is determined whether there are transmittable data in the logical channel of the user equipment (UE), the Persistent scheduling being applied to the logical channel. Namely the base station apparatus 200 determines in a data buffer whether there are transmittable data of the logical channel to which Persistent scheduling is applied. When determining that there are transmittable data (Assign in step S332), the process goes to step S334 in which a Data Size Check is performed. On the other hand, when determining that there are no transmittable data, the process goes to step S336 in which a Persistent resource Release process is performed.

In step S334, it is determined whether a size of the transmittable data of the logical channel of the user equipment is equal to or greater than a threshold value Threshold$_{data\_size}$, the Persistent scheduling being applied to the logical channel. When determining that the size of the transmittable data is equal to or greater than the threshold value Threshold$_{data\_size}$ (NG in step S334), the process goes to step S336 in which the Persistent Resource Release process is performed. On the other hand, when determining that the size of the transmittable data is less than the threshold value Threshold$_{data\_size}$ (OK in step S334), the process goes to step S338 in which a Persistent Resource Reservation process is performed.

In step S338, the Persistent Resource to be allocated to the logical channel of the user equipment (UE) is reserved, the Persist scheduling being applied to the logical channel. Further, the calculation of the scheduling coefficients described below is also performed with respect to the user equipment (UE) to which the Persistent Resource is applied in the sub-frame. Further, when the radio resources are allocated to the logical channel to which the Dynamic Scheduling is applied in the sub-frame, the logical channel to which the Persistent scheduling is applied and the logical channel to which the Dynamic scheduling is applied are multiplexed and the MAC PDU (DL-SCH) is transmitted.

In step S336, the Persistent Resource to be allocated to the logical channel of the user equipment (UE) is released, the Persistent scheduling being applied to the logical channel. In this case, it is assumed that the Persistent Resource is released with respect to the sub-frame only, and in the timing when the next Persistent Resource is allocated, the Assign/Release Check is newly performed.

In step S316, the downlink transmission type of the user equipment (UE), i.e., whether Localized (transmission) type or Distributed (transmission) type, is determined. The transmission type may be independently controlled (managed) between Downlink communications and Uplink communications.

For example, when the CQI across the system bandwidth of the user equipment (UE) is equal to or greater than a threshold value "$Threshold_{CQI}$" and an Fd estimation value is equal to or less than a threshold value "$Threshold_{Fd,DL}$", the Localized transmission is determined. Otherwise, the Distributed transmission is determined.

As the Fd estimation value, a value reported in an RRC message such as a Measurement report from the user equipment (UE) or a value calculated based on a time correlation value of the Sounding reference signal transmitted from the user equipment (UE) terminal may alternatively be used.

Further, in the above example, the transmission type is determined based on both CQI value across the system bandwidth and the Fd estimation value. However, alternatively, the transmission type may be determined based on only the CQI value across the system bandwidth or only the Fd estimation value.

Next, in step S318, a Buffer Status Check is performed. More specifically, with respect to the logical channel of the user equipment (UE), it is determined whether there are transmittable data in the sub-frame. Namely the base station apparatus 200 determines whether there are transmittable data in the data buffer with respect to each logical channel of the user equipment (UE). When determining that there are no transmittable data in any of the logical channels, the NG is returned. On the other hand, when determining that there are transmittable data in at least one logical channel, the OK is returned. Herein, the transmittable data includes newly transmittable data or retransmittable data. The logical channels do not include any logical channel that the Persistent Resource is reserved in step S338. Namely when transmittable data is included only in the logical channel that the Persistent Resource is reserved in step S338, the NG is returned. When there is only control information of an MAC layer as the transmittable data, the control information may be treated as a logical channel belonging to the same Priority class as a Dedicated Control Channel (DCCH) belongs. When a result of the Buffer Status Check is NG (NG in step S318), the user equipment is excluded from a target of the scheduling process. On the other hand, when a result of the Buffer Status Check is OK (OK in step S318), a logical channel having the Highest priority is selected from among the logical channels having transmittable data based on the following selection logics described below and the process goes to step S320 in which a Scheduling Coefficient Calculation process is performed. When the logical channel having the Highest priority is selected, the logical channel in which Persistent Resource is reserved in step S338 is also treated as a target of the selection.

Selection logic 1: The logical channel having the highest priority level is defined as the logical channel having the Highest priority.

Selection logic 2: When there are plural logical channels satisfying the Selection logic 1, the logical channel(s) having the transmittable data is defined as the logical channel(s) having the Highest priority.

Selection logic 3: In a case where there are plural logical channels satisfying the Selection logic 2, when there is a Dedicated Control Channel (DCCH), the Dedicated Control Channel (DCCH) is defined as the logical channel having the Highest priority; and when there is no Dedicated Control Channel (DCCH), any of the logical channels from among the plural logical channel is determined as the logical channel having the Highest priority.

When those selection logics are applied, not the retransmission data of the logical channel having a lower priority but the new data of the logical channel having a higher priority are more likely to be determined as the data of the logical channel having higher priority.

The above-described process that the user equipment (UE) terminal is excluded from a target of the scheduling process in steps S306, S308, S310, S312, and S318 means that the Scheduling Coefficient Calculation process described below is not to be performed. As a result, in the sub-frame, a Downlink Shared Channel (DSCH) is not transmitted to the user equipment (UE) terminal. In other words, the base station apparatus 200 performs the scheduling with respect to the user equipment (UE) terminals other than the user equipment (UE) terminals determined to be excluded from the targets of the scheduling in the above steps S306, S308, S310, S312, or S318; namely the base station apparatus 200 selects user equipment (UE) terminals to which the shared channel is to be transmitted and transmits downlink shared channel (DL-SCH) to the selected user equipment (UE) terminals.

In step S320, with respect to the logical channel determined as the logical channel having the Highest priority in step S318, the Scheduling coefficients are calculated based on an evaluation formula described below.

Tables 1 and 2 show parameters set via the external input interface (I/F).

TABLE 1

| Parameter No | name | Set with respect to each | Remarks |
|---|---|---|---|
| 1 | $A_{pc}$ | Priority class | This is a Priority Class Priority level coefficient based on Priority Class. Priority Class refers to an index or class indicating a priority level of data defined with respect to each logical channel. |
| 2 | $B(flag_{HO})$ | UE | This is a HO (HandOver) priority level coefficient given to transmit remaining data of UE performing Inter-eNB HO. In the sub-frame, this value is set based on a value of flag "$flag_{HO}$" related to the UE. When $flag_{HO} = 0$, B(0) is set to a fixed value 1.0 (B(0) = 1.0), and only when $flag_{HO} = 1$, this value is set via external input interface (I/F). For example, when $flag_{HO} = 1$, by setting |

TABLE 1-continued

| No | Parameter name | Set with respect to each | Remarks |
|---|---|---|---|
| | | | B(flag$_{HO}$) to 2.0 (B(flag$_{HO}$) = 2.0), it becomes possible to preferentially transmit remaining data of UE performing Inter-eNB HO. For example, when communicating between the UE and base station apparatus 200 about the control for the Inter eNB HO(HandOver), flag$_{HO}$ may be set to 1(flag$_{HO}$ = 1), otherwise, flag$_{HO}$ may be set to 0 (flag$_{HO}$ = 0). |
| 3 | D(flag$_{DRX}$) | UE | This is a DRX priority level coefficient given to preferentially transmit data of UE in DRX mode and DRX reception timing. In the sub-frame, this value is set based on a value of flag "flag$_{DRX}$" related to the UE. When flag$_{DRX}$ = 0, D(0) is set to a fixed value 1.0 (D(0) = 1.0), and only when flag$_{DRX}$ = 1, this value is set via external input interface (I/F). For example, when flag$_{DRX}$ = 1, by setting D(flag$_{DRX}$) to 2.0 (D(flag$_{DRX}$) = 2.0), it becomes possible to preferentially transmit data of UE in DRX mode and DRX reception timing.. It is assumed that in DRX mode and DRX reception timing, flag$_{DRX}$ is set to 1(flag$_{DRX}$ = 1), otherwise, flag$_{DRX}$ is set to 0 (flag$_{DRX}$ = 0). |
| 4 | E$_{PC}$(Num$_{retex}$) | Priority class | This is a retransmission priority coefficient used to preferentially transmit data to UE having a large number of retransmission of HARQ. When there are plurality of Processes having retransmission data, a value of the largest number of the retransmission is defined as Num$_{retx}$. Depending on the value of the number of retransmission times, the setting value of E$_{PC}$(Num$_{retex}$) is set as described above via the external input interface (I/F). For example, as shown in the table below By increasing the value of E$_{PC}$(Num$_{retex}$) as the value of Num$_{retx}$. increases, it becomes possible to preferentially transmit data to UE having a large number of retransmission of HARQ. <br> Num$_{retx}$    setting value of EPC(Num$_{retex}$) <br> 0    1.0 <br> 1    1.2 <br> 2, 3    1.8 <br> 4-16    2.5 |
| 5 | H (flag$_{gap\_control}$) | UE | This is a gap control priority level coefficient used to preferentially transmit data to UE in which a Measurement gap control mode is ON to measure cells operating at a different frequency. In the sub-frame, this value is set based on a value of flag$_{gap\_control}$ of UE. When flag$_{gap\_control}$ = 0, H(0) is set to a fixed value 1.0 (H(0) = 1.0), and only when flag$_{DRX}$ = 1, this value is set via external input interface (I/F). When UE is in Measurement gap control mode (i.,e., when Measurement gap control mode is ON), flag$_{DRX}$ is defined as 1 (flag$_{DRX}$ = 1), otherwise flag$_{DRX}$ is defined as 0 (flag$_{DRX}$ = 0). For example, to increase the priority level of UE where Measurement gap control mode is ON, H(1) may be set 10 (H(1) = 10). |

TABLE 2

| No | Parameter name | Set with respect to each | Remarks |
|---|---|---|---|
| 6 | F$_{PC}$(t$_{RLC\_buffered}$) | Priority class | This is a residence time priority level coefficient used to preferentially transmit data to UE in which buffer residence time of RLC is long. The buffer residence time of RLC SDU related to a logical channel having the Highest priority is used as an argument. The definition of buffer residence time of RLC SDU is defined as an elapsed time (unit: ms) from when "RLC SDU" is stored in Queue buffer provided with respect to each logical channel. Herein the timing of "when RLC SDU is stored in Queue buffer" is the same between for the retransmission and for the initial transmission. If there are RLC SDU having different Buffer residence time, the RLC SDU having the longest Buffer residence time is defined as flag$_{DRX}$. This value is set based on the the buffer residence time "t$_{RLC\_buffered}$" of RLC SDU as follows: <br> F$_{PC}$(t$_{RLC\_buffered}$ < Th$_{PC}^{(RLC\_buffered)}$) = 0.0 <br> F$_{PC}$(t$_{RLC\_buffered}$ ≧ Th$_{PC}^{(RLC\_buffered)}$) = 1.0 <br> As described above, by increasing the value F$_{PC}$(t$_{RLC\_buffered}$) when the buffer residence time "t$_{RLC\_buffered}$" of RLC SDU exceeds a predetermined value Th$_{PC}^{(RLC\_buffered)}$, it becomes possible to preferentially transfer data to UE having longer Buffer residence time of RLC. |
| 7 | Th$_{pc}^{(RLC\_buffered)}$ | Priority class | This is a threshold value related to the Buffer residence time of the RLC SDU. |
| 8 | G(flag$_{control}$) | UE | This is a MAC control block priority level coefficient used to preferentially transfer data to UE having MAC control block to be transmitted. In the sub-frame, this value is set based on a value of flag$_{control}$ of UE. When flag$_{control}$ = 0, G(0) is set to a fixed value 1.0 (G(0) = 1.0), and only when flag$_{control}$ = 1, this value is set via external input interface (I/F). For example, when flag$_{control}$ = 1, by setting G(flag$_{control}$) to 2.0 (G(flag$_{control}$) = 2.0), it becomes possible to preferentially transmit remaining data of UE having the MAC control block to be transmitted. It is assumed that when there is MAC control block to be transmitted, flag$_{control}$ is set to 1(flag$_{control}$ = 1), otherwise, flag$_{control}$ is set to 0 (flag$_{control}$ = 0).. |
| 9 | R$_{pc}^{(target)}$ | Priority class | This is a target data rate (bits/sub-frame) |
| 10 | α$^{(CQI)}$ | UE | This is a weighting coefficient with respect to priority level based on CQI. By using this parameter, it becomes possible to put weighting on priority levels based on CQI. |
| 11 | α$_{pc}^{(retx)}$ | Priority class | This is a weighting coefficient with respect to priority level based on the number of HARQ retransmissions. By using this parameter, it becomes possible to put weighting on priority levels based on the number of HARQ retransmissions. |

TABLE 2-continued

| No | Parameter name | Set with respect to each | Remarks |
|---|---|---|---|
| 12 | $\alpha_{pc}^{(RLC\_buffered)}$ | Priority class | This is a weighting coefficient with respect to priority levels based on Buffer residence amount of RLC. By using this parameter, it becomes possible to put weighting on priority levels based on the Buffer residence amount of RLC. |
| 13 | $\alpha_{pc}^{(freq)}$ | Priority class | This is a weighting coefficient with respect to priority levels based on frequency of allocations.. By using this parameter, it becomes possible to put weighting on priority levels based on the frequency of allocations. |
| 14 | $\alpha_{pc}^{(rate)}$ | Priority class | This is a weighting coefficient with respect to priority levels based on Average Data Rate.. By using this parameter, it becomes possible to put weighting on priority levels based on the Average Data Rate. |
| 15 | $\delta'_{pc}$ | Priority class | A convergence value of user data speed averaging forgetting coefficient for $\overline{R}_{n,k}$ |
| 16 | $\tau'_{pc}$ | Priority class | A convergence value of allocation frequency averaged forgetting coefficient used in calculating $freq_{n,k}$. |
| 17 | Scheduling priority group index | Priority class | An index of Scheduling priority group set with respect to each Priority class. Prioritization of each UE is performed in the order of "Scheduling priority group: High → Middle → Low". Further, in each of the Scheduling priority groups, prioritization is performed based on scheduling coefficients. The priority order of the scheduling priority group is defined as follows: High > Middle > Low. |

Tables 3 and 4 show input parameters given to each logical channel of each user equipment (UE) with respect to each Sub-frame as a unit.

TABLE 3

| No. | Parameter name | Remarks |
|---|---|---|
| 1 | $PC_{n,k}$ | This parameter indicates Priority Class of the logical Channel #k of UE#n. Priority class refers to an index or class indicating a priority level of data defined with respect to each logical channel. |
| 2 | $R_n$ | This parameter indicates Instantaneous transmittable Data Rate (bits/sub-frame) of UE#n calculated based on the following formula: Rn = DL_Table_TF_SIZE(RB_all, ⌊CQIreceived⌋) Where RB_all: the number of RBs across the system bandwidth Further, "CQIreceived" is calculated as follows: (when DL transmission type = Distributed) CQIreceived = CQI related to across the system bandwidth (when DL transmission type = Localized) CQIreceived = CQI of RBgroup having the highest quality The definition of the RBgroup corresponds to the definition of the RB groups of CQI reported from UE. |
| 3 | $\overline{R}_{n,k}$ | This parameter indicates the Average Data Rate (bits/sub-frame) of logical channel #k of UE#n. $\overline{R}_{n,k}(TTI) = \delta_{n,k} \overline{R}_{n,k}(TTI-1) + (1-\delta_{n,k}) * r_{n,k}$ $r_{n,k}$: instantaneous data rate As the initial value of $\overline{R}_{n,k}$, $R_{n,k}$ calculated in the sub-frame is used. |

TABLE 3-continued

| No. | Parameter name | Remarks |
|---|---|---|
| | | $\delta_{n,k}$: forgetting coefficient which is a variable changing with respect to each calculation period. Calculation of $\overline{R}_{n,k}$ is performed at every sub-frame based on update timing with respect to not only a logical channel having the Highest Priority but also any other logical channels. |

TABLE 4

| 4 | $freq_{n,k}$ | This parameter indicates a time-average value of allocation frequency of logical channel #k of UE #n. An averaging section (time) is designated by $\tau_t$. Namely $Freq_{n,k}(TTI) = \tau_{n,k}*freq_{n,k}(TTI-1) + (1-\tau_{n,k})*Allocated_{n,k}$ Where, $Allocated_{n,k}$ is set to 1 when DL-SCH is allocated to the data of logical channel #k of UE #n in the sub-frame where there are data to be transmitted of logical channel #k of UE #n in data buffer; otherwise, $Allocated_{n,k}$ is set to 0. Further, the update is to be performed with respect to each sub-frame when there are data to be transmitted of logical channel #k of UE #n in the data buffer. Calculation of "$freq_{n,k}$" is performed at every sub-frame based on update cycle with respect to not only a logical channel having the Highest Priority but also any other logical channels. |
|---|---|---|
| 5 | $Freq_{PC}$ | This parameter indicates a value by averaging "$freq_{n,k}$" using UE# and logical channel # of the Priority class. Averaging is performed with respect to only UE# and logical channel # having data to be transmitted in the data buffer at the sub-frame. Namely calculated as follows: $$Freq_{PC} = \frac{\sum_{\substack{(n,k) \in PC \\ Scheduling}} frrq_{n,k}}{\sum_{\substack{(n,k) \in PC \\ Scheduling}} 1}$$ Where $\sum_{\substack{(n,k) \in PC \\ Scheduling}}$ denotes the sum (Σ) of "UE#n and logical channels #k having Priority Class and there is data to be transmitted in the Buffer queue at the previous sub-frame" |

Based on the input parameters in Tables 1 and 2, the Scheduling coefficient $C_n$ of the logical channel #h having the Highest priority of the user equipment (UE) terminal #n is calculated based on formula (1) below.

$$C_n = A_{PC_h} \times B(flag_{HO}) \times D(flag_{DRX}) \times \alpha^{(CQI)} \cdot R_n \times \\ \left(1 + \alpha_{PC_h}^{(retx)} \cdot E_{PC_h}(retx) + \alpha_{PC_h}^{(RLC\_buffered)} \cdot F_{PC_h}(t_{RLC\_buffered})\right) \times \\ G(flag_{control}) \times \\ \exp\left(\alpha_{PC_h}^{(freq)} \cdot (Freq_{PC} - freq_{n,h}) + \alpha_{PC_h}^{(rate)} \cdot \left(R_{n,h}^{(target)} - \overline{R}_{n,h}\right)\right) \quad (1)$$

Alternatively, the Scheduling coefficient $C_n$ of the logical channel #h having the Highest priority of the user equipment (UE) terminal #n may be calculated based on formula (1') below.

$$C_n = \qquad (1')$$
$$A_{PC_h} \times B(flag_{HO}) \times D(flag_{DRX}) \times H(flag_{gap\_control}) \times \alpha^{(CQI)} \cdot R_n \times$$
$$\left(1 + \alpha_{PC_h}^{(retx)} \cdot E_{PC_h}(retx) + \alpha_{PC_h}^{(RLC\_buffered)} \cdot F_{PC_h}(t_{RLC\_buffered})\right) \times$$
$$G(flag_{control}) \times$$
$$\exp\left(\alpha_{PC_h}^{(freq)} \cdot (Freq_{PC} - freq_{n,h}) + \alpha_{PC_h}^{(rate)} \cdot \left(R_{n,h}^{(target)} - \overline{R}_{n,h}\right)\right)$$

In formula (1'), a term of "$H(flag_{gap\_control})$" is added to the formula (1). The "$flag_{gap\_control}$" is a flag indicating whether the user equipment (UE) is in a Measurement gap control mode. Herein, the Measurement gap control mode indicates whether a Measurement gap for measuring cells operating at a different frequency is being applied. When the Measurement gap control mode is ON, the Measurement gap is set at a predetermined timing. The Measurement gap is set from the base station apparatus.

Generally, in the sub-frame where the Measurement gap is applied, data cannot be transmitted and received. Therefore, it is necessary to allocate the radio resources to the user equipment #n to preferentially transmit and receive data in the sub-frame to which the Measurement gap is not applied. For example, by setting $H(flag_{gap\_control})$ to 10 ($H(flag_{gap\_control})$=10) in a case of $flag_{gap\_control}$=1 (i.e., Measurement gap control mode:ON) and $H(flag_{gap\_control})$ is set to 1 ($H(flag_{gap\_control})$=1) in a case of $flag_{gap\_control}$=0 (i.e., Measurement gap control mode:OFF), it may become possible to perform the operation that "transmission and reception of data are preferentially performed with respect to the sub-frames to which the Measurement gap is not applied".

By the Measurement Gap Check in step S306, when the Measurement gap control mode is ON and when the sub-frame is included in the Measurement gap or the sub-frame where the acknowledgement information (ACK/NACK) is to be received is included in the Measurement gap, this process in step S320 is not performed. In other words, when the Measurement gap control mode is ON and when this process in step S320 is to be performed, the sub-frame is at a timing when signals in the same (original) frequency are transmitted and received in a mode when cells operating at a different frequency are being measured. Namely due to the term "$H(flag_{gap\_control})$" it may become possible to preferentially allocate the shared channel to the mobile station (user equipment (UE) terminal) transmitting and receiving the same (original) frequency in a mode when cells operating at a different frequency are being measured.

In a case of Intra-eNB Hand Over (Intra-eNB HO), it is assumed that the measurement value and calculation value used for the scheduling are also used in a Target eNB (eNB of Handover destination).

In step S320, an Average Data Rate is measured.
The Average Data Rate is calculated using formula (2).

$$\overline{R}_{n,k} = R_{n,k}(N_{n,k}=1)$$

$$\overline{R}_{n,k}(TTI) = \delta_{n,k}\overline{R}_{n,k}(TTI-1) + (1-\delta_{n,k}) \cdot r_{n,k}(N_{n,k}>1) \qquad (2)$$

Where, $N_{n,k}$(1, 2, . . . ) denotes the number of updating the Average Data Rate. However, in the sub-frame where $N_{n,k}$=0, the following formula (3) is applied.

$$\overline{R}_{n,k} = R_{n,k} \qquad (3)$$

Further, a forgetting coefficient $\delta_{n,k}$ is calculated as follows.

$$\delta_{n,k} = \min(1 - 1/N_{n,k}, \delta_{PCn,k})$$

An updating timing of the Average Data Rate is based on "every sub-frame where there are data to be transmitted in the data buffer of the base station apparatus 200". Further, $r_{n,k}$ is calculated as "a size of transmitted MAC SDU". Namely the calculation of the Average Data Rate is performed based on any of the following operations in the sub-frame when the Average Data Rate is to be updated.

1. For a user equipment (UE) terminal that transmits data, the Average Data Rate is calculated assuming "$r_{n,k}$=size of transmitted MAC SDU".

2. For a user equipment (UE) terminal that has not transmitted data, the Average Data Rate is calculated assuming "$r_{n,k}$=0".

In this case, the Average Data Rate is calculated when the result of the Received CQI check is OK and conditions of updating the Average Data Rate is matched. Namely the calculation is started after the CQI is received at least once.

Next, in step S322, $N_{scheduling}$ indicating the number of user equipment (UE) terminals that calculate the Scheduling coefficient is increased by 1 (one). In step S324, a value of "n" indicating the index of the user equipment (UE) terminal is increased by 1 (one).

Next, in step S326, it is determined whether the value of "n" is equal to or less than N. When determining that the value of "n" is equal to or less than N (YES in step S326), the process goes back to step S304.

On the other hand, when determining that the value of "n" is greater than N (NO in step S326), the process goes to step S328 in which a UE Selection process is performed. More specifically, in step S328, the user equipment (UE) terminal is selected in which the allocation of the radio resources is performed based on the Dynamic scheduling with respect to the sub-frame.

First, by the following formula, the number of user equipment (UE) terminals in which the radio resources are allocated based on the Dynamic scheduling (i.e., the number of user equipment (UE) terminals that transmit the Downlink Shared Channel (DL-SCH)) $N_{DL-SCH}$ is calculated. Herein, a symbol $N_{Scheduling}$ denotes the number of user equipment (UE) terminals in which the Scheduling Coefficient Calculation process has been performed (see FIG. 3).

$$N_{DL-SCH} = \min(N_{Scheduling}, N_{DLMAX} - N_{PCH} - N_{RACHres}) \qquad (4)$$

Next, top $N_{DL-SCH}$ user equipment (UE) terminals in which the resource blocks are to be allocated based on the Dynamic scheduling are selected in the descending order of the Scheduling coefficients calculated in step S320 with respect to each Scheduling priority group of the logical channel having the Highest priority. Namely user equipment (UE) terminals that become the transmission destinations of the downlink Shared Channel (DL-SCH) are selected. Herein, the Scheduling priority group refers to a group prioritized in the Scheduling process and a Scheduling priority group to which the logical channel is to belong is defined with respect to each logical channel.

The above "user equipment (UE) terminals" are selected in accordance with the order described below. When the user equipment (UE) terminal has control information of the MAC layer to be transmitted in the sub-frame, the Scheduling priority group is set to "High" regardless of the Scheduling priority group of the logical channel having the Highest priority.

High ($1^{st}$)->High ($2^{nd}$)-> . . . ->Middle ($1^{st}$)->Middle ($2^{nd}$)-> . . . ->Low ($1^{St}$)->Low ($2^{nd}$)-> . . .

As described above, it may become possible to calculate the Scheduling coefficients with respect to each user equipment (UE) terminal that is determined to be able to transmit the downlink shared channel (DL-SCH) by performing a loop process with respect to "n" which is an index of the user equipment (UE index). Further, the radio resources are allocated to the user equipment (UE) terminals having a greater calculated Scheduling coefficient value. Namely, by controlling the transmission of the downlink shared channel (DL-SCH), in which DL-SCH is transmitted to the user equipment (UE) terminals having larger scheduling coefficients, it may become possible to determine the user equipment (UE) terminals to which the radio resources (downlink shared channel (DL-SCH)) are allocated and transmit the downlink shared channel (DL-SCH) to the user equipment (UE) terminals based on a priority level of data, radio quality information reported from the user equipment (UE) terminals, the number of retransmission, whether there is control information of the MAC layer, frequency of allocation, an average data rate, and a target data rate, whether the handover process is being performed, whether it is in a reception timing of an intermittent reception process, whether it is in a residence time of data in an RLC (Radio Link Control) layer, and whether it is in a reception timing in a mode of measuring cells operated at a different frequency.

In the above example, the Scheduling priority group has three types, High, Middle, and Low. However, four or more types of the Scheduling priority group may be provided, or two or less types of the Scheduling priority group may be provided.

For example, five types, i.e., $High_{MAC}$, $High_{DRX}$, High, Middle, and Low, of the Scheduling priority group may be provided assuming that the priority level decreases in the order of $High_{MAC}$, $High_{DRX}$, High, Middle, and Low. Further, in this case, with respect to the user equipment (UE) terminals having an MAC control block to be transmitted, the Scheduling priority may be set to "$High_{MAC}$" regardless of the Scheduling priority group of the logical channel having the Highest priority. Further, with respect to the user equipment (UE) terminal in a DRX reception timing in DRX mode, the Scheduling priority group may be set "$High_{DRX}$" regardless of the Scheduling priority group of the logical channel having the Highest priority. By doing this, it may become possible to preferentially allocate the shared channel with respect to the user equipment (UE) terminal having the MAC control block to be transmitted and the user equipment (UE) terminal in the DRX reception timing in DRX mode. For example, when there are user equipment (UE) terminal(s) having the MAC control block and user equipment (UE) terminal(s) without the MAC control block, it may become possible to preferentially allocate the shared channel to the user equipment (UE) terminal(s) having the MAC control block regardless of the value of $C_n$ in formula (1).

In the above example, the priority level is set so that the priority level decreases in the order of $High_{MAC}$, $High_{DRX}$, High, Middle, and Low. However, this is just an example only, and, for example, the priority level may be set so that the priority level decreases in the order of High, $High_{MAC}$, $High_{DRX}$, Middle, and Low.

Next, the downlink TFR Selection (DL TFR Selection) process performed in step S212 is described with reference to FIG. 4.

Figure 4:
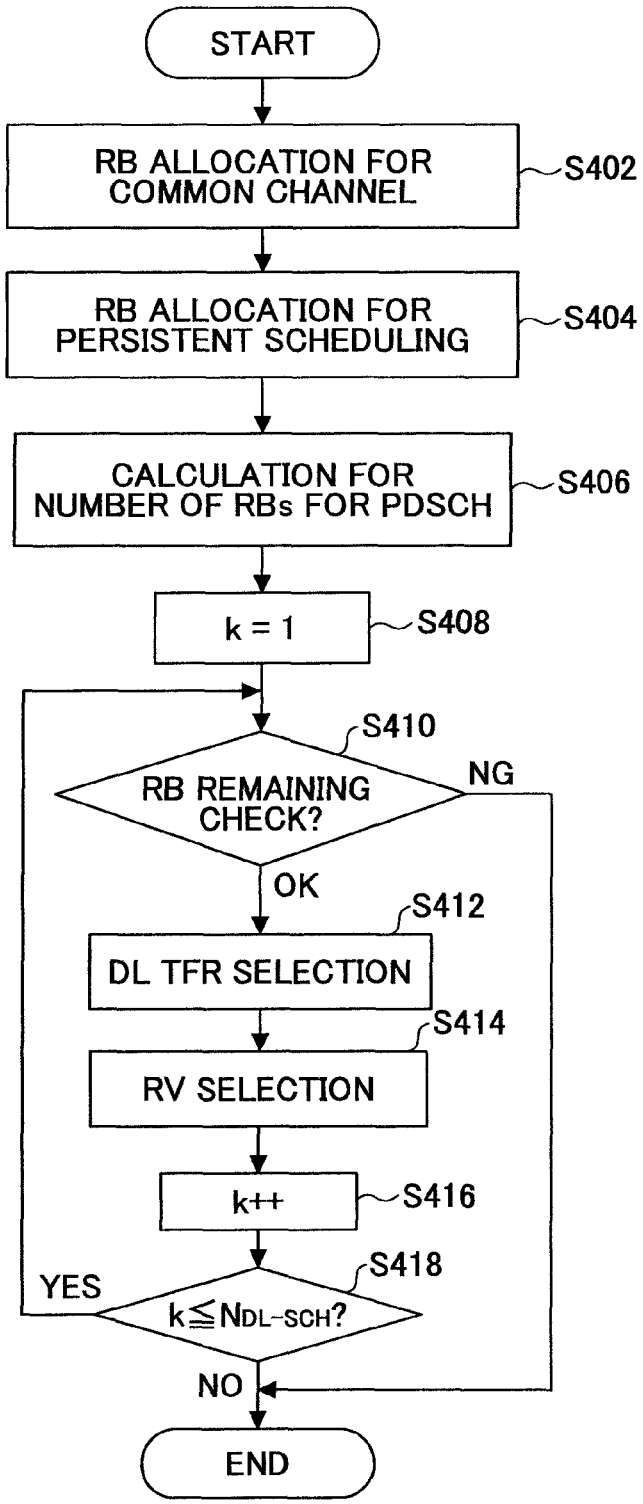
FIG. 4 is a flowchart showing a process of control for a TFR selection according to an embodiment of the present invention.

FIG. 4 shows a procedure of the DL TFR selection process. By performing this procedure, it may become possible to determine the transmission formats of and allocate the radio resources to common channels such as the Synchronization Signal (also called a Synchronization channel (SCH)), the Broadcast Channel (BCH), the Paging Channel (PCH), and the Random Access Channel (RACH) response (RACH response, or message2 in random access procedure), the Downlink Shared Channel (DL-SCH) to which the Persistent Scheduling is applied, and the Downlink Shared Channel (DL-SCH) to which the Dynamic Scheduling is applied.

First, in step S402, Resource blocks are allocated to the Common Channels.

When the Synchronization signal is transmitted using the sub-frame, the resource blocks shown in Table 5 are allocated to the Synchronization signal. When the system bandwidth is 5 MHz, 10 MHz, and 20 MHz, 25, 50, and 100 resource blocks are provided in the system bandwidth, respectively. The resource blocks have the corresponding identification numbers starting from #0 for the resource block at one end. The RB group including the RB allocated to the Synchronization signal is not allocated to the downlink shared channel (DL-SCH) to which the Dynamic Scheduling is applied. When the system bandwidth is 10 MHz or 20 MHz, six (6) resource blocks provided in the center portion of the system bandwidth are allocated to the Synchronization signal. More specifically, when the system bandwidth is 10 MHz, the resource blocks #22 through #27 are allocated to the Synchronization signal, and when system bandwidth is 20 MHz, the resource blocks #47 through #52 are allocated to the Synchronization signal. On the other hand, when the system bandwidth is 5 MHz, seven (7) resource blocks in the center portion of the system bandwidth are allocated to the Synchronization signal. More specifically, when the system bandwidth is 5 MHz, the resource blocks #9 through #15 are allocated to the Synchronization signal.

The above-mentioned resource blocks allocated to the Synchronization signal are treated as the resource blocks reserved for the Synchronization signal to prevent the resource blocks from being allocated to any other channel. However, not all the resource blocks having been reserved for the Synchronization signal are practically allocated to the Synchronization signal. Namely the Synchronization signal is allocated to only predetermined sub-carriers among all the resource blocks having been allocated for the Synchronization signal. For example, the Synchronization signal is mapped to 72 sub-carriers in the center portion of the system bandwidth and transmitted. In this case, when the number of the sub-carrier to which the Synchronization signal is mapped is defined as k, the "k" may be given as follows.

$$k = n - 36 + \left\lfloor \frac{N_{BW}^{DL}}{2} \right\rfloor, n = 0, \ldots, 71 \quad (5)$$

Where, a symbol "$N_{BW}^{DL}$" denotes the number of sub-carriers of the entire system bandwidth. In this case, when the system bandwidth is 5 MHz, a group of sub-carriers to which the Synchronization signal is mapped does not correspond to the resource blocks to which the downlink shared channel (DL-SCH) is mapped (see FIG. 5). Namely the Synchronization signal is transmitted as a group of sub-carriers which is shifted with respect to the resource blocks to which the downlink shared channel (DL-SCH) is mapped by 90 kHz (6 sub-carriers).

The transmission power of the Synchronization signal (total of transmission power of all the resource elements (sub-carriers); absolute value; unit is W) is defined as $P_{SCH}$.

TABLE A

RB allocated to SCH

| System bandwidth | RB Nos of RB to be allocated |
|---|---|
| 5 MHz | #9~#15 |
| 10 MHz | #22~#27 |
| 20 MHz | #47~#52 |

TABLE B

RB allocated to BCH

| System bandwidth | RB Nos of RB to be allocated |
|---|---|
| 5 MHz | #9~#15 |
| 10 MHz | #22~#27 |
| 20 MHz | #47~#52 |

When the Broadcast Channel (BCH) is transmitted via the sub-frame, the resource blocks shown in Table B are allocated to the Broadcast Channel (BCH). When the system bandwidth is 10 MHz or 20 MHz, six (6) resource blocks in the center portion of the system bandwidth are allocated to the Broadcast Channel (BCH). More specifically, when the system bandwidth is 10 MHz, the resource blocks #22 through #27 are allocated to the Broadcast Channel (BCH), and when system bandwidth is 20 MHz, the resource blocks #47 through #52 are allocated to the Broadcast Channel (BCH). On the other hand, when the system bandwidth is 5 MHz, seven (7) resource blocks in the center portion of the system bandwidth are allocated to the Broadcast Channel (BCH). More specifically, when the system bandwidth is 5 MHz, the resource blocks #9 through #15 are allocated to the Broadcast Channel (BCH).

The above-mentioned resource blocks allocated to the Broadcast Channel (BCH) are treated as the resource blocks reserved for the Broadcast Channel (BCH) to prevent the resource blocks from being allocated to any other channel. However, not all the resource blocks having been reserved for the Broadcast Channel (BCH) are practically allocated to the Broadcast Channel (BCH). Namely, the Broadcast Channel (BCH) is allocated to only predetermined sub-carriers among all the resource blocks having been allocated for the Broadcast Channel (BCH). For example, the Broadcast Channel (BCH) may be mapped to the sub-carriers having the same sub-carrier numbers as the Synchronization signal is mapped. In this case, when the system bandwidth is 5 MHz, a group of sub-carriers to which the Broadcast Channel (BCH) is mapped does not correspond to the resource blocks to which the downlink shared channel (DL-SCH) is mapped. Namely the Broadcast Channel (BCH) is transmitted as a group of sub-carriers which is shifted with respect to the resource blocks to which the downlink shared channel (DL-SCH) is mapped by 90 kHz (6 sub-carriers).

Figure 5:
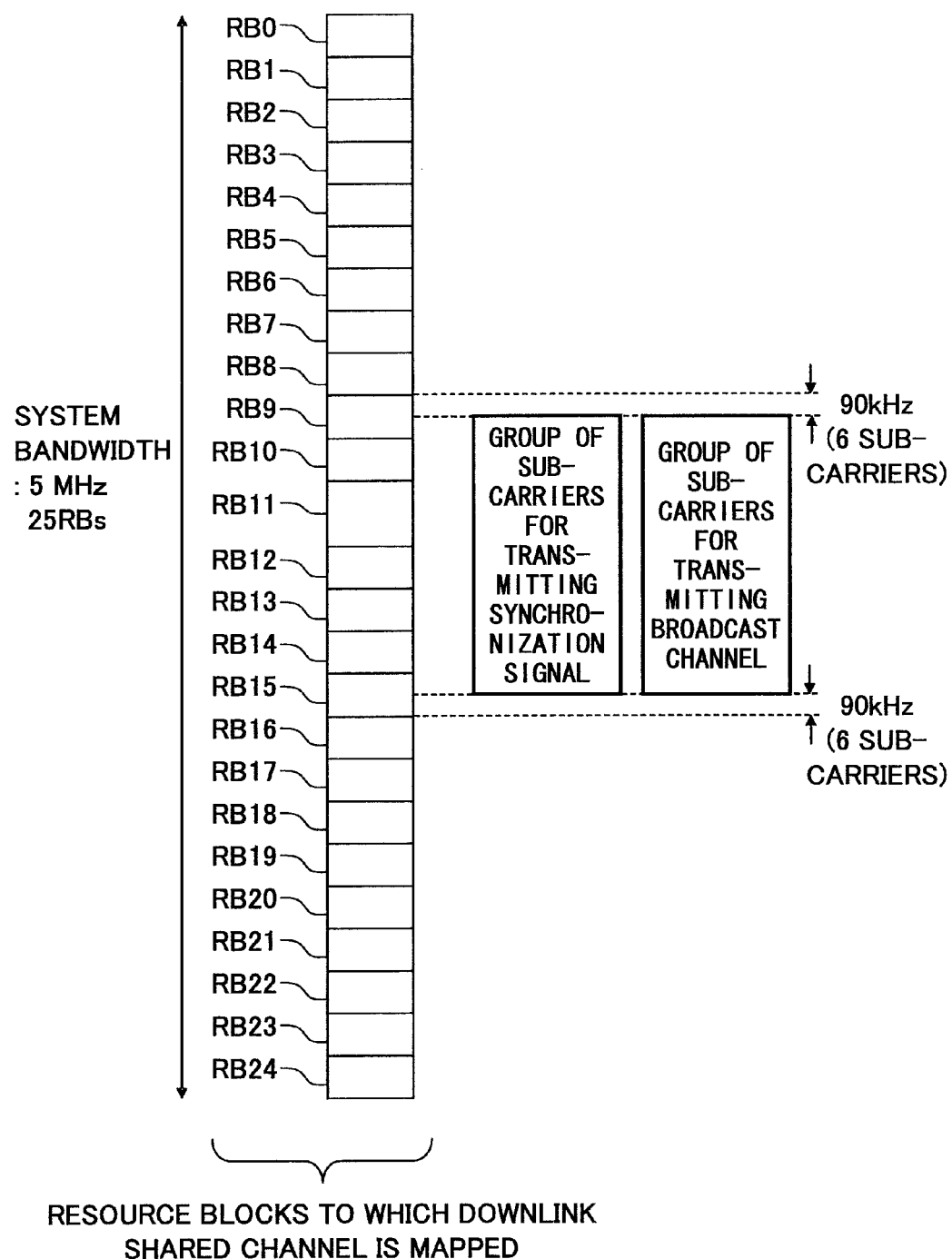
FIG. 5 is a drawing showing resource blocks allocated to a synchronization signal and a broadcast channel.

Namely when the system bandwidth is 5 MHz, as shown in FIG. 5, the base station apparatus 200 transmits the Broadcast Channel (BCH) via a group of sub-carriers shifted with respect to the resource blocks to which the downlink shared channel (DL-SCH) is mapped by 90 kHz (6 sub-carriers).

Further, when the system bandwidth is 5 MHz, the user equipment (UE) terminals 100$n$ receive the Broadcast Channel (BCH) via a group of sub-carriers shifted with respect to the resource blocks to which the downlink shared channel (DL-SCH) is mapped by 90 kHz (6 sub-carriers).

The transmission power of the Broadcast Channel (BCH) (total of transmission power of all the resource elements (sub-carriers); absolute value; unit is W) is defined as $P_{BCH}$.

The Broadcast Channel (BCH) is a name as the Transport Channel and is called a Common Control Physical Channel (CCPCH) as a physical channel.

When the Paging Channel (PCH) is to be transmitted via the sub-frame, an RB group set via the external input interface (I/F) is allocated to the Paging Channel (PCH). Further, a TRF selection process may be performed in accordance with the data size of the Paging Channel (PCH) or the number of the user equipment (UE) terminals to transmit the Paging Channel (PCH).

When a Random Access Channel response (RACH response) or Message2 in random access procedure is transmitted via the sub-frame, the number "$Num_{RB,RACHres}$" of resource blocks to be allocated to the RACH response is determined based on a CQI value "$CQI_{RACHres}(i)$" used for the TRF selection process of the RACH response and the size "$Size_{RACHres}$" of the RACH response.

The size "$Size_{RACHres}$" of the RACH response is determined in accordance with the number of user equipment (UE) terminals multiplexed on the RACH response and the transmission purpose of the RACH.

The CQI value "$CQI_{RACHres}(i)$" is set via the external input interface (I/F) with respect to each piece of quality information of the RACH preamble. The symbol "i" is an index of the quality information and a value indicating the lowest quality among the values of quality information of the user equipment (UE) multiplexed in the RACH response (i.e., the smallest index value) is set.

$$Num_{RB,RACHres}=DL\_Table\_TF\_FRB(Size_{RACHres}, CQI_{RACHres}(i)) \ (i=0, 1, 2, 3)$$

Further, until the number of the resource blocks allocated to the RACH response exceeds $Num_{RB,RACHres}$, the RB groups are sequentially allocated to the RACH response in the ascending order of the RACH group number.

Next, in step S404, RB allocation for Persistent Scheduling is performed. Namely the Persistent Resource reserved in step S338 is allocated to the user equipment (UE) terminals having downlink shared channel (DL-SCH) to which the Persistent scheduling is applied in the sub-frame. In this case, the resource blocks to be allocated to the downlink shared channel (DL-SCH) to which the Persistent scheduling is applied are allocated by treating the RB group as a unit. The transmission power of the downlink shared channel (DL-SCH) to which the Persistent scheduling is applied (total of transmission power of all the resource elements (sub-carriers); absolute value; unit is W) is defined as $P_{persist}$. Herein, when there are two or more user equipment (UE) terminals having the downlink shared channel (DL-SCH) to which the Persistent scheduling is applied, $P_{persist}$ represents the total amount of the transmission power of the downlink shared channel (DL-SCH) of all the user equipment (UE) terminals, the Persistent scheduling being applied to the downlink shared channel (DL-SCH).

Next, in step S406, a Calculation for Number of RBs for PDSCH (i.e., a calculation of the number of the resource blocks of the Physical Downlink Shared Channel (PDSCH)) is performed. More specifically, the number of the resource blocks "$N_{dynamic}^{(RB)}$" that can be allocated to the Physical Downlink Shared Channel (PDSCH) using the following formula (6) based on the maximum transmission power of the base station apparatus 200 (hereinafter referred to as "$P_{max}$": unit:W), transmission power of Synchronization signal "$P_{SCH}$", transmission power of Broadcast Channel (BCH) "$P_{BCH}$", transmission power of Paging Channel (PCH) "$P_{PCH}$", transmission power of Random Access Channel (RACH) response "$P_{RACHres}$", transmission power of downlink shared channel (DL-SCH) to which Persistent scheduling is applied "$P_{persist}$" and transmission power per one resource block of downlink shared channel (DL-SCH) to which Dynamic scheduling is applied "$P_{dynamic}$". Herein, a symbol "$N_{dynamic}^{(RB)}$" denotes the number of resource blocks of the entire system bandwidth, and symbols "$N_{BCH}$", "$N_{SCH}$", "$N_{PCH}$", "$N_{RACHres}$", and "$N_{persist}$" denote the number of resource blocks allocated to the Broadcast Channel (BCH), Synchronization signal, Paging Channel (PCH), RACH response, and the downlink shared channel (DL-SCH) to which the Persistent scheduling is applied, respectively in the sub-frame.

$$N_{dynamic}^{(RB)} = \min\left(N_{system}^{(RB)} - N_{common} - N_{persist}, \left\lfloor \frac{(P_{max} - \max(P_{SCH}, P_{BCH}) - P_{persist} - P_{PCH} - P_{RACHres})}{(P_{dynamic}^{(RB)})} \right\rfloor \right) \quad (6)$$

$$N_{common} = \max(N_{SCH}, N_{BCH}) + N_{PCH} + N_{RACHres}$$

When an inequality $N_{dynamic}^{(RB)} < N_{system}^{(RB)} - N_{common} - N_{persistent}$ is satisfied, the total transmission power value of the base station apparatus 200 is controlled so that the total transmission power value is equal to or less than the maximum transmission power value of the base station apparatus 200 by preventing the transmission using some RB group(s) among the RB groups other than the RB groups allocated to the BCH, PCH, RACH response, and downlink shared channel (DL-SCH) to which Persistent scheduling is applied. More specifically, until the transmission of "$N_{system}^{(RB)} - N_{common} - N_{persistent} - N_{dynamic}^{(RB)}$" or more resource blocks is prohibited, the following process is performed to determine the RB group that is prevented from being transmitted. In this process, first, a RB group having the smallest number of resource blocks is detected and the transmission of the detected RB group is prohibited. In this case, if more than two RB groups having the smallest number of resource blocks exists, the transmission of the RB groups is sequentially prohibited in the ascending order of the RB group number. The above process is repeated to sequentially determine the RB groups that are prevented from being transmitted.

In step S408, a value of "k" is set to 1 (one) (k=1).

Next, in step S410, an RB Remaining Check process to determine whether there are any remaining resource blocks is performed.

More specifically, in step S410, it is determined whether there is any remaining RB group that can be allocated to the downlink shared channel (DL-SCH) to which Dynamic scheduling is applied. When determining that there is an allocatable RB group, the OK is returned. On the other hand, when determining that there is no allocatable RB group, the NG is returned. When a result of the RB Remaining Check is NG (NG in step S410), the DL TFR Selection process is terminated.

The above-mentioned "RB group that can be allocated to the downlink shared channel (DL-SCH) to which Dynamic scheduling is applied" refers to an RB group other than the RB groups having been allocated to any of BCH, PCH, RACH response, DL-SCH to which Persistent scheduling is applied, and DL-SCH to which Dynamic scheduling is applied and in which the TFR Selection process is already performed. Further, the number of resource blocks included in the "RB groups that can be applied to the downlink shared channel (DL-SCH) to which Dynamic scheduling is applied" is defined as $N_{remain}^{(RB)}$.

In the above example, it is assumed that "RB group that can be allocated to the downlink shared channel (DL-SCH) to which Dynamic scheduling is applied" refers to an RB group other than the RB groups having been allocated to any of BCH, PCH, RACH response, DL-SCH to which Persistent scheduling is applied, and DL-SCH to which Dynamic scheduling is applied and in which the TFR Selection process is already performed. However, alternatively, the "RB group that can be allocated to the downlink shared channel (DL-SCH) to which Dynamic scheduling is applied" may be an RB group other than the RB groups having been allocated to any of Synchronization signal, BCH, PCH, RACH response, DL-SCH to which Persistent scheduling is applied, and DL-SCH to which Dynamic scheduling is applied and in which the TFR Selection process is already performed.

On the other hand, when the result of the RB Remaining Check is OK (OK in step S410), the process goes to step S412.

Next, in step S412, the DL TFR Selection (Downlink TFR Selection) process is performed.

More specifically, the transport format of "the user equipment (UE) terminal in which radio resources are allocated based on Dynamic scheduling (excluding PCH and RACH response)" determined in step S212 is determined and the allocation of the RB groups is performed.

In the DL TFR selection process, a CQI adjustment process is performed. With respect to the CQI used in the TFR Selection process, the following processes are applied; a frequency direction regarding process, an Outer-loop type offset adjustment process, and an offset process based on the priority level of the logical channel having the Highest priority.

Next, the frequency direction regarding process is described.

When the definition of the RB group of the CQI reported from the user equipment (UE) terminal is different from the definition of the RB group in the DL TFR Selection process, the CQI values of the corresponding RB groups reported from the user equipment (UE) (hereinafter referred to as $CQI_{received}(j)$; j denotes RB group number) are regarded as the CQI values of the corresponding RB groups in the DL TFR Selection process (hereinafter referred to as $CQI_{calibrated}(i)$; i denotes RB group number). Further, when Best-M individual method is used as a method of reporting the CQI value, it is assumed that the CQI value for the RB group having no CQI value is the same as the CQI value across the system bandwidth. When the Best-M individual method is applied, for example, the system bandwidth is divided into plural groups each having four resource blocks, and CQI values with respect to each group of resource blocks having four resource blocks are calculated, and top M CQI values of higher quality are reported from the user equipment to the base station apparatus.

In the following, when the CQI related to the entire system bandwidth is expressed, the argument is described as "all".

For example, when $N_a$ resource blocks of the RB group #a of the CQI reported from the user equipment (UE) and $N_b$ resource blocks of the RB group #b of the CWI reported from the user equipment are included on RB group #1 in the DL TFR Selection process, the CQI value of RB group #1 in the DL TFR Selection process may be calculated based on the following formula.

$$CQI_{calibrated}(i) = 10 \cdot \log_{10}\left(\frac{N_a \cdot 10^{\frac{CQI_{received}(a)}{10}} + N_b \cdot 10^{\frac{CQI_{received}(b)}{10}}}{N_a + N_b}\right) \quad (7)$$

Next, the Outer-loop type offset adjustment process (CQI offset adjustment) is described.

CQI_offset$_i$ is adjusted like an Outer loop as shown in formula (8) based on the acknowledgement information (a result of CRC check) of the downlink shared channel (DL-SCH) where the priority class of the logical channel having the Highest priority is $X_{j,adjust}$. When the priority class of the logical channel having the Highest priority is other than $X_{j,adjust}$, the Outer-loop type offset adjustment process (in formula (8)) may not be performed.

The CQI_offset$_i$ is adjusted with respect to each user equipment (UE) terminal. Further, Priority class $X_{j,adjust}$ as the target of the CQI offset adjustment process is set via the external input interface (I/F) with respect to each user equipment (UE) terminal.

$\Delta_{adj}^{(PC)}$ and $BLER_{target}^{(PC)}$ may be configured to be set via the external input interface (I/F). However, it is assumed that the maximum value of CQI_offset$_i$ is defined as CQI_offset$_{pc}$, and the minimum value of CQI_offset$_i$ is defined as CQI_offset$_{PC}^{(min)}$. The maximum value CQI_offset$_{PC}^{(max)}$ and the minimum value CQI_offset$_{PC}^{(min)}$ of the CQI_offset$_i$ are set via the external input interface (I/F). When the CQI_offset$_i$ is fixed to the maximum value or the minimum value, the calculation of formula (8) is not performed.

$$CQI\_offset_i = \begin{cases} CQI\_offset_i + \Delta_{adj}^{(PC_X)} \times BLER_{target}^{(PC_X)} & \text{Input} = \text{"Ack"} \\ CQI\_offset_i - \Delta_{adj}^{(PC_X)} \times (1 - BLER_{target}^{(PC_X)}) & \text{Input} = \text{"Nack"} \\ CQI\_offset_i & \text{Input} = \text{"DTX"} \end{cases} \quad (8)$$

Then, the value of CQI_offset$_i$ is added to the value of CQI of each RB group and a value of CQI related to the entire system bandwidth as a power offset value. A process of the following formula is performed with respect to each sub-frame in which the DL TFR Selection process is performed regardless of "whether the priority class of the logical channel having the Highest priority is $X_{j,adjust}$ in the sub-frame".

$$CQI_{adjusted}(i) = CQI_{adjusted}(i) + CQI\_offset_i$$

Next, the offset process based on the priority level is described.

The CQI values of the corresponding RB groups and the CQI value related to the entire system bandwidth are adjusted using an offset value $\Delta_{PC}$ which is based on the priority level of the logical channel having the Highest priority. The $\Delta_{PC}$ may be set via the external input interface (I/F). The subscriber "pc" denotes Priority class.

$$CQI_{adjust}(i) = CQI_{adjust}(i) - \Delta_{PC}$$

Next, a resource block group allocation (RB group allocation) is described. By performing the process below, the RB group is allocated to kth user equipment (UE) terminal in which radio resources are allocated based on the Dynamic Scheduling (excluding PCH and RACH response). FIG. 6 schematically shows a DL_TF_Related_table and a case where CQI=1 as an example.

Process $N_{remain}^{(RB)}$: the number of remaining resource blocks (Number of Remaining RBs)

$N_{capability}$: the maximum RB number determined based on UE category $N_{max,bit}$: the maximum data size (Payload size) determined based on UE category $$N_{remain}^{(UE)} = N_{DL-SCH} - k + 1$$

$$N_{allocated}^{(RB)} = \min\left(\left\lceil \frac{N_{remain}^{(RB)}}{N_{remain}^{(UE)}} \right\rceil, N_{capability}\right) \quad (9)$$

When the downlink transmission type is Distributed, RB groups are selected so that the allocated frequency resources can be discretely distributed within the system bandwidth until the number of the resource blocks allocated to the user equipment (UE) terminal is equal to or greater than $N_{allocated}^{(UE)}$. For example, RB groups may be defined in advance so that when the RB groups are sequentially allocated in the ascending order of the RB group number, the allocated RB groups can be discretely distributed; then the RB groups are sequentially allocated in the ascending order of the RB group number to the user equipment (UE) terminal.

When the downlink transmission type is not Distributed (i.e., when the downlink transmission type is Localized), the RB groups are sequentially allocated to the user equipment (UE) terminal in the descending order of the value of $CQI_{adjusted}$ of the RB groups until the number of the resource blocks allocated to the user equipment (UE) terminal is equal to or greater than $N_{allocated}^{(UE)}$.

Hereinafter, the RB group determined "to be allocated to the user equipment (UE) terminal" in the process describe above may be referred to as a Temporary RB group.

In a case where the user equipment (UE) terminal has "the logical channel for which the Persistent Resource is reserved in step S338", the Persistent Resource is added to the Temporary RB group.

When the logical channel having the Highest priority has retransmittable data, data (MAC PDU) including RLC SDU having the maximum "buffer residence time of the RLC SDU" of the logical channel having the Highest priority are transmitted among the retransmittable data (MAC PDU). Herein, the definition of the buffer residence time of the RLC SDU is the same as that of the RLC SDU buffer residence time described in No. 6 of Table 1. It is assumed that the RB group used for the data transmission is the same as the Temporary RB group; and the modulation scheme of the data transmission is the same as that in the initial data transmission.

On the other hand, when the logical channel having the Highest priority does not have retransmittable data, $CQI_{TFR}$ is calculated as follows.

When the downlink transmission type is Distributed, it is given that $CQI_{TFR} = CQI_{adjusted}$ (all). On the other hand, when the downlink transmission type is not Distributed (i.e. when the downlink transmission type is Localized), $CQI_{TFR} = CQI_{adjusted}(i)$ are true-value averaged across the bandwidth of the Temporary RB group (the averaging is required to be performed by considering (the difference of) the number of resource blocks of each RB group).

The data size (DL-SCH) (hereinafter referred to as Size) and the modulation scheme (hereinafter referred to as Modulation) of the downlink shared channel (DL-SCH) are determined by referring to a TF_related_table using the number of resource blocks in the Temporary RB group (RB_available) and $CQI_{TFR}$ as arguments.

$$\text{Size}=DL\_Table\_TF\_SIZE(RB\_available, \lfloor CQI_{TFR} \rfloor)$$

$$\text{Modulation}=DL\_Table\_TF\_Mod(RB\_available, \lfloor CQI_{TFR} \rfloor) \quad (10)$$

In a case of Size $>N_{max,bit}$, a value of $CQI_{TFR}$ is repeatedly reduced by 1 (one) until Size $\leq N_{max,bit}$ is satisfied (refer to a Table of smaller CQI of a DL_TF_related_table, in this case, a value of RB_available is not changed). Based on a confirmed value of Size, a value of Modulation is changed to a value in accordance with the DL_TF_related_table.

Then, by the following procedure, the control information of the MAC layer and data of all logical channels in a data buffer are multiplexed with the MAC PDU having the above Size. Herein, the data buffer may be, for example, an RLC buffer.

A case is described where there are plenty of data in the RLC buffer.

Step 1: First, when there is the control information of the MAC layer, the control information of the MAC layer is multiplexed with the highest priority.

Step 2: Next, the data in the RLC buffer are sequentially extracted from the logical channels in the descending order of the priority level of the logical channel, and multiplexed. When there are two or more logical channels having the same priority level, if there are any DDCH, the DDCH is treated with the highest priority, and if there is no DDCH, the data in the RLC buffer may be sequentially extracted from the logical channels in any order. As a method of selecting the logical channel in any order, a Round-Robin method may be used.

Next, a case is described where there are no sufficient data in the RLC buffer.

The number of resource blocks to be allocated $NUM_{RB}$ is recalculated by referring to the TF_related_table using the total size $Size_{all}$ of data in the MAC control block and the RLC buffer of all logical channels and $CQI_{TFR}$ as arguments $$Num_{RB}=DL\_Table\_TF\_RB(Size_{all}, \lfloor CQI_{TFR} \rfloor) \quad (11)$$

When the downlink transmission type is Distributed, RB groups in the Temporary RB group are removed by repeating a process in which the RB group having the least number of resource blocks is removed, or when there are two or more RB groups having the same least number of resource blocks, the RB groups are sequentially removed in the ascending order of the RB group number as long as the number of resource blocks to be used for transmission is equal to or greater than $NUM_{RB}$ (removed RB groups are used as (k+1)th radio resource or later of the user equipment (UE)). The number of resource blocks in the Temporary RB group after the process is performed is defined as $NUM_{RB,F}$.

When the downlink transmission type is not Distributed, RB groups in the Temporary RB group are removed by repeating a process in which the RB group having the least value of $CQI_{adjusted}$ is removed, or when there are two or more RB groups having the same least value of $CQI_{adjusted}$, the RB groups are sequentially removed in the ascending order of the number of resource blocks included in the RB groups, or when there are two or more RB groups having the same least value of $CQI_{adjusted}$ and the same least number of resource blocks, the RB groups are sequentially removed in the descending order of the RB group number as long as the number of resource blocks to be used for transmission is equal to or greater than $NUM_{RB}$.

The RB groups removed in the above process are used as (k+1)th radio resource or later. The number of resource blocks in the Temporary RB group after the process is performed is defined as $Num_{RB,F}$.

$$\text{Size}=DL\_Table\_TF\_SIZE(Num_{RB,F}, \lfloor CQI_{TFR} \rfloor)$$

$$\text{Modulation}=DL\_Table\_TF\_Mod(Num_{RB,F}, \lfloor CQI_{TFR} \rfloor) \quad (12)$$

Next, an RV Selection (Redundancy Version Selection) process in step S414 is described.

The RV parameter in each retransmission time (a value which is zero (0) in the initial transmission) is set via the external input interface (I/F). The base station apparatus (eNB) 200 determines the value of the RV parameter based on the value of RSN. The RSN is set based on the estimated number of receiving the MAC PDU. Namely the RSN is set based on the number of NACK of the HARQ-ACK for DL-SCH which is the acknowledgement information of the downlink shared channel (DL-SCH) received in Uplink (when a result of the ACK/NACK/DTX determination result of the HARQ-ACK for DL-SCH is DTX, a value of RSN is not incremented).

In step S416, the value of k is incremented. In step S418, it is determined whether the value of k is equal to or less than $N_{DL-SCH}$. When determining that the value of k is equal to or less than $N_{DL-SCH}$ (YES in step S418), the process goes back to step S410. On the other hand, when determining that the value of k is not equal to or less than $N_{DL-SCH}$ (NO in step S418), the process is terminated.

Next, the base station apparatus 200 according to an embodiment of the present invention is described with reference to FIG. 7.

Figure 7:
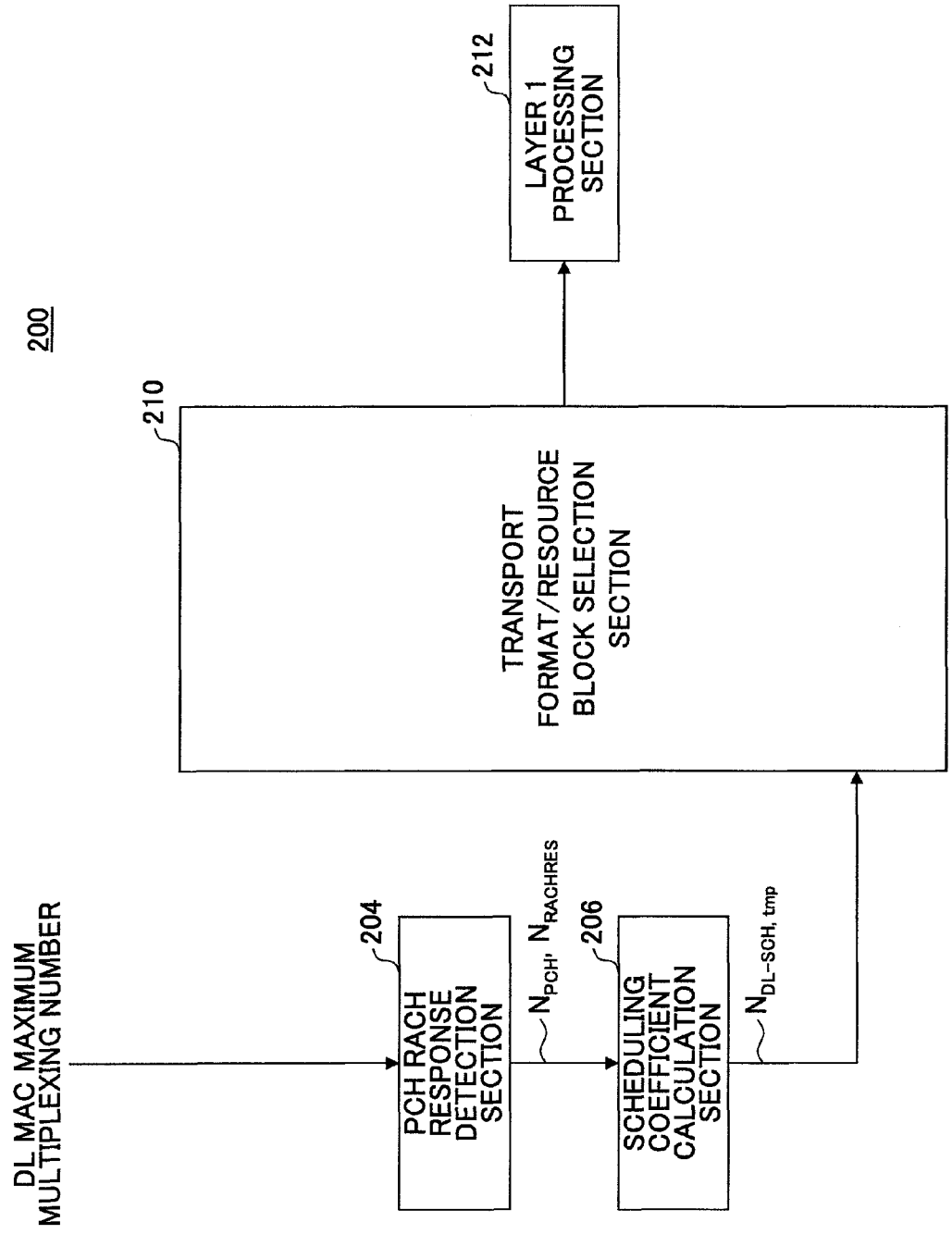
FIG. 7 is a partial block diagram of a base station apparatus according to an embodiment of the present invention.

As shown in FIG. 7, the base station apparatus 200 according to an embodiment of the present invention includes a PCH RACH response detection section 204, a scheduling coefficient calculation section 206 (as a selection unit), a transport format/resource block selection section 210 (as an allocation section), and a layer 1 processing section 212.

The PCH RACH response detection section 204 performs the process of step S206 described above. Specifically, the PCH RACH response detection section 204 counts the numbers of PCH and RACH response in the sub-frame and reports the results (counted numbers) to the scheduling coefficient calculation section 206.

The scheduling coefficient calculation section 206 performs the process of step S208. Specifically, the scheduling coefficient calculation section 206 selects user equipment (UE) terminals to which the radio resources are allocated based on the Dynamic scheduling in the sub-frame and reports the number "$N_{DL-SCH}$" of user equipment (UE) terminals to which the radio resources are allocated based on the Dynamic scheduling to the transport format/resource block selection section 210.

The transport format/resource block selection section 210 performs the process of steps S212 and S214. Specifically, the transport format/resource block selection section 210 performs downlink transport format and resource selection. More specifically, the transport format/resource block selection section 210 determines transmission formats and allocates radio resources related to common channels such as the Synchronization channel (SCH), the Broadcast Channel (BCH), the Paging Channel (PCH), and the Random Access Channel (RACH) response (RACH response), the Downlink Shared Channel (DL-SCH) to which the Persistent Scheduling is applied, and the Downlink Shared Channel (DL-SCH) to which the Dynamic Scheduling is applied.

The layer 1 processing section 212 performs a process related to the layer 1.

Next, a user equipment (UE) terminal $100_n$ is described with reference to FIG. 8.

Figure 8:
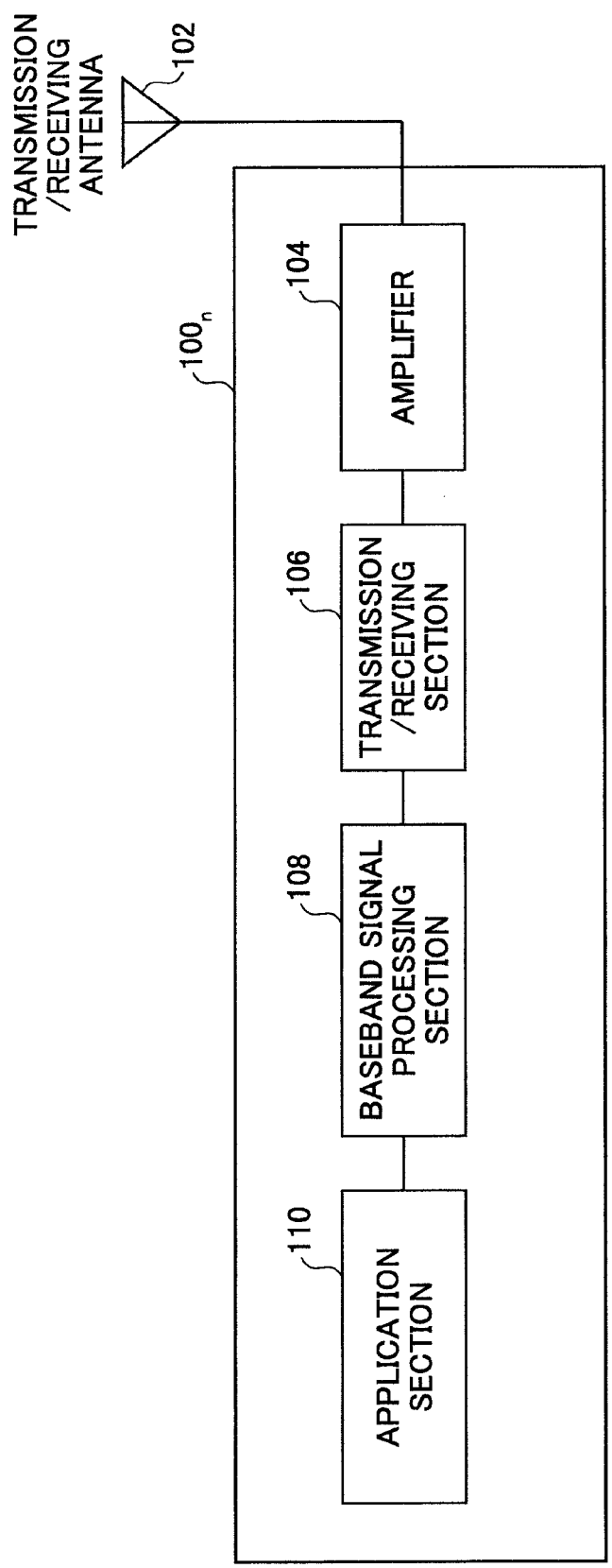
FIG. 8 is a partial block diagram of a user equipment terminal according to an embodiment of the present invention.

As shown in FIG. 8, the user equipment (UE) terminal $100_n$ includes a transmission/receiving antenna 102, an amplifier 104, a transmission/receiving section 106, a baseband signal processing section 108, and an application section 110.

Regarding downlink data, a radio-frequency signal received by the transmission/receiving antenna 102 is amplified in the amplifier 104 and frequency-converted into a baseband signal in the transmission/receiving section 106. This baseband signal is FFT processed and reception processed such as error correction decoded and retransmission controlled in the baseband signal processing section 108. Downlink user data of the downlink data are transmitted to the application section 110. The application section 110 performs, for example, processes related to a layer higher than the physical layer or the MAC layer.

In this case, when the system bandwidth is 5 MHz, the baseband signal processing section 108 may have a capability of receiving Broadcast Channel (BCH) as shown in FIG. 5. Namely the baseband signal processing section 108 may have a capability of receiving the Broadcast Channel (BCH) (CCPCH as a Physical Channel) mapped to sub-carriers shifted from the resource blocks to which downlink shared channel (DL-SCH) is mapped by 90 kHz (6 sub-carriers).

On the other hand, uplink data are transmitted from the application section 110 to the baseband signal processing section 108. The baseband signal processing section 108 performs a transmission process of retransmission control (H-ARQ (Hybrid ARQ)), channel coding, an IFFT process and the like on the user data and outputs the user data to the transmission/receiving section 106. The transmission/receiving section 106 performs a frequency conversion to convert the baseband signal output from the baseband signal processing section 108 into a signal in radio frequency band. The signal is amplified in the amplifier 104 and transmitted from the transmission/receiving antenna 102.

Second Embodiment

A radio communication system having a base station apparatus according to this embodiment of the present invention is applied is similar to that described with reference to FIG. 1.

Similar to the first embodiment of the present invention described above, as shown in FIG. 1, the radio communication system 1000, which may be an Evolved UTRA (Universal Terrestrial Radio Access) and UTRAN (UTRA Network) system (a.k.a an LTE (Long Term Evolution) system or a super 3G system), includes a base station apparatus (eNB: eNode B) 200 and plural user equipment (UE) $100_n$ ($100_1$, $100_2$, $100_3$, ... $100_n$; n: an integer greater than zero (0)) (hereinafter, the user equipment (UE) may be referred to as a user equipment terminal(s)). The base station apparatus 200 is connected to an upper node station such as an access gateway apparatus 300. The access gateway apparatus 300 is connected to a core network 400. In this case, the user equipment (UE) terminals $100_n$ are in communication with the base station apparatus 200 in a cell 50 based on the Evolved UTRA and UTRAN radio communication scheme.

Each of the user equipment terminals ($100_1$, $100_2$, $100_3$, ... $100_n$) has the same configuration, functions, and status. Therefore, unless otherwise described, the term user equipment (UE) $100_n$ may be collectively used in the following descriptions.

As the radio access scheme in the radio communication system 1000, the OFDM (Orthogonal Frequency Division Multiplexing) scheme and the SC-FDMA (Single-Carrier Frequency Division Multiplexing Access) scheme are used in downlink and uplink communications, respectively. As described above, the OFDM scheme is a multi-carrier transmission scheme in which a frequency band is divided into plural sub-carriers having narrow frequency bands and data are mapped on each sub-carrier to be transmitted. The SC-FDMA scheme is a single-carrier transmission scheme in which a frequency band is divided so that different frequencies can be used among plural terminals and as a result, interferences between terminals can be reduced.

Next, communication channels used in the Evolved UTRA and UTRAN radio communication scheme are described.

In downlink communications, a Physical Downlink Shared Channel (PDSCH) that is shared among the user equipment terminals $100_n$ and a Physical Downlink Control Channel (PDCCH) are used. In downlink, user information and transport format information of a Downlink Shared Channel, the user information and the transport information of an Uplink Shared Channel, acknowledgement information of the Uplink Shared Channel and the like are reported via the Physical Downlink Control Channel (PDCCH). User data are transmitted via the Physical Downlink Shared Channel (PDSCH). The user data are transmitted via a Downlink Shared Channel (DL-SCH) as a transport channel.

In uplink communication, a Physical Uplink Shared Channel (PUSCH) that is shared among user equipment terminals $100_n$ and an LTE control channel are used. The LTE control channel has two types, one is to be time domain multiplexed with the Physical Uplink Shared Channel (PUSCH) and the other is to be frequency domain multiplexed with the Physical Uplink Shared Channel (PUSCH). The control channel to be frequency domain multiplexed with the Physical Uplink Shared Channel (PUSCH) is called a Physical Uplink Control Channel (PUCCH).

In uplink communication, a downlink Channel Quality Indicator (CQI) to be used for scheduling in downlink and an Adaptive Modulation and Coding (AMC) and acknowledgement information of the Downlink Shared Channel (HARQ (Hybrid Automatic Repeat reQuest) ACK information) are transmitted via the LTE control channel. Further, the user data are transmitted via the Physical Uplink Shared Channel (PUSCH). The user data are transmitted via an Uplink Shared Channel (UL-SCH) as a transport channel.

Next, a Downlink MAC (DL MAC) data transmission procedure as a communication control method performed in a base station apparatus according an embodiment of the present invention is described.

In this embodiment, a logical channel corresponds to, for example, a Radio bearer; and a Priority class corresponds to, for example, a priority level or Logical Channel Priority.

Next, an allocation unit of the transmission bandwidth of the Physical Downlink Shared Channel (PDSCH) is described. The allocation of the Physical Downlink Shared Channel (PDSCH) is performed with respect to each subframe by treating, for example, a Resource block group (hereinafter may be referred to as RB group) as a unit, the RB group being defined as a system parameter. Each RB group includes plural Resource Blocks (RBs), and a corresponding relationship between the RBs and the RB group is set as a system parameter via an external input interface (I/F). The relationship between the resource blocks and the RB group is treated as a system parameter; however the relationship may be specified using a fixed parameter in the apparatus. The allocation of the transmission bandwidth by treating the RB group as a unit may also be performed on the Physical Downlink Shared Channel (PDSCH) to which Persistent scheduling is applied. In the following, a case is described where the RB group is configured. However, without configuring the RB block, the allocation of the Physical Downlink Shared Channel (PDSCH) may be performed by treating the resource block as a unit.

Further, in the descriptions below, a dynamic scheduling corresponds to a first resource allocation method of dynamically allocating radio resources. When the dynamic scheduling is applied to the Downlink Shared Channel (DL-SCH), radio resources are allocated to arbitrary sub-frames with respect to the user equipment (UE). Further, in this case, various values may be set as the values of the transmission format including the allocation information of the resource blocks as frequency resources, modulation scheme, payload size, HARQ information items, such as a Redundancy version parameter, a process number and the like, and information items of an MIMO and the like. The transmission format, i.e., allocation information of the resource blocks as frequency resources, modulation scheme, payload size, HARQ information items, such as a Redundancy version parameter, a process number and the like, and information items of an MIMO and the like, is reported to the user equipment (UE) terminal using DL scheduling information mapped to the physical downlink control channel (PDCCH).

On the other hand, the Persistent scheduling is a scheduling method of allocating transmission opportunities at a predetermined cycle in accordance with a type of data or features of the application to transmit/receive data and corresponds to a second resource allocation method of allocating radio resources at the predetermined cycle. Namely, when the Persistent scheduling is applied to the Downlink Shared Channel (DL-SCH), the Downlink Shared Channel (DL-SCH) is transmitted using predetermined sub-frames with respect to the user equipment (UE). Further, in this case, predetermined values are set as the values of the transmission format including the allocation information of the resource blocks as frequency resources, modulation scheme, payload size, HARQ information items, such as the Redundancy version parameter, the process number and the like, and the information items of the MIMO and the like. Namely, the shared channel (radio resource) is allocated to the predetermined sub-frames, and the Downlink Shared Channel (DL-SCH) is transmitted using the predetermined transmission format. In this case, the predetermined sub-frames may be arranged, for example, at a predetermined cycle. Further, the predetermined transmission format is not necessarily fixed to one type, and so, plural types of transmission formats may be provided.

Figure 9:
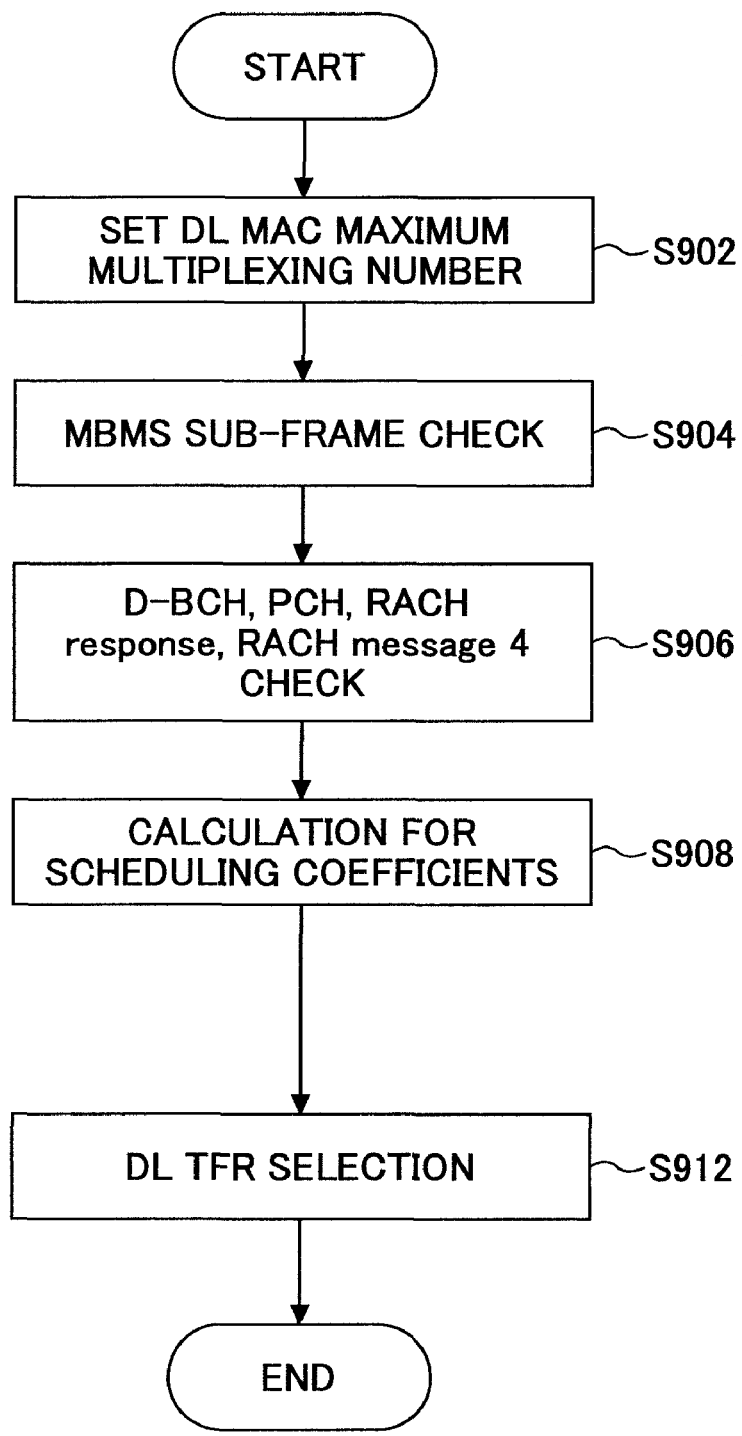
FIG. 9 is a flowchart showing a process of a DL MAC data transmission according to an embodiment of the present invention.

Next, a downlink MAC data transmission procedure is described with reference to FIG. 9. FIG. 9 shows a procedure from a scheduling process by calculating scheduling coefficients to a DL TFR selection process of determining the transport format and the RB group to be allocated.

As shown in FIG. 9, in step S902, a DL MAC maximum multiplexing number $N_{DLMAX}$ is set in the base station apparatus 200. The DL MAC maximum multiplexing number $N_{DLMAX}$ is the maximum multiplexing number in one sub-frame of the Downlink Shared Channel (DL-SCH) to which the Dynamic Scheduling is applied and is designated via the external input interface (I/F). Further, the DL MAC maximum multiplexing number $N_{DLMAX}$ may be the maximum number of the Downlink Scheduling Information transmitted in one sub-frame.

Next, in step S904, the base station apparatus 200 counts the number of MCHs (MCH number) in the sub-frame and defines the numbers as $N_{MCH}$. In this case, instead of using actual MCH number, the number of Downlink Scheduling Information for the MCH may be calculated as the MCH number.

Next, in step S906, the numbers of PCH, RACH response, D-BCH, and RACH message4 are counted, and the counted numbers are defined as $N_{PCH}$, $N_{RACHres}$, $N_{D-BCH}$ and $N_{RACHm4}$, respectively. In this case, however, as the numbers of the PCH, RACH response, D-BCH, and RACH message4, the number of Downlink Scheduling information for the PCH, the number of Downlink Scheduling information for the RACH response, the number of Downlink Scheduling information for the D-BCH, the number of Downlink Scheduling information for the RACH message4, respectively may be used. Further, in this process, with respect to the PCH, RACH response, D-BCH, and RACH message4, the numbers of the PCH, RACH response, D-BCH, and RACH message4 are counted. However, alternatively, only some of the PCH, RACH response, D-BCH, and RACH message4 may be counted, or a common channel other than the PCH, RACH response, D-BCH, and RACH message4 may similarly be counted, or a common channel other then any of the above channels may similarly be counted.

Next, in step S908, a calculation of scheduling coefficients is performed in the base station apparatus 200. In this step, the user equipment (UE) terminals in which radio resources are allocated based on the Dynamic scheduling in the sub-frame are selected. The number of user equipment (UE) terminals in which the radio resources are allocated based on the Dynamic scheduling in the sub-frame is defined as $N_{DL-SCH}$.

Next, in step S912, a Downlink Transport format and Resource selection (DL TFR) is performed. Namely, transmission formats are determined and the radio resources are allocated with respect to each of a Synchronization signal (also called a Synchronization Channel (SCH)), a Primary Broadcast Channel (P-BCH), a Dynamic Broadcast Channel (D-BCH), a Paging Channel (PCH), a Random Access Channel (RACH) response (RACH response, or message2 in random access procedure), the Downlink Shared Channel (DL-SCH) to which MCH and the Persistent Scheduling is applied, and the Downlink Shared Channel (DL-SCH) to which the Dynamic Scheduling is applied.

Next, the Calculation for Scheduling coefficients performed in step S908 is described with reference to FIG. 10.

Figure 10:
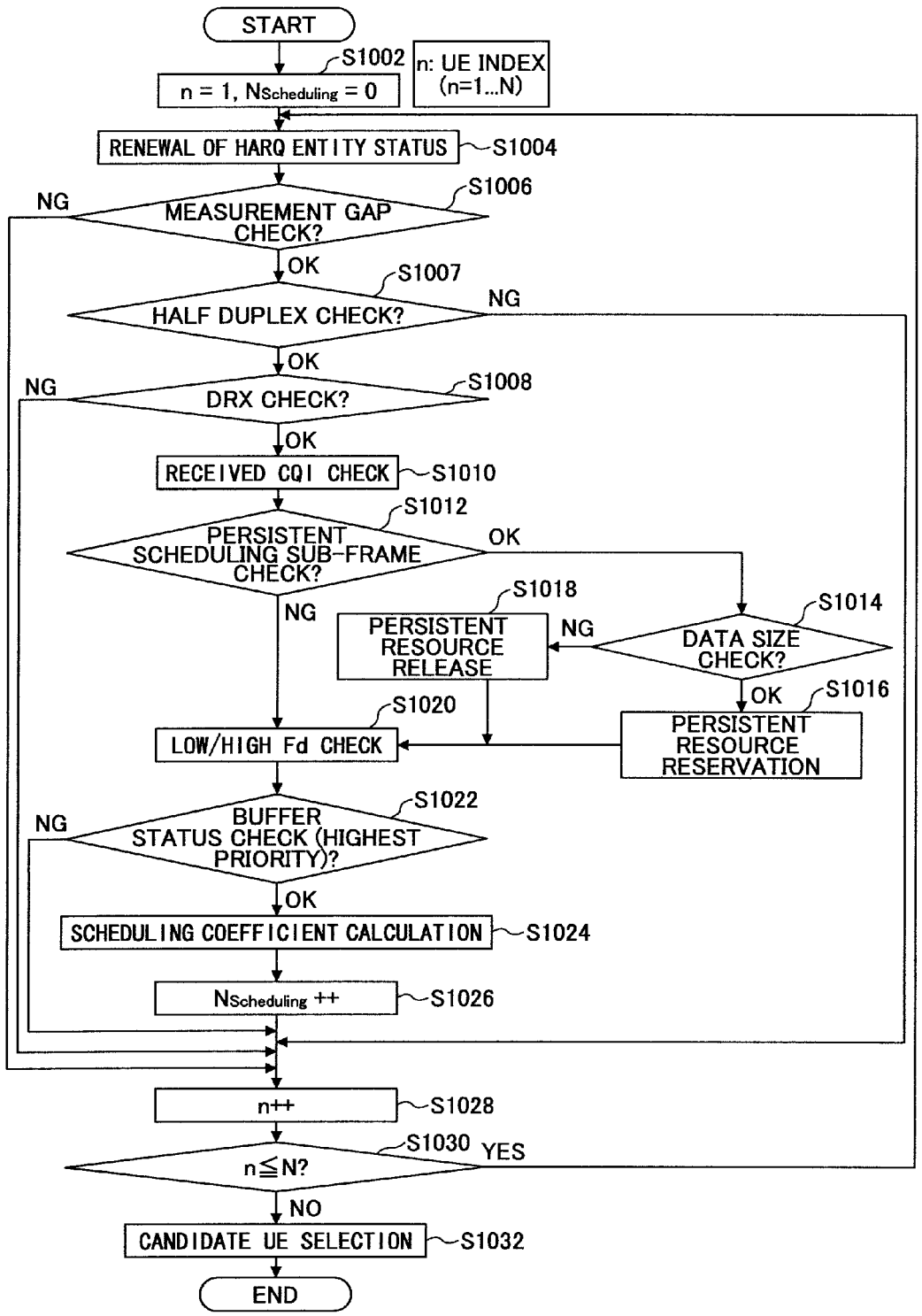
FIG. 10 is a flowchart showing a process of scheduling coefficient calculation and candidate UE selection according to an embodiment of the present invention.

FIG. 10 shows a process of selecting the user equipment (UE) terminal(s) in which radio resources are allocated based on the Dynamic scheduling by calculating the Scheduling coefficients. The base station apparatus 200 performs the following processes with respect to all the user equipment (UE) terminals in the LTE active state including, for example, in the RRC (Radio Resource Control) connecting state.

As shown in FIG. 10, in step S1002, formulas of n=1 and $N_{scheduling}=0$ are provided; where n denotes an index of the user equipment terminals $100_n$ and n=1, ..., N (N is an integer greater than 0).

Next, in step S1004, Renewal of HARQ (Hybrid Automatic Repeat reQuest) Entity Status is performed. In this step, in the user equipment (UE), a process receiving ACK as the acknowledgement information with respect to the Downlink Shared Channel (DL-SCH) is released. Further, a process in which the maximum number of retransmissions has been reached is also released and the user data in the process are discarded. The maximum number of retransmissions is set with respect to each Priority class via the external input interface (I/F). Further, it is assumed that the maximum number of retransmissions of MAC PDU (Protocol Data Unit), in which plural logical channels are multiplexed, complies with the maximum number of retransmissions of a logical channel having the highest Priority Class.

Next, in step S1006, a Measurement Gap Check is performed. More specifically, it is determined whether the sub-frame (i.e., the sub-frame transmitting the Downlink Shared Channel (DL-SCH)) is included in the Measurement Gap or whether the sub-frame receiving the acknowledgement information (ACK/NACK) with respect to the Downlink Shared Channel (DL-SCH) is included in the Measurement Gap. When determining that the sub-frame is included in the Measurement Gap or that the sub-frame receiving the acknowledgement information (ACK/NACK) is included in the Measurement Gap, an NG (signal) is returned, otherwise, an OK (signal) is returned. The Measurement Gap refers to a time interval when cells operating at a different frequency are measured for a different-frequency handover of the user equipment (UE), and during the time interval, communications cannot be performed and therefore, the user equipment (UE) cannot receive the Downlink Shared Channel (DL-SCH). Further, during the time period when measuring the cell operating at a different frequency, the user equipment (UE) cannot transmit the acknowledgement information (ACK/NACK). As a result, the base station apparatus 200 cannot receive the acknowledgement information (ACK/NACK). Accordingly, when a result of the Measurement Gap Check is NG (NG in step S1006), the user equipment (UE) terminal is excluded from a target of the scheduling process.

In this case, the cell operating at a different frequency may be a cell of the Evolved UTRA and UTRAN system or a cell of another system such as, for example, GSM, WCDMA, TDD-CDMA, CDMA 2000, or WiMAX system.

When determining that a result of the Measurement Gap Check is OK (OK in step S1006), the process goes to step S1007 in which a Half Duplex Check is performed. The Half Duplex refers to a communication method in which uplink transmission and downlink transmission are not performed simultaneously. In other words, in the Half Duplex, uplink transmission and downlink transmission are performed at different timings.

In the Half Duplex Check process, when the user equipment (UE) terminal performs the Half Duplex communication, the following six (6) determinations (D1 through D6 described below) may be made and if at least one result is YES (correct) among the six determinations, the NG may be returned, otherwise, the OK may be returned.

D1: whether the subframe, i.e., the sub-frame to transmit the downlink shared channel (DL-SCH), overlaps the sub-frame to transmit uplink shared channel (UL-SCH) in the user equipment (UE) terminal.

D2: whether the subframe, i.e., the sub-frame to transmit the downlink shared channel (DL-SCH), overlaps the sub-frame to transmit at least one of CQI (downlink radio quality information), a Sounding Reference Signal, a Scheduling Request (signal), and Random Access Channel (RACH) in the user equipment (UE) terminal.

D3: whether the subframe, i.e., the sub-frame to transmit the downlink shared channel (DL-SCH), overlaps the sub-frame to transmit the acknowledgement information (ACK/NACK) with respect to the downlink shared channel (DL-SCH) in the uplink of the user equipment (UE) terminal.

D4: when downlink shared channel (DL-SCH) is transmitted via the sub-frame, whether the sub-frame to transmit the acknowledgement information (ACK/NACK) with respect to the downlink shared channel (DL-SCH) in the uplink of the user equipment (UE) terminal overlaps the sub-frame to transmit the downlink shared channel (Synchronization Channel (SCH))/Primary Broadcast Channel (P-BCH)/Dynamic Broadcast Channel (D-BCH)/MBMS channel.

D5: when downlink shared channel (DL-SCH) is transmitted via the sub-frame, whether the sub-frame to transmit the acknowledgement information (ACK/NACK) with respect to the downlink shared channel (DL-SCH) in the uplink of the user equipment (UE) terminal overlaps the sub-frame to transmit the acknowledgement information (ACK/NACK) with respect to the uplink shared channel (DL-SCH) transmitted from the user equipment (UE) terminal before.

D6: when downlink shared channel (DL-SCH) is transmitted via the sub-frame, whether the sub-frame to transmit the acknowledgement information (ACK/NACK) with respect to the downlink shared channel (DL-SCH) in the uplink of the user equipment (UE) terminal overlaps the sub-frame to transmit the control information (Uplink Scheduling Grant and Downlink Scheduling Information) for uplink or downlink Persistent Scheduling.

Further, regarding the uplink and downlink channels relevant to the determinations, all of the corresponding channels may be considered, or only some of the corresponding channels may be considered. When a result of the Half Duplex Check process is NG (NG in step S1007), the user equipment (UE) terminal is excluded from a target of the scheduling process.

As described above, upon performing uplink transmission, the user equipment (UE) terminal in Half Duplex cannot perform downlink transmission. Therefore, by doing the process described above, namely by determining whether uplink transmission is to be performed in the sub-frame and performing a process not to transmit the downlink transmission, it may become possible to avoid the problem that the user equipment (UE) terminal in Half Duplex cannot receive a downlink transmission signal upon performing uplink transmission.

Further, in the six determinations described above, each determination may be made by considering a switching period required to switch between downlink reception and uplink transmission in the user equipment (UE) terminal. More specifically, for example, when the transmission timing of the acknowledgement information with respect to the downlink shared channel (DL-SCH) in the user equipment (UE) terminal or the transmission timing of the downlink shared channel (DL-SCH) in the base station apparatus overlaps the switching timing, the result of the Half Duplex Check process may be determined as "NG".

In the above example, the Half Duplex Check process is performed with respect to the user equipment (UE) terminal to communicate in Half Duplex mode. However, the Half Duplex Check process may be performed with respect to not only the user equipment (UE) terminal to communicate in Half Duplex mode but also the user equipment (UE) terminal to communicate in Full Duplex mode. Further, the Half Duplex Check process may be performed with respect to all the user equipment (UE) terminals to communicate in Full Duplex mode. Otherwise, the Half Duplex Check process may be performed with respect to the user equipment (UE) terminal communicating in Full Duplex mode and having a value of path loss between the user equipment (UE) terminal and the base station apparatus 200 greater than a threshold value; and, on the other hand, the Half Duplex Check process may not be performed with respect to the user equipment (UE) terminal communicating in Full Duplex mode and having a value of path loss between the user equipment (UE) terminal and the base station apparatus 200 less than the threshold value. In this case, uplink transmission and downlink transmission are not performed at the same time; therefore, it may become possible to avoid a problem that "uplink transmission signal in the user equipment (UE) terminal acts as an interference signal to a downlink receiving signal; and as a result, quality of downlink receiving signal is degraded" described below. Further, the Half Duplex Check process may be performed with respect to a user equipment (UE) terminal to communicate in Full Duplex mode in a cell or a frequency band which may be heavily influenced by the problem that "uplink transmission signal in the user equipment (UE) terminal acts as an interference signal to a downlink receiving signal; and as a result, quality of downlink receiving signal is degraded"; and on the other hand, the Half Duplex Check process may not be performed with respect to a user equipment (UE) terminal to communicate in Full Duplex mode in a cell or a frequency band which may not be heavily influenced by the problem that "uplink transmission signal in the user equipment (UE) terminal acts as an interference signal to a downlink receiving signal; and as a result, quality of downlink receiving signal is degraded".

When a result of the Half Duplex Check process is OK (OK in step S1007), the process goes to step S1008 in which a Discontinuous Reception (DRX) Check process is performed. In step S1008, it is determined whether the user equipment (UE) is in DRX (Discontinuous Reception) mode. When determining that the user equipment (UE) is in DRX mode, it is further determined whether the sub-frame is included in a DRX reception timing. When determining that the user equipment (UE) is in DRX (Discontinuous Reception) mode and the sub-frame is not included in the DRX reception timing, the "NG" is returned, otherwise the "OK" is returned. Namely when determining that "the user equipment (UE) is not in DRX mode" or that "the user equipment (UE) is in DRX mode and the sub-frame is included in the DRX reception timing", the OK is returned. Further, "in a case of not being in DRX mode", a value of $flag_{DRX}$ described below is set to 0 (zero); and "in a case of being in DRX mode and in DRX reception timing", the value of $flag_{DRX}$ is set to 1 (one). Herein, the DRX reception timing refers to a timing when data can be received during DRX mode. The DRX reception timing may also be called "On-duration". Further, when a state is in DRX mode and not in the DRX reception timing, the state corresponds to a sleep mode in which no downlink signal is to be received.

Further, when a state is in DRX mode and in a retransmission timing of the data transmitted via the Persistent resource (i.e., "Sub-frame of initial transmission+HARQ RTT"~"Sub-frame of initial transmission+HARQ RTT+DRX Retransmission Timer"), the state may be regarded as the state in DRX mode and the DRX reception timing. Herein, the "DRX Retransmission Timer" refers to a parameter indicating a section when retransmission with respect to the initial transmission may be performed and the parameter is set in advance between the base station apparatus and the user equipment (UE) terminal. Further, in the above example, the DRX Retransmission Timer is limited to the initial transmission. However, the DRX Retransmission Timer may be applied to a transmission other than the initial transmission. Further, the value of the HARQ RTT may be, for example, 8 sub-frames; otherwise, the value of the DRX Retransmission Timer may be, for example, 3 sub-frames. However, the values of 8 sub-frames and 3 sub-frames are examples only, and other values may also be applied.

When a result of the DRX Check process is NG (NG in step S1008), the user equipment (UE) terminal is excluded from a target of the scheduling process.

On the other hand, when the result of the DRX Check process is OK (OK in step S1008), the process goes to step S1010 in which a Received CQI (Channel Quality Indicator) Check process is performed. Namely, a value of CQI used in the sub-frame is obtained. For example, in a case where the base station apparatus 200 has ever received at least one CQI in the past from the user equipment (UE) terminal, the latest CQI across the system bandwidth (Wideband CQI) and a UE Selected Sub-band CQI are used in a process of step S1024 described below and the process in step S912. Further, for example, in a case where the base station apparatus 200 has never received—not even once—CQI from the user equipment (UE) terminal in the past, the CQI is set via the external input interface (I/F); namely a predetermined fixed CQI across the system bandwidth (Wideband CQI) is used in the process of step S1024 and the process of step S912. Further, the predetermined fixed CQI across the system bandwidth (Wideband CQI) may be, for example, stored as a parameter in the apparatus. Further, the predetermined fixed CQI across the system bandwidth (Wideband CQI) set via the external input interface (I/F) may be calculated based on received SIR of the user equipment (UE) terminal located at an edge portion of the cell.

Further, the base station apparatus 200 may determine the reliability of received CQI; and when determining that the reliability is low, the received CQI may be regarded as not-received. Namely the phrase "has ever received at least one CQI in the past" may be regarded as "has ever received at least one sufficiently reliable CQI in the past". Otherwise, the phrase "latest CQI across the system bandwidth (Wideband CQI) and a UE Selected Sub-band CQI" may be regarded as "among sufficiently reliable CQI, latest CQI across the system bandwidth (Wideband CQI) and a UE Selected Sub-band CQI". Otherwise, the term "has never received—not even once—CQI" may be regarded as "has never received—not even once—any sufficiently reliable CQI". Further, the reliability of received CQI may be determined based on, for example, the received quality of CQI such as the SIR of CQI signal and more specifically based on the SIR of a Demodulation Reference Signal. Namely when the received quality value of the CQI is equal to or greater than a predetermined threshold value, it may be determined that the reliability of the CQI is high; and when the received quality value of the CQI is less than the predetermined threshold value, it may be determined that the reliability of the CQI is low.

In step S1012, it is determined whether, in the sub-frame, the Persistent Resource is allocated to the user equipment terminal. Herein, the Persistent Resource refers to a Resource block reserved for the Persistent Scheduling. The Persistent scheduling is a scheduling method of allocating transmission opportunities at a predetermined cycle in accordance with a type of data or features of the application to transmit/receive data. Further, the type of data may include data of Voice Over IP, Streaming data or the like. The Voice Over IP and the Streaming data correspond to the applications.

Herein, the Persistent Resource may be a resource allocated for the initial transmission of the HARQ. In this case, when the data are retransmitted, the data are transmitted as the downlink shared channel (DL-SCH) to which the Dynamic Scheduling is applied. Namely regarding the retransmission of the data, the transmission is performed by selecting the user equipment (UE) terminal to transmit the data based on a UE selection process of S1032 described below.

When determining that the Persistent resource is to be allocated (OK in step S1012), the process goes to step S1014 in which a Data Size Check process is performed. When determining that the Persistent resource is not to be allocated (NG in step S1012), the process goes to step S1020 in which the Localized/Distributed Check process is performed. In localized (transmission), it may be advantageous to allocate relatively consecutive frequency blocks (resource blocks) based on CQI because a fading frequency in a propagation environment between the user equipment (UE) and the base station apparatus 200 is (relatively) small. On the other hand, in Distributed (transmission), it may be advantageous to allocate frequency blocks (resource blocks) which are relatively discretely distributed (separated) from each other regardless of the CQI values because the fading frequency in a propagation environment between the user equipment (UE) and the base station apparatus 200 is (relatively) large. Further, the term "Localized" may also be called "Low Fd" (Fd: Fading frequency) and the term "Distributed" may also be called "High Fd" (Fd: Fading frequency).

In step S1014, it is determined whether a size of the transmittable data of the logical channel of the user equipment is equal to or greater than a threshold value $Threshold_{data\_size}$, the Persistent scheduling being applied to the logical channel. When determining that the size of the transmittable data is equal to or greater than the threshold value $Threshold_{data\_size}$ (NG in step S1014), the process goes to step S1018 in which the Persistent Resource Release process is performed. On the other hand, when determining that the size of the transmittable data is less than the threshold value $Threshold_{data\_size}$ (OK in step S1014), the process goes to step S1016 in which a Persistent Resource Reservation process is performed. In this case, it may be set in advance whether the Persistent Scheduling is applied to each logical channel. For example, it may be determined that the Persistent Scheduling is applied to a logical channel transmitting VoIP data and the Dynamic Scheduling is applied to the other logical channels.

Further, as the threshold value $Threshold_{data\_size}$, for example, the maximum value that can be transmitted by the Persistent resource may be set.

In step S1016, the Persistent Resource to be allocated to the logical channel of the user equipment (UE) is reserved, the Persistent scheduling being applied to the logical channel. Further, the calculation of the scheduling coefficients described below is also performed with respect to the user equipment (UE) terminal to which the Persistent Resource is applied in the sub-frame. Further, when the radio resources are allocated to the logical channel to which the Dynamic Scheduling is applied in the sub-frame, the Persistent Resources are released, and the logical channel to which the Persistent scheduling is applied and the logical channel to which the Dynamic scheduling is applied are multiplexed with the Resource applied for the logical channel to which the Dynamic scheduling is applied, so that the MAC PDU (DL-SCH) is transmitted.

Further, the calculation of the scheduling coefficients in step S1024 described below is also performed with respect to the user equipment (UE) terminal to which the Persistent Resource is applied in the sub-frame. Further, when transmission resources are allocated for the logical channel to which the Dynamic Scheduling is applied in the sub-frame, the Persistent Resources are released, and the MAC PDU (DL-SCH) is transmitted to the user equipment (UE) terminal by using the Resource allocated for the logical channel to which the Dynamic scheduling is applied. The method of multiplexing the data in the RLC buffer of the MAC control block and each logical channel with the MAC PDU is shown in step S912.

Herein, the MAC control block refers to control information of the MAC layer; otherwise, the MAC control block may be header information of the MAC layer.

In step S1018, the Persistent Resources to be allocated to the logical channel of the user equipment (UE) terminal are released, the Persistent scheduling being applied to the logical channel. In this case, with respect to the Persistent Resources, it is assumed that only the sub-frame is released; and at the next timing when the next Persistent Resource is allocated, the Data Size Check process (in step S1014) is to be performed again.

In step S1020, the downlink transmission type (DL Transmission type) of the user equipment (UE) terminal is determined. Namely, it is determined whether the downlink transmission type is Localized (transmission) or Distributed (transmission). Further, the transmission type may be commonly managed with respect to both downlink transmission and uplink transmission.

For example, when the Fd estimation value of the user equipment (UE) terminal is equal to or less than the threshold value $Threshold_{Fd,DL}$, it is determined that the transmission type is Localized (transmission). Otherwise, it is determined that the transmission type is Distributed (transmission). As described above, the Localized transmission may also be called Low Fd, and the Distributed transmission may also be called High Fd.

As the Fd estimation value, a value reported in the RRC message such as the Measurement report from the user equipment (UE) terminal or a value calculated based on a time correlation value of the Sounding reference signal transmitted from the user equipment (UE) terminal may also be used. Otherwise, the Fd estimation value may be calculated based on the time correlation value of the Demodulation Reference Signal in the Physical Uplink Shared Channel (PUSCH) transmitted from the user equipment (UE) terminal. Otherwise, the Fd estimation value may be calculated based on the time correlation value of the Demodulation Reference Signal in the Physical Uplink Control Channel (PUCCH) transmitted from the user equipment (UE) terminal. Via the Physical Uplink Control Channel (PUCCH), the acknowledgement information with respect to the downlink shared channel (DL-SCH) and the downlink quality information (CQI (Channel Quality Indicator)) are transmitted.

Next, in step S1022, a Buffer Status Check is performed. More specifically, with respect to the logical channel of the user equipment (UE), it is determined whether there are transmittable data in the sub-frame. Namely the base station apparatus 200 determines whether there are transmittable data in the data buffer with respect to each logical channel of the user equipment (UE). When determining that there are no transmittable data in any of the logical channels, the NG is returned. On the other hand, when determining that there are transmittable data in at least one logical channel, the OK is returned. Herein, the transmittable data includes the data that can be newly transmitted or the data that can be retransmitted.

However, in the following, exceptional processes in checking the buffer status are described.

With respect to the Logical channel when the transmission window of the RLC layer is Full and in stall mode, it is assumed that there are no transmittable data.

When it is decided that an instruction for the handover between the base station apparatuses is to be sent to the user equipment (UE) terminal, with respect to a DTCH (Dedicated Traffic CHannel) in the logical channel of the user equipment (UE) terminal, it is assumed that there are no transmittable data. Namely in this case, only the Downlink Control Channel (DCCH) in the logical channel of the user equipment (UE) terminal is assumed to be transmittable data. Further, with respect to MAC control block, only when there is a MAC control block transmittable upon the transmission of the Downlink Control Channel (DCCH), the transmission is performed. Further, with respect to the MAC control block, it may be assumed that there are transmittable data regardless of the existence of the Downlink Control Channel (DCCH). Otherwise, it may be assumed that there are no transmittable data regardless of the existence of the Downlink Control Channel (DCCH).

When the user equipment (UE) terminal hands over from another base station (the source base station) apparatus to the base station apparatus, it is assumed that there are no data transmittable to the user equipment (UE) terminal until it is determined that data can be transmitted to the user equipment (UE) terminal. In this case, the base station apparatus 200 may determine that data can be transmitted to the user equipment (UE) terminal when, for example, the data transmission from the other base station (the source base station) apparatus to the base station apparatus is completed and a Status Report of the PDCP layer is received. Further, the completion of the data transmission from the other base station (the source base station) apparatus to the base station apparatus may be defined by when, for example, a timer is up by setting the timer to count time required (estimated) to complete the data transmission. Further, it is assumed that the determination of whether the Status Report of the PDCP layer is received is performed with respect to only the logical channel designated for the transmission of the Status Report of the PDCP layer.

When the uplink synchronization status of the user equipment (UE) terminal shows the synchronization loss, or when status of an uplink dedicated resource is NG, it is assumed that there are no transmittable data with respect to the DTCH of the user equipment (UE) terminal and that only DCCH or MAC control block is regarded as the transmittable data.

When the Persistent Resource is reserved in the sub-frame (i.e., the process of step S1016 is performed), it is assumed that there are no transmittable data with respect to the logical channel (the logical channel to which the Persistent Scheduling is applied). However, even in this case, in the process of multiplexing the data in the RLC buffer of the MAC control block and each Logical Channel with the MAC PDU in step S912, it is assumed that there are transmittable data.

When only there is a MAC control block as the transmittable data, the transmittable data are treated as the logical channel belonging to the same Priority class as the DCCH belongs. Namely, when only there is a MAC control block as the transmittable data, it is assumed that there is a signal corresponding to transmittable DCCH.

When the Persistent Resource is not reserved in the sub-frame (i.e., the process of step S1016 is not performed), the following process is performed with respect to the Logical Channel to which the Persistent Scheduling is applied.

When the Data size of the new transmittable data is equal to or greater than the threshold value Threshold$_{data\_size}$, or when there are retransmittable data, it is assumed that there are transmittable data.

On the other hand, when the Data size of the new transmittable data is less than the threshold value Threshold$_{data\_size}$, it is assumed that there are no transmittable data.

By performing this process, it may become possible to avoid that, in the sub-frame to which the Persistent Resource is not allocated, the transmission resource is allocated to the data to which Persistent Scheduling is to be applied. Further, unless otherwise described, a result of the determination "whether there is transmittable data related to each logical channel" is also applied of the process of multiplexing the data in the RLC buffer of the MAC control block and each Logical Channel with the MAC PDU in step S912. Namely when determining that "there are no transmittable data", it is assumed that there are no transmittable data as well in the process of multiplexing the data in the RLC buffer of the MAC control block and each Logical Channel with the MAC PDU in step S912.

When a result of the Buffer Status Check process is NG (NG in step S1022), the user equipment (UE) terminal is excluded from a target of the scheduling process. On the other hand, when the result of the Buffer Status Check process is OK (OK in step S1022), the logical channel having the Highest priority is selected from among the logical channel having the transmittable data based on the following Selection logics, and the process goes to step S1024 in which the Scheduling Coefficient Calculation process is performed.

Selection logic 1: The logical channel having the highest priority is defined as the logical channel having the Highest priority.

Selection logic 2: When there are plural logical channels satisfying the Selection logic 1, the logical channel(s) having the transmittable data is defined as the logical channel(s) having the Highest priority.

Selection logic 3: In a case where there are plural logical channels satisfying the Selection logic 2, when there is a Dedicated Control Channel (DCCH), the Dedicated Control Channel (DCCH) is defined as the logical channel having the Highest priority; and when there is no Dedicated Control Channel (DCCH), any of the logical channels from among the plural logical channel is determined as the logical channel having the Highest priority.

When those selection logics are applied, not the retransmission data of the logical channel having a lower priority but the new data of the logical channel having a higher priority are more likely to be determined as the data of the logical channel having higher priority.

The above-described process that the user equipment is excluded from a target of the scheduling process in steps S1006, S1008, and S1002 means that the Scheduling Coefficient Calculation process described below is not to be performed. As a result, in the sub-frame, a Downlink Shared Channel (DSCH) is not transmitted to the user equipment (UE). In other words, the base station apparatus 200 performs the scheduling with respect to the user equipment (UE) terminals other than the user equipment (UE) terminals determined to be excluded from the targets of the scheduling in the above steps S1006, S1008, or S1002; namely the base station apparatus 200 selects user equipment (UE) terminals to which the shared channel is to be transmitted and transmits downlink shared channel (DL-SCH) to the selected user equipment (UE) terminals.

In step S1024, with respect to the logical channel determined as the logical channel having the Highest priority in step S1022, the Scheduling coefficients are calculated based on an evaluation formula described below. Namely when there are plural logical channels with respect to a certain user equipment (UE) terminal, the Scheduling Coefficient Calculation is not performed on all the logical channels but is performed only on the logical channel having the highest priority. By doing this, it may become possible to reduce the processing load of the base station apparatus 200.

Tables 5 through 9 show parameters set via the external input interface (I/F).

TABLE 5

| No | Parameter name | Set with respect to each | Remarks |
|---|---|---|---|
| 1 | $A_{pc}$ | Priority class | This is a Priority Class Priority level coefficient. Priority Class refers to an index or class indicating a priority level of data defined with respect to each logical channel. |
| 2 | $D(\text{flag}_{DRX})$ | UE | A DRX priority level coefficient given to preferentially transmit data of UE in DRX mode and DRX reception timing. In the sub-frame, this value is set based on a value of flag "$\text{flag}_{DRX}$" related to the UE. When $\text{flag}_{DRX} = 0$, $D(0)$ is set to a fixed value 1.0 ($D(0) = 1.0$), and only when $\text{flag}_{DRX} = 1$, this value is set via external input interface (I/F). For example, when $\text{flag}_{DRX} = 1$, by setting $D(\text{flag}_{DRX})$ to 2.0 ($D(\text{flag}_{DRX}) = 2.0$), it becomes possible to preferentially transmit data of UE in DRX mode and DRX reception timing. It is assumed that in DRX mode and DRX reception timing, $\text{flag}_{DRX}$ is set to 1 ($\text{flag}_{DRX} = 1$), otherwise, $\text{flag}_{DRX}$ is set to 0 ($\text{flag}_{DRX} = 0$). |

TABLE 5-continued

| No | Parameter name | Set with respect to each | Remarks |
|---|---|---|---|
| 3 | $E_{PC}(\text{Num}_{retex})$ | Priority class | This is a retransmission priority coefficient used to preferentially transmit data to UE having a large number of retransmission of HARQ. When there are plurality of Processes having retransmission data, a value of the largest number of the retransmission is defined as $\text{Num}_{retex}$. Depending on the value of the number of retransmission times, the setting value of $E_{PC}(\text{Num}_{retex})$ is set as described above via the external input interface (I/F). For example, as shown in the table below By increasing the value of $E_{PC}(\text{Num}_{retex})$ as the value of $\text{Num}_{retex}$ increases, it becomes possible to preferentially transmit data to UE having a large number of retransmission of HARQ. <br><br> $\text{Num}_{retex}$ / setting value of $EPC(\text{Num}_{retex})$ <br> 0 / 1.0 <br> 1 / 1.2 <br> 2, 3 / 1.8 <br> 4-16 / 2.5 |

TABLE 6

| No | Parameter name | Set with respect to each | Remarks |
|---|---|---|---|
| 4 | $F_{PC}(t_{RLC\_buffered})$ | Priority class | This is a residence time priority level coefficient used to preferentially transmit data to UE in which buffer residence time of RLC is long. The buffer residence time of RLC SDU related to a logical channel having the Highest priority is used as an argument. The definition of buffer residence time of RLC SDU is defined as an elapsed time (unit: ms) from when "RLC SDU" is stored in Queue buffer provided with respect to each logical channel. Herein the timing of "when RLC SDU is stored in Queue buffer" is the same between for the retransmission and for the initial transmission. If there are RLC SDU having different Buffer residence time, the RLC SDU having the longest Buffer residence time is defined as $\text{flag}_{DRX}$. This value is set based on the the buffer residence time "$t_{RLC\_buffered}$" of RLC SDU as follows: <br> $[t_{RLC\_buffered} < \text{Th}_{PC}^{(RLC\_buffered,1)}]$ <br> $F_{PC}(t_{RLC\_buffered}) = 0.0$ <br> $[\text{Th}_{PC}^{(RLC\_buffered,1)} \leq t_{RLC\_buffered} < \text{Th}_{PC}^{(RLC\_buffered,2)}]$ <br><br> $F_{PC}(t_{RLC\_buffered}) = \dfrac{t_{RLC-buffered} - \text{Th}_{LCP}^{(RLC\_buffered,1)}}{\text{Th}_{LCP}^{(RLC-buffered,2)} - \text{Th}_{LCP}^{(RLC\_buffered,1)}}$ <br><br> However when $\text{Th}_{LCP}^{(RLC-buffered,1)} = \text{Th}_{LCP}^{(RLC-buffered,2)}$ is satisfied, this process is ineffective. <br> $[\text{Th}_{PC}^{(RLC\_buffered,2)} \leq t_{RLC\_buffered}]$ <br> $F_{PC}(t_{RLC\_buffered} \geq \text{Th}_{PC}^{(RLC\_buffered)}) = 1.0$ <br><br> 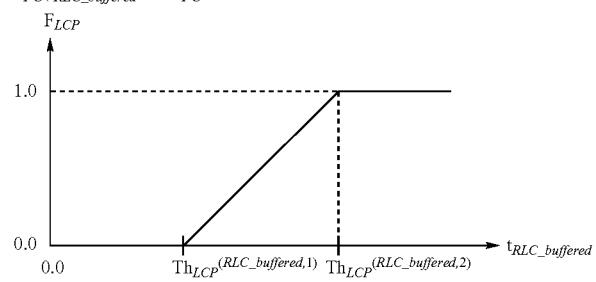 <br><br> As described above, by increasing the value $F_{PC}(t_{RLC\_buffered})$ when the buffer residence time "$t_{RLC\_buffered}$" of RLC SDU exceeds a predetermined value $\text{Th}_{PC}^{(RLC\_buffered)}$, it becomes possible to preferentially transfer data to UE having longer Buffer residence time of RLC. |

TABLE 7

| No | Parameter name | Set with respect to each | Remarks |
|---|---|---|---|
| 5 | $Th_{pc}^{(RLC\_buffered, 1)}$ | Priority class | This is a threshold value related to the Buffer residence time of the RLC SDU. |
| 6 | $Th_{pc}^{(RLC\_buffered, 2)}$ | Priority class | This is a threshold value related to the Buffer residence time of the RLC SDU. |
| 7 | $G(flag_{control})$ | UE | This is a MAC control block priority level coefficient used to preferentially transfer data to UE having MAC control block to be transmitted. In the sub-frame, this value is set based on a value of $flag_{control}$ of UE. When $flag_{control} = 0$, $G(0)$ is set to a fixed value 1.0 ($G(0) = 1.0$), and only when $flag_{control} = 1$, this value is set via external input interface (I/F). For example, when $flag_{control} = 1$, by setting $G(flag_{control})$ to 2.0 ($G(flag_{control}) = 2.0$), it becomes possible to preferentially transmit remaining data of UE having the MAC control block to be transmitted. It is assumed that when there is MAC control block to be transmitted, $flag_{control}$ is set to 1($flag_{control} = 1$), otherwise, $flag_{control}$ is set to 0 $flag_{control} = 0$).. |
| 8 | $R_{pc}^{(target)}$ | Priority class | This is a target data rate (bits/sub-frame) |
| 9 | $\alpha^{(CQI)}$ | UE | This is a weighting coefficient with respect to priority level based on CQI. By using this parameter, it becomes possible to put weighting on priority levels based on CQI. |

Table 9 shows input parameters given to each logical channel of each user equipment (UE) terminal by treating the sub-frame as a unit.

TABLE 9

| No. | Parameter name | Remarks |
|---|---|---|
| 1 | $PC_{n,k}$ | This parameter indicates Priority Class of the logical Channel #k of UE#n. Priority class refers to an index or class indicating a priority level of data defined with respect to each logical channel. |
| 2 | $R_n$ | This parameter indicates Instantaneous transmittable Data Rate (bits/sub-frame) of UE#n calculated based on the following formula: $R_n = DL\_Table\_TF\_SIZE(RB\_all, \lfloor CQIreceived \rfloor)$ Where RB_all: the number of RBs across the system bandwidth Further, "CQIreceived" is calculated as follows: (when DL transmission type = Distributed) CQIreceived = CQI related to across the system bandwidth (when DL transmission type = Localized) CQIreceived = CQI of RBgroup having the highest quality The definition of the RBgroup corresponds to the definition of the RB groups of CQI reported from UE. |
| 3 | $\overline{R}_{n,k}$ | This parameter indicates the Average Data Rate (bits/sub-frame) of logical channel #k of UE#n. $\overline{R}_{n,k}(TTI) = \delta_{n,k} \overline{R}_{n,k}(TTI - 1) + (1 - \delta_{n,k}) * r_{n,k}$ $r_{n,k}$: instantaneous data rate As the initial value of $\overline{R}_{n,k}$, $R_{n,k}$ calculated in the sub-frame is used $\delta_{n,k}$: forgetting coefficient which is a variable changing with respect to each calculation period Calculation of $\overline{R}_{n,k}$ is performed at every sub-frame based on update timing with respect to not only a logical channel having the Highest Priority but also any other logical channels. |

TABLE 8

| No | Parameter name | Set with respect to each | Remarks |
|---|---|---|---|
| 10 | $\alpha_{pc}^{(retx)}$ | Priority class | This is a weighting coefficient with respect to priority level based on the number of HARQ retransmissions. By using this parameter, it becomes possible to put weighting on priority levels based on the number of HARQ retransmissions. |
| 11 | $\alpha_{pc}^{(RLC\_bufferred)}$ | Priority class | This is a weighting coefficient with respect to priority levels based on Buffer residence amount of RLC. By using this parameter, it becomes possible to put weighting on priority levels based on the Buffer residence amount of RLC. |
| 12 | $\alpha_{pc}^{(rate)}$ | Priority class | This is a weighting coefficient with respect to priority levels based on Average Data Rate. By using this parameter, it becomes possible to put weighting on priority levels based on the Average Data Rate. |
| 13 | $\delta'_{pc}$ | Priority class | A convergence value of user data speed averaging forgetting coefficient for $\overline{R}_{n,k}$ |
| 14 | Scheduling priority group index | Priority class | An index of Scheduling priority group set with respect to each Priority class. Prioritization of each UE is performed in the order of "Scheduling priority group: High → Middle → Low". Further, in each of the Scheduling priority groups, prioritization is performed based on scheduling coefficients. The priority order of the scheduling priority group is defined as follows: High > Middle > Low. |

Based on the input parameters in Tables 5-8, the Scheduling coefficient $C_n$ of the logical channel #h having the Highest priority of the user equipment (UE) terminal #n is calculated based on formula (1) below.

$$C_n = D(flag_{DRX}) \times \alpha^{(CQI)} \cdot R_n \times \qquad (13)$$
$$\left(1 + \alpha_{LCP_h}^{(retx)} \cdot E_{LCP_h}(retx) + \alpha_{LCP_h}^{(RLC\_buffered)} \cdot F_{LCP_h}(t_{RLC\_buffered})\right) \times$$
$$G(flag_{control}) \times \exp\left(\alpha_{LCP_h}^{(rate)} \cdot \left(R_{n,h}^{(target)} - \overline{R}_{n,h}\right)\right)$$

Further, in a case of Intra-eNB Hand Over (Intra-eNB HO), it is assumed that the measured value and calculated value used for the Scheduling are not taken over into the Target eNB (eNB of handover destination).

In step S1024, the Average Data Rate is measured.

The Average Data Rate is obtained by using the formula (2) described above.

Where, $N_{n,k}(1, 2, \ldots)$ denotes the number of updating the Average Data Rate. However, in the sub-frame where $N_{n,k}=0$, the formula (3) described above is applied.

Further, a forgetting coefficient $\delta_{n,k}$ is calculated as follows.

$$\delta_{n,k} = \min(1 - 1/N_{n,k}, \delta'_{PCn,k})$$

An updating timing of the Average Data Rate is based on "every sub-frame where there are data to be transmitted to the data buffer of the logical channel #k of the base station apparatus 200". Further, $r_{n,k}$ is calculated as a transmitted "size of transmitted MAC SDU". Namely the calculation of the Average Data Rate is performed based on any of the following operations in the sub-frame when the Average Data Rate is to be updated.

1. For a user equipment (UE) terminal that transmits data, the Average Data Rate is calculated assuming "$r_{n,k}$=size of transmitted MAC SDU".

2. For a user equipment (UE) terminal that has not transmitted data, the Average Data Rate is calculated assuming "$r_{n,k}$=0".

In this case, the Average Data Rate is calculated when determining that at least one CQI is received in the past in the Received CQI Check process and conditions of updating the Average Data Rate are matched. Namely the calculation is started after the CQI is received at least once.

Next, in step S1026, $N_{scheduling}$ indicating the number of user equipment (UE) terminals that calculate the Scheduling coefficient is increased by 1 (one). In step S1028, a value of "n" indicating the index of the user equipment (UE) terminal is increased by 1 (one).

Next, in step S1030, it is determined whether n is equal to or less than N. When determining that n is equal to or less than N (YES in step S1030), the process goes back to step S1004.

On the other hand, when determining that n is greater than N (NO in step S1030), the process goes to step S1032 in which a UE Selection process is performed. More specifically, in step S1032, the user equipment (UE) terminal is selected in which the allocation of the radio resources is performed based on the Dynamic scheduling with respect to the sub-frame.

First, by the following formula, the number "$N_{DL-SCH}$" of user equipment (UE) terminals in which the radio resources are allocated based on the Dynamic scheduling (i.e., the number of user equipment (UE) terminals transmitting the Downlink Shared Channel (DL-SCH)) is calculated. Herein, a symbol $N_{Scheduling}$ denotes the number of user equipment (UE) terminals in which the Scheduling Coefficient Calculation process has been performed (see FIG. 10).

$$N_{DL-SCH} = \min(N_{scheduling}, N_{DLMAX} - N_{PCH} - N_{RACHres} - N_{D-BCH} - N_{RACHm4} - N_{MCH})$$

When the number "$N_{DL-SCH}$" of user equipment (UE) terminals transmitting the Downlink Shared Channel (DL-SCH)) is calculated, if inequality $N_{DL-SCH} < 0$ is satisfied, the transmission process of the sub-frame is sequentially prohibited in the order of RACH message4, RACH response, MCH, PCH, and D-BCH. When determined that the transmission of the sub-frame is prohibited in a channel, the channel is not transmitted using the sub-frame.

Next, top $N_{DL-SCH}$ user equipment (UE) terminals in which the resource blocks are allocated based on the Dynamic scheduling are selected, the top $N_{DL-SCH}$ user equipment (UE) terminals having larger Scheduling coefficients calculated in step S1024 with respect to each Scheduling priority group of the logical channel having the Highest priority. Namely user equipment (UE) terminals that become the transmission destinations of the downlink Shared Channel (DL-SCH) are selected. Herein, the Scheduling priority group refers to a group prioritized in the Scheduling process and a Scheduling priority group to which the logical channel is to belong is defined with respect to each logical channel. Namely each user equipment (UE) terminal is classified (hierarchized) into the Scheduling priority groups based on the logical channel having the Highest priority; and in each of the Scheduling priority groups, user equipment (UE) terminals to become the destinations of the downlink shared channel (DL-SCH) to which the Dynamic scheduling is applied are sequentially selected in the descending order of the Scheduling Coefficients calculated in step S1024 (i.e., the scheduling (process) is performed).

The above "user equipment (UE) terminals" are selected in accordance with the following order.

High($1^{st}$)->High($2^{nd}$)-> . . . ->Middle($1^{st}$)->Middle($2^{nd}$)-> . . . ->Low($1^{st}$)->Low($2^{nd}$)-> . . .

When the user equipment (UE) terminal has control information of the MAC layer to be transmitted in the sub-frame, the Scheduling priority group is set to "High" regardless of the Scheduling priority group of the logical channel having the Highest priority. Namely, the base station apparatus 200 performs the Scheduling assuming that, in the sub-frame, the user equipment (UE) terminal having the control information of the MAC layer to be transmitted belongs to the Scheduling priority group having higher priority level.

Further, in the above example, the Scheduling priority group has three types, High, Middle, and Low. However, for example, Super High may be added and defined. In this case, for example, a priority level flag which is set only when a congestion degree of the cell is high is defined, and the user equipment (UE) terminal or the logical channel in which the priority level flag is ON may be assumed to belong to the Super High Scheduling priority group. The user equipment (UE) terminal or the logical channel in which the priority level flag is set may transmit/receive an emergency call or a priority call. Further, when the congestion degree of the cell is high, the base station apparatus 200 may reserve resources in the base station apparatus 200 for the user equipment (UE) terminal or the logical channel in which the priority level flag is set. Further, the resources may include CPU capacity, memory capacity, baseband resource, transmission power resource, frequency resource, resource in time direction and the like. Further, to reserve the resources, the number of the user equipment (UE) terminals may be limited; namely the maximum number of user equipment (UE) terminals to be connected in the cell may be reduced.

Further, with respect to the user equipment (UE) terminal in which the priority level flag is set or the user equipment (UE) terminal having a logical channel in which the priority level flag is set, all the logical channel provided in the user equipment (UE) terminal may belong to the Super High Scheduling priority group. In this case, to any of the logical channels provided in the user equipment (UE) terminal, resources are preferentially allocated, i.e., shared channels are allocated.

The priority level flag may be reported from the core network.

As described above, it may become possible to calculate the Scheduling coefficients with respect to each user equipment (UE) terminal that is determined to be able to transmit the downlink shared channel (DL-SCH) by performing the loop process with respect to "n" which is the index of the user equipment (UE index). Further, the radio resources are allocated to the user equipment (UE) terminals having a greater calculated Scheduling coefficient value. Namely it may become possible to determine the user equipment (UE) terminals to which the radio resources (downlink shared channel (DL-SCH)) are allocated and transmit the downlink shared channel (DL-SCH) to the user equipment (UE) terminals based on the priority level of data, radio quality information reported from the user equipment (UE) terminal, the number of retransmission, whether there is control information of the MAC layer, frequency of allocation, the average data rate, and the target data rate, whether the handover process is being performed, whether it is in the reception timing of the intermittent reception process, whether it is in a residence time of data in the RLC (Radio Link Control) layer, and whether it is in the reception timing in the mode of measuring a cell operated at a different frequency by performing control of transmitting the downlink shared channel (DL-SCH), in which DL-SCH is transmitted to the user equipment (UE) terminals having larger scheduling coefficients.

In the above example, the Scheduling priority group has three types, High, Middle, and Low. However, four or more types of the Scheduling priority group may be provided, or two or less types of the Scheduling priority group may be provided.

For example, five types, i.e., $High_{MAC}$, $High_{DRX}$, High, Middle, and Low, of the Scheduling priority groups may be provided assuming that the priority level decreases in the order of $High_{MAC}$, $High_{DRX}$, High, Middle, and Low. Further, in this case, with respect to the user equipment (UE) terminals having an MAC control block to be transmitted, the Scheduling priority may be set to "$High_{MAC}$" regardless of the Scheduling priority group of the logical channel having the Highest priority. Further, with respect to the user equipment (UE) terminal in a DRX reception timing in DRX mode, the Scheduling priority group may be set "$High_{DRX}$" regardless of the Scheduling priority group of the logical channel having the Highest priority. By doing this, it may become possible to preferentially allocate the shared channel with respect to the user equipment (UE) terminal having the MAC control block to be transmitted and the user equipment (UE) terminal in the DRX reception timing in DRX mode. For example, when there are user equipment (UE) terminal(s) having the MAC control block and user equipment (UE) terminal(s) without the MAC control block, it may become possible to preferentially allocate the shared channel to the user equipment (UE) terminal(s) having the MAC control block regardless of the value of $C_n$ in formula (1).

In the above example, the priority level is set so that the priority level decreases in the order of $High_{MAC}$, $High_{DRX}$, High, Middle, and Low. However, this is just an example only, and, for example, the priority level may be set so that the priority level decreases in the order of High, $High_{MAC}$, $High_{DRX}$, Middle, and Low.

Next, the downlink TFR Selection (DL TFR Selection) process performed in step S912 is described with reference to FIG. 11.

Figure 11:
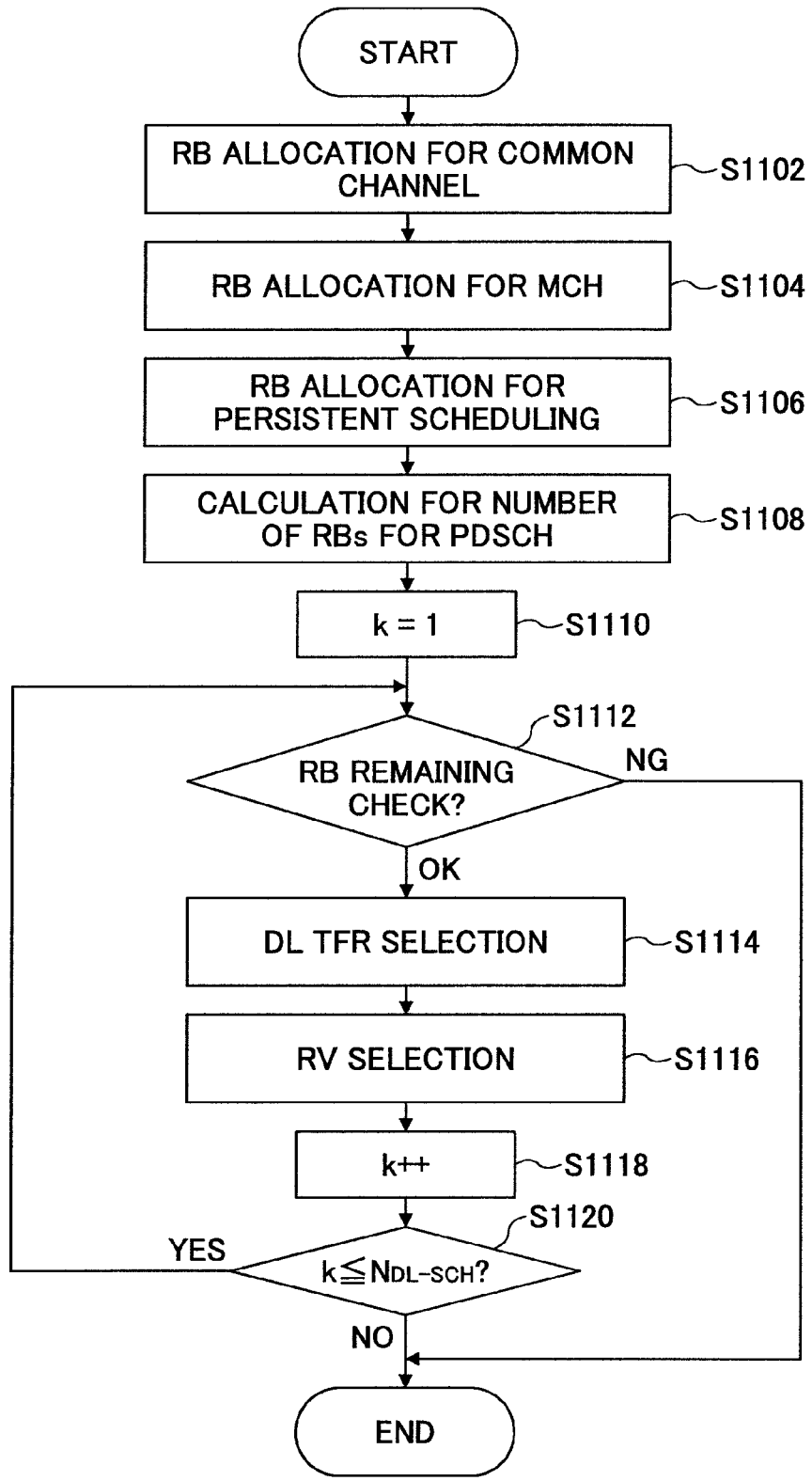
FIG. 11 is a flowchart showing a process of control for a TFR selection according to an embodiment of the present invention.

FIG. 11 shows a procedure of the DL TFR selection process. By performing this procedure, it may become possible to determine the transmission formats of and allocate the radio resources to the Synchronization Signal (also called a Synchronization channel (SCH)), the Primary Broadcast Channel (P-BCH), the Paging Channel (PCH), the Dynamic Broadcast Channel (D-BCH), the Random Access Channel (RACH) response (RACH response, or message2 in random access procedure), the Message4 in random access procedure, the MBMS channel (MCH), the Downlink Shared Channel (DL-SCH) to which the Persistent Scheduling is applied, and the Downlink Shared Channel (DL-SCH) to which the Dynamic Scheduling is applied. The above SCH, P-BCH, PCH, D-BCH, RACH response, RACH Message4 are called common channels.

First, in step S1102, Resource Blocks are allocated to the Common Channels (RB allocation for Common channel is performed).

When the Synchronization signal is transmitted using the sub-frame, six or seven resource blocks in the substantially center portion of the system bandwidth are allocated to the Synchronization signal. The RB group including the RB allocated to the Synchronization signal is not allocated to the downlink shared channel (DL-SCH) to which the Dynamic Scheduling is applied.

The above-mentioned resource blocks allocated to the Synchronization signal are treated as the resource blocks reserved for the Synchronization signal to prevent the resource blocks from being allocated to any other channel. However, not all the resource blocks having been reserved for the Synchronization signal are practically allocated to the Synchronization signal. Namely the Synchronization signal is allocated to only predetermined sub-carriers among all the resource blocks having been allocated for the Synchronization signal.

The transmission power of the Synchronization signal (total of transmission power of all the resource elements (sub-carriers); absolute value; unit is W) is defined as $P_{SCH}$.

When the Primary Broadcast Channel (P-BCH) is transmitted via the sub-frame, six or seven resource blocks in the substantially center portion of the system bandwidth are allocated to the Primary Broadcast Channel (P-BCH). The above-mentioned resource blocks allocated to the Primary Broadcast Channel (P-BCH) are treated as the resource blocks reserved for the Primary Broadcast Channel (P-BCH) to prevent the resource blocks from being allocated to any other channel. However, not all the resource blocks having been reserved for Primary Broadcast Channel (P-BCH) are practically allocated to the Primary Broadcast Channel (P-BCH). Namely the Primary Broadcast Channel (P-BCH) is allocated to only predetermined sub-carriers among all the resource blocks having been allocated for the Primary Broadcast Channel (P-BCH). For example, the Primary Broadcast Channel (P-BCH) may be mapped to the sub-carriers having the same sub-carrier numbers as the Synchronization signal is mapped.

The transmission power of the Primary Broadcast Channel (P-BCH) (total of transmission power of all the resource elements (sub-carriers); absolute value; unit is W) is defined as $P_{P-BCH}$.

When the Paging Channel (PCH) is transmitted via the sub-frame, the RB group determined in advance is allocated to the Paging Channel (PCH). Otherwise, in accordance with the data size of the Paging Channel (PCH) or the number of user equipment (UE) terminals transmitting the Paging Channel (PCH), or in accordance with available RB group, the RB group may be allocated to the Paging Channel (PCH). For example, within available RB groups, RB groups may be sequentially selected from both ends of the system bandwidth until the necessary number of the resource blocks of the selected RB groups have been selected, the necessary number of the resource blocks being determined based on the data size of the Paging Channel (PCH); and the selected RB groups are allocated to the Paging Channel (PCH). Herein, the available RB group refers to the RB group which has not been determined to be allocated to any of the other channels at the timing when this process is performed.

When the Random Access Channel response (RACH response or Message2 in random access procedure) is transmitted via the sub-frame, the RB group determined in advance is allocated to the RACH response. Otherwise, in accordance with the data size of the RACH response or the number of user equipment (UE) terminals transmitting the RACH response, or in accordance with available RB group, the RB group may be allocated to the RACH response. For example, within available RB groups, RB groups may be sequentially selected from both ends of the system bandwidth until the necessary number of the resource blocks of the selected RB groups have been selected, the necessary number of the resource blocks being determined based on the data size of the RACH response; and the selected RB groups are allocated to the RACH response. Herein, the available RB group refers to the RB group which has not been determined to be allocated to any of the other channels at the timing when this process is performed.

When the Dynamic Broadcast Channel (D-BCH) is transmitted via the sub-frame, the RB group determined in advance is allocated to the Dynamic Broadcast Channel (D-BCH). Otherwise, in accordance with the data size of the Dynamic Broadcast Channel (D-BCH) or the number of user equipment (UE) terminals transmitting the Dynamic Broadcast Channel (D-BCH), or in accordance with available RB group, the RB group may be allocated to the Dynamic Broadcast Channel (D-BCH). For example, within available RB groups, RB groups may be sequentially selected from both ends of the system bandwidth until the necessary number of the resource blocks of the selected RB groups have been selected, the necessary number of the resource blocks being determined based on the data size of the Dynamic Broadcast Channel (D-BCH); and the selected RB groups are allocated to the Dynamic Broadcast Channel (D-BCH). Herein, the available RB group refers to the RB group which has not been determined to be allocated to any of the other channels at the timing when this process is performed.

When the RACH message4 is transmitted via the sub-frame, the RB group determined in advance is allocated to the RACH message4. Otherwise, in accordance with the data size of the RACH message4 or the number of user equipment (UE) terminals transmitting the RACH message4, or in accordance with available RB group, the RB group may be allocated to the RACH message4. For example, within available RB groups, RB groups may be sequentially selected from both ends of the system bandwidth until the necessary number of the resource blocks of the selected RB groups have been selected, the necessary number of the resource blocks being determined based on the data size of the RACH message4; and the selected RB groups are allocated to the RACH message4. Herein, the available RB group refers to the RB group which has not been determined to be allocated to any of the other channels at the timing when this process is performed.

In step S1104, the allocation of resource blocks to the MBMS channel (i.e., MCH) (RB allocation (process) for MCH) is performed. Namely when the MCH is transmitted via the sub-frame, the RB group determined in advance is allocated to the MCH. Otherwise, in accordance with the data size of the MCH or the number of user equipment (UE) terminals transmitting the MCH, or in accordance with available RB group, the RB group may be allocated to the MCH. For example, within available RB groups, RB groups may be sequentially selected from both ends of the system bandwidth until the necessary number of the resource blocks of the selected RB groups have been selected, the necessary number of the resource blocks being determined based on the data size of the MCH; and the selected RB groups are allocated to the MCH. Herein, the available RB group refers to the RB group which has not been determined to be allocated to any of the other channels at the timing when this process is performed.

Next, in step S1106, the allocation of resource blocks for Persistent Scheduling (RB allocation (process) for Persistent Scheduling) is performed. In step S1106, the Persistent Resources reserved in step S1106 are allocated to the user equipment (UE) terminal having the downlink shared channel (DL-SCH) to which the Persistent scheduling is applied in the sub-frame.

However, with respect to the user equipment (UE) terminal to which the Persistent scheduling is applied in the sub-frame, the Scheduling coefficient described in steps S1024 is calculated. When the transmission resource are allocated for the Logical channel to which the Dynamic scheduling is applied in the sub-frame, the base station apparatus 200 releases the Persistent Resources and transmits the MAC PDU (DL-SCH) to the user equipment (UE) terminal using Resources allocated for the Logical Channel to which the Dynamic scheduling is applied. The method of multiplexing the data in the RLC buffer of the MAC control block and each Logical channel with the MAC PDU is described below.

The transmission power of the downlink shared channel (DL-SCH) to which the Persistent scheduling is applied (total of transmission power of all the resource elements (sub-carriers); absolute value; unit is W) is defined as $P_{persist}$. Herein, when there are two or more user equipment (UE) terminals having the downlink shared channel (DL-SCH) to which the Persistent scheduling is applied, $P_{persist}$ represents the total amount of the transmission power of the downlink shared channel (DL-SCH) of all the user equipment (UE) terminals, the Persistent scheduling being applied to the downlink shared channel (DL-SCH).

Next, in step S1108, a Calculation for Number of RBs for PDSCH (i.e., a calculation of the number of the resource blocks of the Physical Downlink Shared Channel (PDSCH)) is performed. More specifically, the number of the resource blocks "$N_{dynamic}^{(RB)}$" that can be allocated to the Physical Downlink Shared Channel (PDSCH) using the following formula (14) based on the maximum transmission power of the base station apparatus 200 (hereinafter referred to as "$P_{max}$": unit:W), transmission power of Synchronization signal "$P_{SCH}$", transmission power of Primary Broadcast Channel (P-BCH) "$P_{P-BCH}$" transmission power of Paging Channel (PCH) "$P_{PCH}$", transmission power of Random Access Channel (RACH) response "$P_{RACHres}$", transmission power of Dynamic Broadcast Channel (D-BCH) "$P_{D-BCH}$", transmission power of RACH message4 "$P_{RACHm4}$", transmission power of MBMS channel (MCH) "$P_{MCH}$", transmission power per one resource block of downlink shared channel (DL-SCH) to which Persistent scheduling is applied "$P_{persist}$", and transmission power per one resource block of downlink shared channel (DL-SCH) to which Dynamic scheduling is applied "$P_{dynamic}$". Herein, a symbol "$N_{dynamic}^{(RB)}$" denotes the number of resource blocks of the entire system bandwidth, and symbols "$N_{P-BCH}$", "$N_{SCH}$", "$N_{PCH}$", "$N_{RACHres}$", "$N_{D-BCH}$", "$N_{RACHm4}$", "$N_{MCH}$", and "$N_{persist}$" denote the numbers of resource blocks allocated to the P-BCH, Synchronization signal, PCH, RACH response, D-BCH, RACH message4, MCH, and the downlink shared channel (DL-SCH) to which the Persistent scheduling is applied, respectively in the sub-frame.

$$N_{dynamic}^{(RB)} = \min\left(N_{system}^{(RB)} - N_{common} - N_{persist}, \left\lfloor \frac{P_{max} - \max(P_{SCH}, P_{P-BCH}) - P_{D-BCH} - P_{persist} - P_{PCH} - P_{RACHres} - P_{RACHm4} - P_{MCH}}{P_{dynamic}^{(RB)}} \right\rfloor\right) \quad (14)$$

When inequality $N_{dynamic}^{(RB)} < N_{system}^{(RB)} - N_{common} - N_{persist}$ is satisfied, the total transmission power value of the base station apparatus 200 is controlled so that the total transmission power value is equal to or less than the maximum transmission power value of the base station apparatus 200 by preventing the transmission using some RB group(s) among the RB groups other than the RB groups allocated to the P-BCH, PCH, RACH response, D-BCH, MCH, RACH message4 and downlink shared channel (DL-SCH) to which Persistent scheduling is applied. More specifically, until the transmission of "$N_{system}^{(RB)} - N_{common} - N_{persistent} - N_{dynamic}^{(RB)}$" or more resource blocks is prohibited, the following process is performed to determine the RB group that is prevented from being transmitted. In this process, first, a RB group having the smallest number of resource blocks is detected and the transmission of the detected RB group is prohibited. In this case, if there are two or more RB groups having the smallest number of resource blocks, the transmission of the RB groups is sequentially prohibited in the ascending order of the RB group number. The above process is repeated to sequentially determine the RB groups that are prevented from being transmitted. In the above example, a process is performed in which the transmission of the RB groups is sequentially prohibited in the ascending order of the RB group number. However, alternatively, the transmission of the RB groups may be sequentially prohibited in the descending order of the RB group number, the transmission of the RB groups may be sequentially prohibited from the RB groups at the center of the system bandwidth to the RB groups at the both edges of the system bandwidth, the transmission of the RB groups may be prohibited in any method other than the methods described above.

In step S1110, the value of "k" is set to 1 (one) (k=1).

Next, in step S1112, the RB Remaining Check process to determine whether there are any remaining resource blocks is performed.

More specifically, in step S1112, it is determined whether there is any remaining RB group that can be allocated to the downlink shared channel (DL-SCH) to which Dynamic scheduling is applied. When determining that there is an allocatable RB group, the OK is returned. On the other hand, when determining that there is no allocatable RB group, the NG is returned. When a result of the RB Remaining Check is NG (NG in step S1112), the DL TFR Selection process is terminated.

The above-mentioned "RB group that can be allocated to the downlink shared channel (DL-SCH) to which Dynamic scheduling is applied" refers to an RB group other than the RB groups having been allocated to any of P-BCH, PCH, RACH response, D-BCH, RACH message4, MCH, DL-SCH to which Persistent scheduling is applied, and DL-SCH to which Dynamic scheduling is applied and in which the TFR Selection process is already performed. Further, the number of resource blocks included in the "RB groups that can be applied to the downlink shared channel (DL-SCH) to which Dynamic scheduling is applied" is defined as $N_{remain}^{(RB)}$.

In the above example, it is assumed that "RB group that can be allocated to the downlink shared channel (DL-SCH) to which Dynamic scheduling is applied" refers to an RB group other than the RB groups having been allocated to any of P-BCH, PCH, RACH response, D-BCH, PACH message4, MCH, DL-SCH to which Persistent scheduling is applied, and DL-SCH to which Dynamic scheduling is applied and in which the TFR Selection process is already performed. However, alternatively, RB group that can be allocated to the downlink shared channel (DL-SCH) to which Dynamic scheduling is applied" may be an RB group other than the RB groups having been allocated to any of Synchronization signal, P-BCH, PCH, RACH response, D-BCH, PACH message4, MCH, DL-SCH to which Persistent scheduling is applied, and DL-SCH to which Dynamic scheduling is applied and in which the TFR Selection process is already performed.

On the other hand, when the result of the RB Remaining Check is OK (OK in step S1112), the process goes to step S1114.

Next, in step S1114, the DL TFR Selection (Downlink TFR Selection) process is performed.

More specifically, the transport format of "the user equipment (UE) terminal in which radio resources are allocated based on Dynamic scheduling" determined in step S1032 is determined and the allocation of the RB groups is performed.

The loop of steps S1110 through S1120 (see FIG. 11) based on a value of "k" is to be performed in accordance with the order of the selected "user equipment (UE) terminals in which radio resources are allocated based on Dynamic Scheduling" in step S1032.

In the DL TFR selection process, a CQI adjustment process is performed. With respect to the CQI used in the TFR Selection process, the following processes are applied; the frequency direction regarding process, the Outer-loop type offset adjustment process, and the offset process based on the priority level of the logical channel having the Highest priority.

Next the frequency direction regarding process is described.

Based on the CQI values reported from the user equipment (UE) terminal, a CQI value of each RB group is calculated. In this case, if the CQI value across the system bandwidth (Wideband CQI) is reported but there is no CQI value of UE selected sub-band in a user equipment (UE) terminal, it is assumed that the same value of the Wideband CQI is used as the CQI value of UE selected sub-band in the user equipment (UE) terminal. In step S1020, with respect to the user equipment (UE) terminal in which the transmission type is determined as Distributed (transmission), it may be assumed that the CQI values of all the RB groups are the same as the Wideband CQI (the CQI value across the system bandwidth).

In the following, when the CQI related to the entire system bandwidth is expressed, an argument is described as "all".

Next, the Outer-loop type offset adjustment process (CQI offset adjustment) is described.

CQI_offset$_i$ is adjusted like an Outer loop as shown in formula (8) described above based on the acknowledgement information (a result of CRC check) of the downlink shared channel (DL-SCH) where the priority class of the logical channel having the Highest priority is $X_{j,adjust}$. When the priority class of the logical channel having the Highest priority is other than $X_{j,adjust}$, the Outer-loop type offset adjustment process (in formula (8)) is not performed.

With respect to the user equipment (UE) terminal, when two or more MAC PDU are to be transmitted within one sub-frame, the Outer-loop type offset adjustment process is performed on each of the two or more MAC PDU. Herein, the transmission of two or more MAC PDU corresponds to the transmission based on two or more codewards when MIMO is applied.

The CQI_offset$_i$ is adjusted with respect to each user equipment (UE) terminal. Further, Priority class $X_{j,adjust}$ as the target of the CQI offset adjustment process is set via the external input interface (I/F). As described above, by performing the Outer-loop type offset adjustment process with respect to one priority class having been determined in advance instead of performing the Outer-loop type offset adjustment process with respect to all the priority classes, it may become possible to reduce the processing load of the base station apparatus. For example, as the Priority class $X_{j,adjust}$, the Priority class to which the logical channel having the greatest transmission probability belongs is set.

$\Delta_{adj}^{(PC)}$ and $BLER_{target}^{(PC)}$ may be configured to be set via the external input interface (I/F). However, it is assumed that the maximum value of CQI_offset$_i$ is defined as CQI_offset$_{PC}^{(max)}$, and the minimum value of CQI_offset$_i$ is defined as CQI_offset$_{PC}^{(min)}$. The maximum value CQI_offset$_{PC}^{(max)}$ and the minimum value CQI_offset$_{PC}^{(min)}$ of the CQI_offset$_i$ are set via the external input interface (I/F). When the CQI_offset$_i$ is fixed to the maximum value or the minimum value, the calculation of formula (8) described above is not performed.

Then, the value of CQI_offset$_i$ is added to the value of CQI of each RB group and a value of CQI related to the entire system bandwidth as a power offset value. A process of the formula (5) described above is performed with respect to each sub-frame in which the DL TFR Selection process is performed regardless of "whether the priority class of the logical channel having the Highest priority is $X_{j,adjust}$ in the sub-frame".

Next, the offset process based on the priority level is described.

The CQI values of the corresponding RB groups and the CQI value related to the entire system bandwidth are adjusted using an offset value $\Delta_{PC}$ which is based on the priority level of the logical channel having the Highest priority. The $\Delta_{PC}$ may be set via the external input interface (I/F). The subscriber "pc" denotes Priority Class.

$$CQI_{adjust}(i)=CQI_{adjust}(i)-\Delta_{pc}$$

Figure 12:
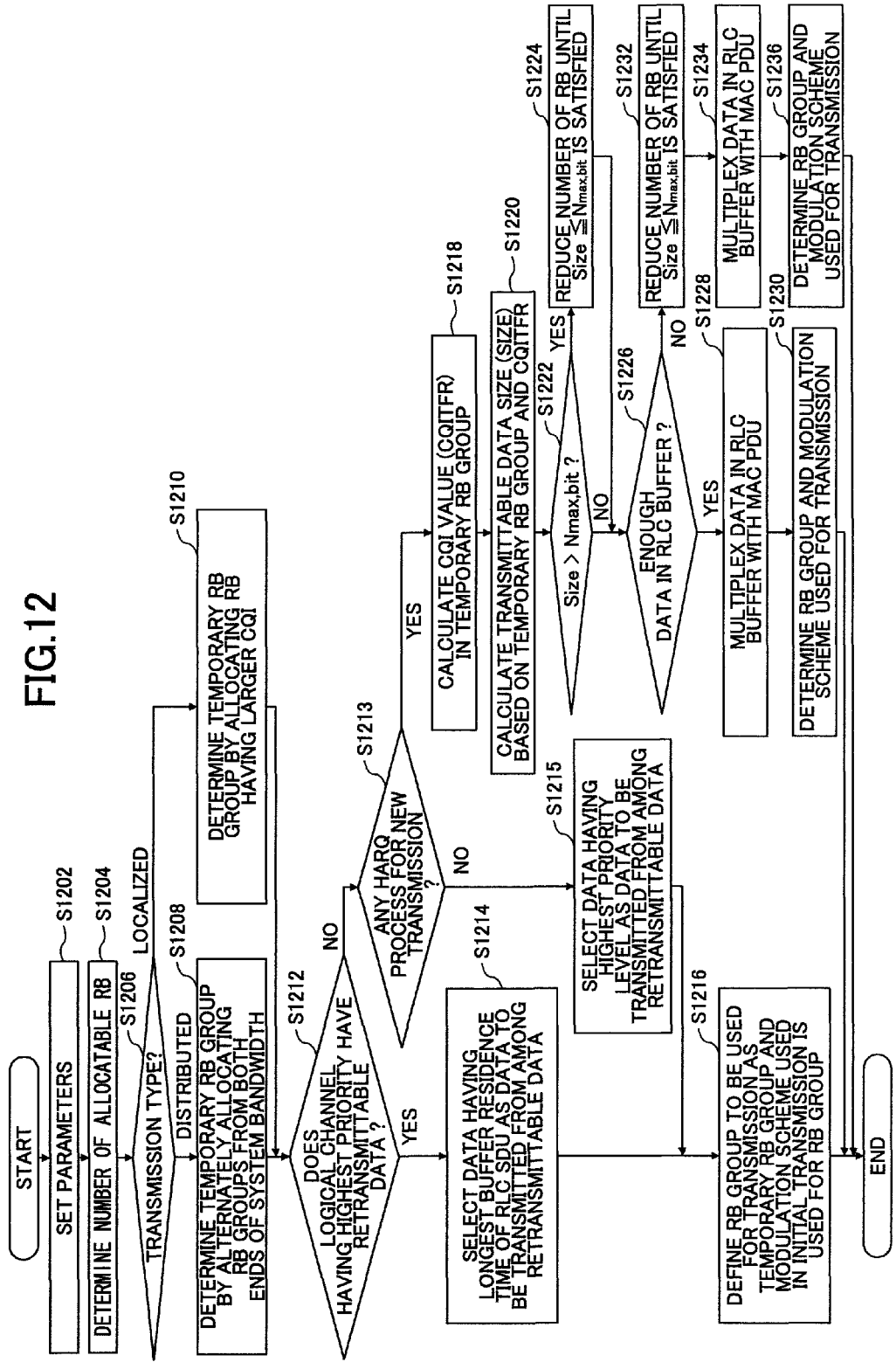
FIG. 12 is a flowchart showing a control process of allocating resource block groups according to an embodiment of the present invention.

Next, a resource block group allocation (RB group allocation) is described with reference to FIG. 12. By performing the process below, the RB group is allocated to kth user equipment (excluding PCH and RACH response) in which radio resources are allocated based on the Dynamic Sched-uling. FIG. 6 schematically shows a DL_TF_Related_table and a case where CQI=1 as an example.

Process

The following parameters are set in step S1202.

$N_{remain}^{(RB)}$: the number of remaining resource blocks (Number of Remaining RBs)

$N_{capability}$: the maximum RB number $N_{max,bit}$: the maximum data size (Payload size) determined based on UE category Herein, $N_{capability}$ may be set as a parameter in the apparatus or as a parameter to be input from an upper node, or may be set based on the information included in "UE capability" reported from the user equipment (UE) terminal.

Further, in a case where an instruction to reduce the data rate is issued from the user equipment (UE) terminal, the $N_{capability}$ may be calculated based on the following formula.

$$N_{capability}=N_{capability}*\alpha$$

Herein, a symbol α may denote a ratio against the maximum receivable throughput of the user equipment (UE) terminal. For example, when the base station apparatus 200 receives an instruction (request) from the user equipment (UE) terminal to transmit the downlink shared channel (DL-SCH) at the rate of 80% or less of the maximum receivable throughput of the user equipment (UE) terminal, α may be set to 0.8 (α=0.8). Further, as the method of reporting the instruction (request) by the user equipment (UE) terminal, in a case where data rate is required to be reduced, the ratio against the maximum receivable throughput of the user equipment (UE) terminal or an absolute throughput value may be reported. In any case, the base station apparatus 200 may calculate the value of α by deriving the ratio against the maximum receivable throughput of the user equipment (UE) terminal from an instruction from the user equipment (UE) terminal to perform the calculation of the above formula.

Further, in a case where an instruction to reduce the data rate is issued from the user equipment (UE) terminal, the $N_{max,bit}$ may be calculated based on the following formula.

$$N_{max,bit}=N_{max,bit}*\alpha$$

Herein, a symbol α may denote a ratio against the maximum receivable throughput of the user equipment (UE) terminal. For example, when the base station apparatus 200 receives an instruction (request) from the user equipment (UE) terminal to transmit the downlink shared channel (DL-SCH) at the rate of 80% or less of the maximum receivable throughput of the user equipment (UE) terminal, α may be set to 0.8 (α=0.8). Further, as the method of reporting the instruction (request) by the user equipment (UE) terminal, in a case where data rate is required to be reduced, the ratio against the maximum receivable throughput of the user equipment (UE) terminal or an absolute throughput value may be reported. In any case, the base station apparatus 200 may calculate the value of α by deriving the ratio against the maximum receivable throughput of the user equipment (UE) terminal from an instruction from the user equipment (UE) terminal to perform the calculation of the above formula.

Next, in step S1204, the number "$N_{allocated}^{(RB)}$" of resource blocks allocatable to the user equipment (UE) terminal is calculated.

$$N_{remain}^{(UE)}=\min(N_{DL-SCH}-k+1, N_{capability})$$

Based on this formula, it may become possible to control the number of resource blocks allocated to the user equipment (UE) terminal to be equal to or less than $N_{capability}$. Herein, min(A,B) refers to a function to output A or B whichever is smaller.

$$N_{allocated}^{(RB)} = \min\left(\left\lceil \frac{N_{remain}^{(RB)}}{N_{remain}^{(UE)}} \right\rceil, N_{capability}\right) \quad (15)$$

In step S1206, it is determined whether the downlink transmission type is Localized or Distributed.

When determining that the downlink transmission type is Distributed (result of determination in step S1206 is Distributed), the process goes to step S1208. In step S1208, RB groups are selected so that the allocated frequency resources can be discretely distributed within the system bandwidth until the number of the allocated resource blocks exceeds $N_{allocated}^{(RB)}$ or more. For example, the RB groups may be selected so that the allocated frequency resources can be discretely distributed within the system bandwidth by alternately assigning (selecting) the RB blocks from both ends of the system bandwidth. Otherwise, the RB groups may be selected so that the allocated frequency resources can be discretely distributed within the system bandwidth by alternately selecting from both the RB group having the largest RB group number and the RB group having the smallest RB group number.

When determining that the downlink transmission type is not Distributed (i.e., Localized; result of determination in step S1206 is Localized), the process goes to step S1210. In step S1210, the RB groups are sequentially allocated to the user equipment (UE) terminal in the descending order of the values of $CQI_{adjusted}$ until the number of resource blocks allocated to the user equipment (UE) terminal reaches $N_{allocated}^{(RB)}$ or more.

Before determining whether the downlink transmission type is Localized or Distributed in step S1206, a method of allocating the RB groups to the user equipment (UE) terminal may be determined based on the path loss value between the user equipment (UE) terminal and the base station apparatus 200. For example, after a threshold value $Threshold_{DL,PL}$ is defined, when determining that the path loss value is greater than the threshold value $Threshold_{DL,PL}$, the RB groups are sequentially allocated to the user equipment (UE) terminal in the descending order of the frequency values of the RB groups until the number of the resource blocks allocated to the user equipment (UE) terminal reaches $N_{allocated}^{(RB)}$ or more. On the other hand, when determining that the path loss value is equal to or less than the threshold value $Threshold_{DL,PL}$, the above determination whether the downlink transmission type is Localized or Distributed is performed, and the allocation of the RB groups may be performed based on the result of the determination. Otherwise, in the above process, when determining that the path loss values is equal to or less than the threshold value $Threshold_{DL,PL}$, without determining whether the downlink transmission type is Localized or Distributed, the RB groups may be sequentially allocated to the user equipment (UE) terminal in the ascending order of the frequency values of the RB groups. Further, the path loss value may be calculated based on the UE Power Headroom and uplink shared channel reported from the user equipment (UE) terminal and the received quality of the Sounding reference signal or based on the path loss value reported from the user equipment (UE) terminal. In this case, the path loss value calculated from the UE Power Headroom, uplink shared channel, or the received quality of the Sounding reference signal reported from the user equipment (UE) terminal corresponds to the uplink path loss value, and the path loss value reported from the user equipment (UE) terminal corresponds to the downlink path loss value.

Figure 14:
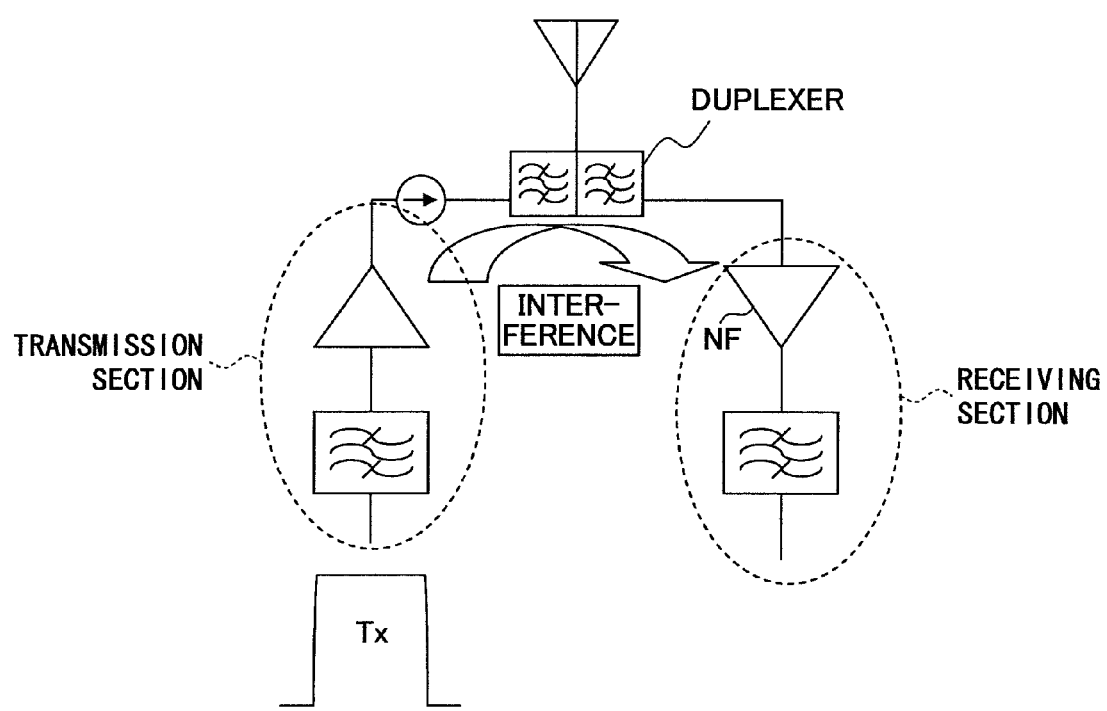
FIG. 14 is a drawing showing an interference in a user equipment terminal.

For example, in an LTE system employing the FDD (Frequency Division Duplex) scheme is employed, the uplink transmission signal in the user equipment (UE) terminal may become an interference signal to the downlink reception signal; and as a result, the quality of the downlink reception signal may be degraded. Generally, in user equipment (UE) terminals, there is a functional section called a Duplexer, which prevents the leakage of the uplink transmission signal into the functional section receiving a downlink signal and performing the demodulation and decoding. However, the leakage cannot be fully prevented. FIG. 14 schematically shows the mechanism of interference in the user equipment (UE) terminal. As shown in FIG. 14, the transmission signal generated in the transmission section is leaked into the receiving section without the power of the transmission signal being fully reduced in the Duplexer, and the leaked transmission signal may become an interference signal which degrades the quality of the received signal.

Figure 15:
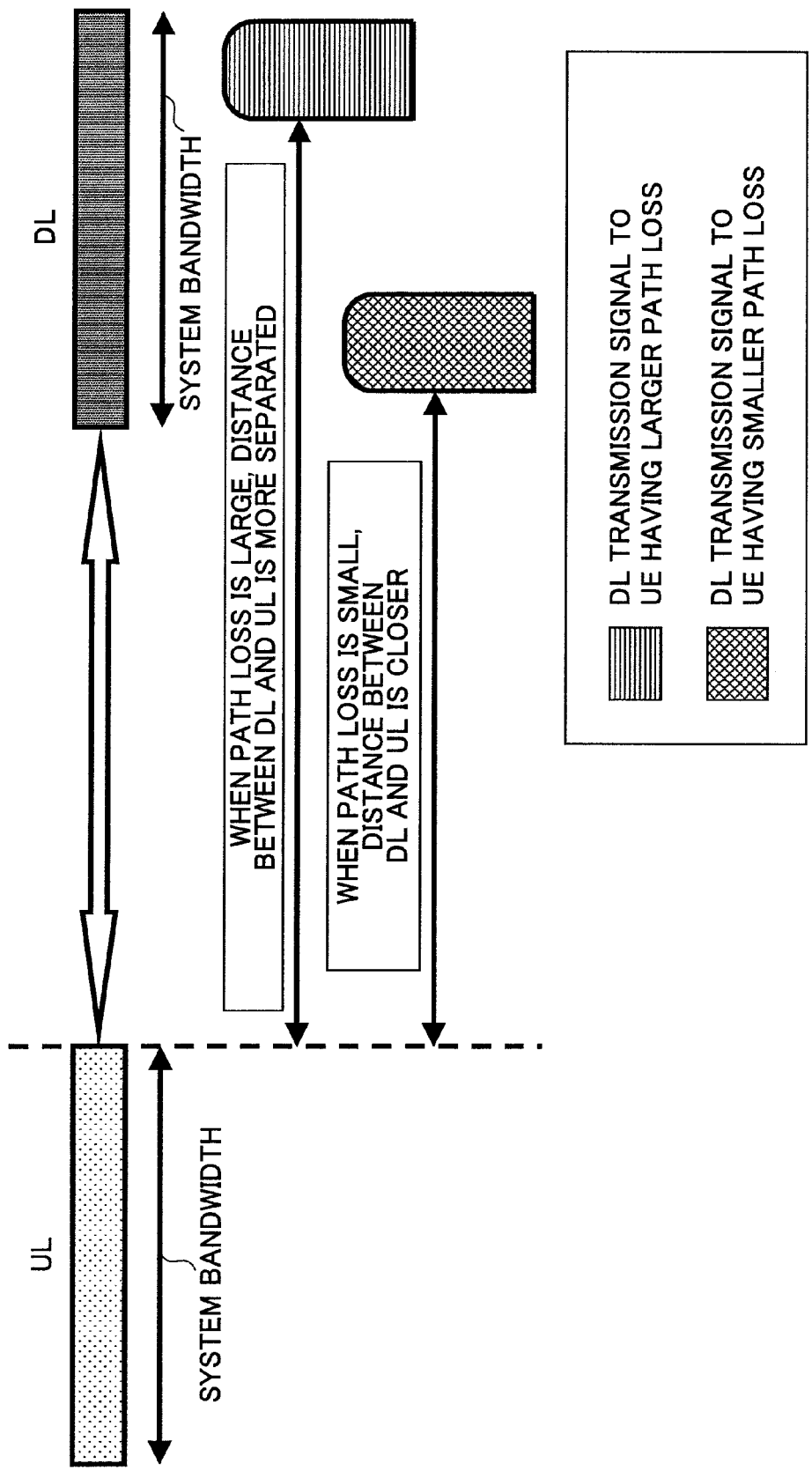
FIG. 15 is a drawing showing a method of reducing the interference of an uplink transmission signal to a downlink reception signal.

The more separated the difference is between the frequency of the uplink transmission signal and the frequency of the downlink reception signal, or the smaller the transmission power of the uplink transmission signal is, the smaller the leakage becomes. Further, in uplink, the larger the path loss value is, the larger the transmission power becomes. Therefore, when the path loss value is relatively large, by allocating the frequency resource having a higher frequency, it may become possible to reduce the interference of the uplink transmission signal to the downlink reception signal. FIG. 15 schematically shows an effect caused by reducing the interference of the uplink transmission signal to the downlink reception signal. As shown in FIG. 15, when path loss value is relatively large, a UL frequency band and a DL frequency band is more separated from each other. Namely when the path loss value is relatively large, a frequency band allocated to the DL transmission signal to the user equipment (UE) terminal is more separated from the UL transmission bandwidth. On the other hand, when the path loss value is relatively small, the difference between UL frequency band and DL frequency band is reduced. Namely when the path loss value is relatively small, a frequency band allocated to the DL transmission signal to the user equipment (UE) terminal is set closer to the UL transmission bandwidth. This is because the UL transmission power is small which is less likely to cause the interference problem due to the uplink signal.

In the above example, it is assumed that the UL frequency is lower than the DL frequency. Therefore, in a case where the UL frequency is higher then the DL frequency, in an opposite manner, when the path loss value is greater than the threshold value $Threshold_{DL,PL}$, a process is performed in which the RB groups are sequentially allocated to the user equipment (UE) terminal in the ascending order of the frequencies of the RB groups until the number of the resource blocks allocated to the user equipment (UE) terminal reaches the $N_{allocated}^{(RB)}$ or more.

Further, in the above process, the order of performing the steps S1110 through S1120 of the user equipment (UE) terminals (i.e., order of "k" loop) is determined in step S1032 in which the order is determined based on the order of "allocating the radio resources to the user equipment (UE) terminals in accordance with the Dynamic scheduling". However alternatively, the order of performing the steps S1110 through S1120 of the user equipment (UE) terminals (i.e., order of "k" loop) may be determined in accordance with the descending order of the path loss values. More specifically, the process of steps S1100 through S1120 is sequentially performed in the descending order of the path loss values of the user equipment (UE) terminals. In this case, certainly, the frequency resources are sequentially allocated to the user equipment (UE) terminals in the descending order of the frequencies of the frequency resources in a manner so that the larger the path loss value of the user equipment (UE) terminal is, the more separated frequency resource from the uplink transmission frequency is allocated, i.e., the higher frequency of the frequency resource is allocated to the user equipment (UE) terminal. As a result, it may become possible to improve the effect of reducing the interference of the uplink transmission signal to the downlink reception signal.

In the following, the RB group determined "to be allocated to the user equipment (UE) terminal" in the processes of steps S1208 and S1210 is called "Temporary RB group".

In step S1212, it is determined whether the logical channel having the Highest priority includes retransmittable data.

When determining that the logical channel having the Highest priority has retransmittable data (result of the determination in step S1212 is YES), the process goes to step S1214. On the other hand, when determining that the logical channel having the Highest priority has no retransmittable data (result of the determination in step S1212 is NO), the process goes to step S1213.

In step S1213, it is determined whether there is an HARQ process for a new transmission. When determining that there is no HARQ process for a new transmission (result of the determination in step S1213 is NO), the process goes to step S1215.

In step S1214, among the retransmittable data (MAC PDU), the data (MAC PDU) including RLC SDU having the maximum "buffer residence time of the RLC SDU" of the logical channel having the Highest priority are selected as the MAC PDU to be transmitted via the subframe. Namely the data (MAC PDU) including RLC SDU having the maximum "buffer residence time of the RLC SDU" of the logical channel having the Highest priority are transmitted. Herein, the definition of the "buffer residence time of the RLC SDU" is the same as that of the RLC SDU buffer residence time described in No. 5 of Table 7.

In step S1215, among the retransmittable data (MAC PDU), retransmission data (MAC PDU) having the highest priority level are transmitted. Herein, the priority level refers to the priority level of the Logical channel having the Highest priority among the Logical Channels multiplexed to the retransmission data (MAC PDU). Further, when there are plural retransmission data (MAC PDU) having the highest priority level, the data (MAC PDU) including the RLC SDU having the maximum "buffer residence time of the RLC SDU" of the logical channel having the Highest priority are transmitted. Herein, the definition of the "buffer residence time of the RLC SDU" is the same as that of the RLC SDU buffer residence time described in No. 5 of Table 7.

Further, in step S1216, the RB group and the modulation scheme to be used for the transmission of the sub-frame are determined. It is assumed that the RB group to be used for the transmission of the sub-frame is the same as the Temporary RB group. It is also assumed that the modulation scheme is the same as that in the initial transmission. In the above example, a case is described where the RB groups used for the data transmission correspond to the Temporary RB groups. However, alternatively, when the number of resource blocks included in the RB groups used for the data transmission is greater than the number of resource blocks allocated in the initial transmission, a process may be performed in which some of the RB groups used for the transmission of the sub-frame are not allocated until the number of resource blocks reaches the number of resource blocks allocated in the initial transmission.

Further, instead of assuming that the RB group to be used for the transmission of the sub-frame is the same as the Temporary RB group, based on the number of resource blocks in the RB groups, the number of the resource blocks in the RB groups may be reduced. Specifically, when the number of resource blocks in the Temporary RB groups is greater than two times the number of the resource blocks in the RB groups in the initial transmission, the number of the resource blocks of the Temporary RB groups may be reduced so that the number of the resource blocks of the Temporary RB groups is less than two times the resource blocks in the RB groups in the initial transmission. As the method of reducing the resource block numbers, the same method as described in steps S1224 or S1232 may be used. In the above example, two times is used. However, any other factor such as one time, three times, or the like indicating other than two times may also be used.

On the other hand, when determining that there is the HARQ process for a new transmission (result of the determination in step S1213 is YES), the process goes to step S1218.

In step S1218, a CQI value "$CQI_{TFR}$" in the Temporary RB group is calculated as described below.

When determining that the downlink transmission type is Distributed, it is assumed that $CQI_{TFR}$ is defined as $CQI_{adjusted}$ (all) ($CQI_{TFR}=CQI_{adjusted}$ (all)). On the other hand, when determining that the downlink transmission type is not Distributed (i.e., Localized), it is assumed that $CQI_{TFR}$ is obtained by true-value averaging the $CQI_{adjusted}$ with respect each RB group in the Temporary RB group across the bandwidth of the Temporary RB group (the averaging is required to be performed by considering (the difference of) the number of resource blocks of each RB groups).

Next, in step S1220, the data size ("Size") and the modulation scheme ("Modulation") of the downlink shared channel (DL-SCH) are determined by referring to TF_related_ table using the number (RB_available) of resource blocks in the Temporary RB group and $CQI_{TFR}$ as arguments.

Size=*DL*_Table_*TF*_SIZE(*RB*_available,$\lfloor CQI_{TFR} \rfloor$)

Modulation=*DL*_Table_*TF*_Mod(*RB*_available, $\lfloor CQI_{TFR} \rfloor$)  (16)

In step S1222, it is determined whether inequality Size >$N_{max,bit}$ is satisfied (correct). When determining that Size >$N_{max,bit}$ is satisfied (result of determination in step S1222 is YES), the process goes to step S1224, in which the number of resource blocks (RB available) is reduced until inequality Size ≦$N_{max,bit}$ is satisfied. Namely the number of resource blocks $NUM_{RB}$ to be allocated is recalculated by referring to the TF_related_table using $N_{max,bit}$ and $CQI_{TFR}$ as arguments.

Num$_{RB}$=*DL*_Table_*TF*_RB($N_{max,bit}$,$\lfloor CQI_{TFR} \rfloor$)  (17)

Then, when determining that the downlink transmission type is Distributed, RB groups in the Temporary RB group are removed by repeating the following process until the number of resource blocks in the RB group to be used for the transmission is equal to or less than $NUM_{RB}$ (removed RB groups are used as (k+1)th radio resource or later).

Process: The RB groups are alternately removed from both of
the RB group having the smallest RB group Number and
the RB group having the greatest RB group Number.

The number of resource blocks in the Temporary RB group after the above process is intended to be performed is defined as $Num_{RB}$. The above process is performed so that the remaining RB groups after the removal of the RB groups can be discretely distributed in the system bandwidth.

On the other hand, when determining that the downlink transmission type is Localized, RB groups in the Temporary RB group are removed by repeating the following process until the number of resource blocks in the RB group to be used for the transmission is equal to or less than $NUM_{RB}$ (removed RB groups are used as (k+1)th radio resource or later).

Process: The RB group having the smallest $CQI_{adjusted}$ is removed. When there are two or more RB groups having the smallest $CQI_{adjusted}$, the RB groups are sequentially removed in the ascending order of the number of resource blocks in the RB groups. When there are two or more RB groups having the smallest $CQI_{adjusted}$ and having the smallest number of resource blocks, the RB groups are sequentially removed in the descending order of the RB group numbers of the RB groups.

The Temporary RB group after the above process is performed is treated as the Temporary RB group in the following process; and the number of the resource blocks in the Temporary RB group after the above process is defined as $Num_{RB}$. Further, the data size ("Size") and the modulation scheme ("Modulation") of the downlink shared channel (DL-SCH) are determined again by referring to TF_related_table using the number (RB_available) of resource blocks in the Temporary RB group and $CQI_{TFR}$ as arguments.

$$Size = DL\_Table\_TF\_SIZE(RB\_available, \lfloor CQI_{TFR} \rfloor)$$

$$Modulation = DL\_Table\_TF\_Mod(RB\_available, \lfloor CQI_{TFR} \rfloor) \quad (18)$$

After step S1224, the process goes to step S1226.

On the other hand, when determining that Size ≦$N_{max,bit}$ is satisfied (result of determination in step S1222 is NO), the process goes to step S1226.

Next, in step S1226, it is determined whether there are sufficient data in the RLC Buffer.

When determining that there are sufficient data in the RLC Buffer (result of determination in steps S1226 is YES), the process goes to step S1228, in which, by the following procedures, the control information of the MAC layer and the data of all logical channels in the RLC Buffer are multiplexed with the MAC PDU having the Size.

Step 1: First, when there is control information of the MAC layer, the control information of the MAC layer is multiplexed with the highest priority.

Step 2: Next, the data in the RLC Buffer are sequentially extracted and multiplexed in the descending order of the priority levels of the logical channels. When there are two or more logical channels having the same priority level, if there are a DCCH, the DDCH is treated with the highest priority, and if there is no DDCH, the data in the RLC buffer may be sequentially extracted from the logical channels in any order. As a method of selecting the logical channel in any order, the Round-Robin method may be used.

Next, in step S1230, the RB group, the modulation scheme, and the payload size to be used for the transmission of the sub-frame are determined. Specifically, the RB group to be used for the data transmission is same as the Temporary RB group. The modulation scheme to be used for the data transmission is the same as the Modulation. The payload size is the same as the Size.

On the other hand, when determining that there are no sufficient data in the RLC Buffer (result of determination in steps S1226 is NO), the process goes to step S1232, in which, until inequality Size ≦$Size_{all}$ is satisfied, the number of resource blocks to be allocated is reduced. Herein, the symbol $Size_{all}$ denotes total size of the data in the RLC buffer of the MAC control block and all the Logical channels. The processing method is described in more detail below.

First, the number $NUM_{RB}$ of resource blocks to be allocated is recalculated by referring to the TF_related_table using the total size "$Size_{all}$" of the data in the RLC buffer of the MAC control block and all the logical channels and the "$CQI_{TFR}$" as arguments.

$$Num_{RB} = DL\_Table\_TF\_RB(Size_{all}, \lfloor CQI_{TFR} \rfloor) \quad (19)$$

When determining that the downlink transmission type is Distributed, the RB groups in the Temporary RB group are removed by repeating the following process as long as the number of RB groups to be used for transmission is equal to or greater than the $NUM_{RB}$.

Process: Among the RB groups in the Temporary RB group, the RB groups are sequentially and alternately removed from both the RB group having the greatest RB group number and the RB group having the smallest RB group number.

The Temporary RB group after the above process is used as the Temporary RB group in the following process. Further, the number of resource blocks in the Temporary RB group is defined as $Num_{RB,F}$.

When determining that the downlink transmission type is not Distributed, namely when determining that the downlink transmission type is Localized, the RB groups in the Temporary RB group are removed by repeating the following process as long as the number of RB groups to be used for transmission is equal to or greater than the $NUM_{RB}$.

Process: The RB groups are sequentially removed in the ascending order of the $CQI_{adjusted}$ values of the RB groups. When there are two or more RB groups having the smallest $CQI_{adjusted}$ value, the RB groups are sequentially removed in the ascending order of the number of resource blocks of the RB groups. When there are two or more RB groups having the smallest $CQI_{adjusted}$ value and having the smallest number of resource blocks, the RB groups are sequentially removed in the descending order of the RB group numbers of the RB groups.

The Temporary RB group after the above process is used as the Temporary RB group in the following process. Further, the number of resource blocks in the Temporary RB group is defined as $Num_{RB,F}$.

The removed RB groups in the above processes are used as (k+1)th radio resource or later.

Further, the data size ("Size") and the modulation scheme ("Modulation") of the downlink shared channel (DL-SCH) are determined again by referring to TF_related_table using the number ($Num_{RB,F}$) of resource blocks in the Temporary RB group and $CQI_{TFR}$ as arguments.

$$Size = DL\_Table\_TF\_SIZE(Num_{RB,F}, \lfloor CQI_{TFR} \rfloor)$$

$$Modulation = DL\_Table\_TF\_Mod(Num_{RB,F}, \lfloor CQI_{TFR} \rfloor) \quad (20)$$

Further, in step S1234, the control information of the MAC layer and the data of all logical channels in the RLC Buffer are multiplexed with the MAC PDU having the Size.

Next, in step S1230, the RB group, the modulation scheme, and the payload size to be used for the transmission of the sub-frame are determined. Namely the RB group to be used for the data transmission is the same as the Temporary RB group. The modulation scheme to be used for the data transmission is the same as the Modulation. The payload size is the same as the Size.

The RLC buffer described in the above examples is generally a data buffer. Further, the same above processes may be performed on not the RLC buffer but the PDCP buffer.

In step S1116, the RV selection (Redundancy Version Selection) process is performed.

In step S1118, the value of "k" may be incremented, and in step S1120, it may be determined whether the value of "k" is equal to or less than $N_{DL-SCH}$ when determining that the value of "k" is equal to or less than $N_{DL-SCH}$ (YES in step S1120), the process may go back to step S1112. On the other hand, when determining that the value of "k" is not equal to or less than $N_{DL-SCH}$ (NO in step S1120), the process may terminate.

Next, the base station apparatus 200 according to an embodiment of the present invention is described with reference to FIG. 13.

Figure 13:
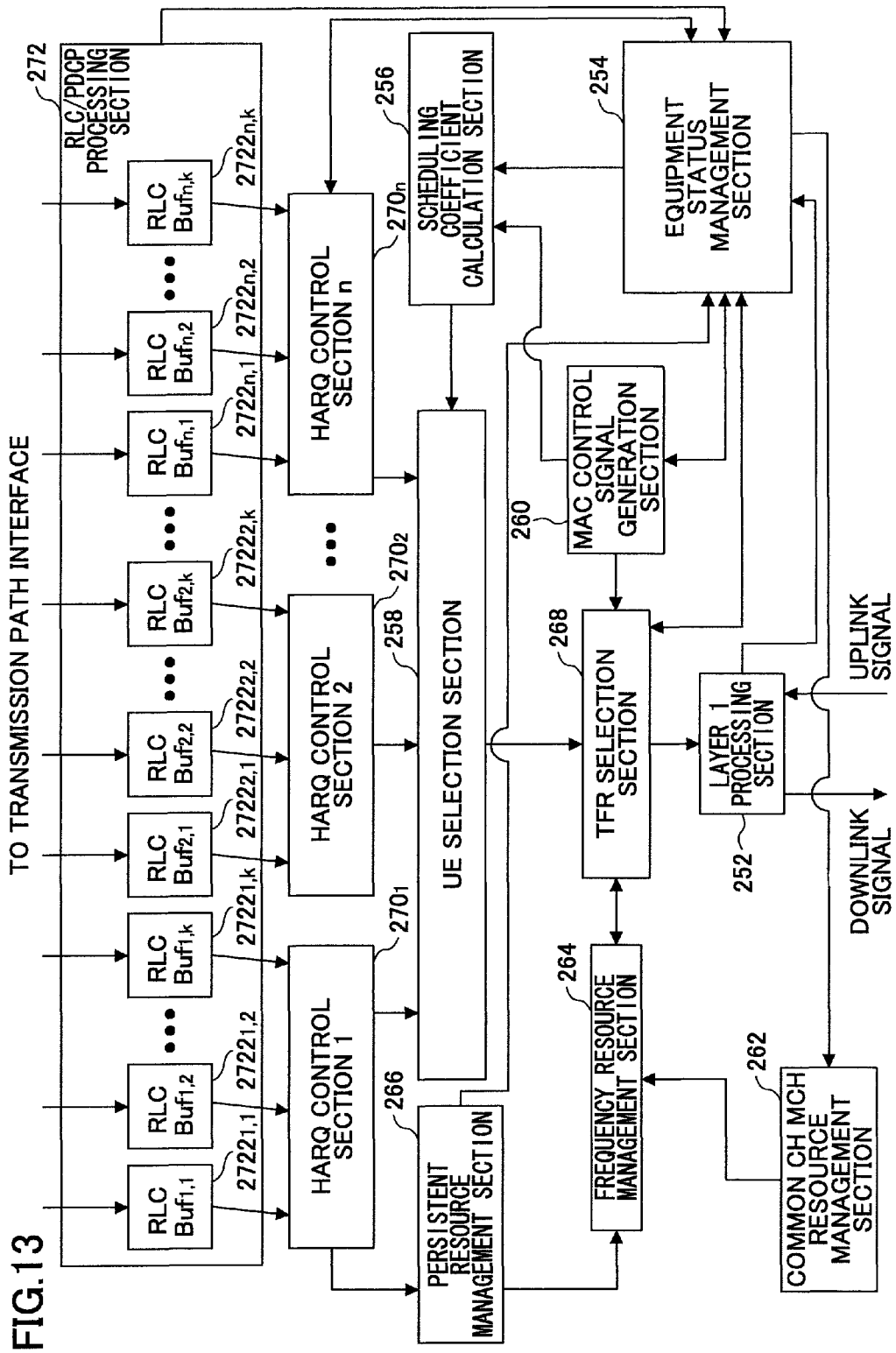
FIG. 13 is a partial block diagram of a base station apparatus according to an embodiment of the present invention.

As shown in FIG. 13, the base station apparatus 200 according to an embodiment of the present invention includes a layer 1 processing section 252, a user equipment status management section 254, a scheduling coefficient counting section 256, a UE selection section 258, a TFR (Transport Format Resource block) Selection section 268, an MAC control signal generation section 260, a common channel/MCH resource management section 262, a frequency resource management section 264, a persistent resource management section 266, an HARQ control section 270, and an RLC/PDCP processing section 272. The HARQ control section 270 includes $HARQ_1$ control section 270, $HARQ_2$ control section 270, ..., and HARQ control section 270 corresponding to UE(user equipment terminal)#1, UE#2, ..., and UE#n, respectively. The RLC/PDCP processing section 272 includes RLC Bufs $2722_{1,1}$ through $2722_{1,k}$ for logical channels #1 through #k of UE#1, RLC Bufs $2722_{2,1}$ through $2722_{2,k}$ for logical channels #1 through #k of UE#2, ..., RLC Bufs $2722_{n,1}$ through $2722_{n,k}$ for logical channels #1 through #k of UE#n, respectively.

In FIG. 13, the base station apparatus 200 includes one HARQ control section with respect to each UE (i.e., n×HARQ for n×UE). However alternatively, the base station apparatus 200 may include only one HARQ control section for all or plural UEs. Further, it is not always necessary to provide one RLC BUf for each logical channel of each UE. Alternatively, one RLC Buf may be provided for one UE or all UEs.

The layer 1 processing section 252 performs processes related to the layer 1. More specifically, the layer 1 processing section 252 performs, for example, a channel coding process and an IFFT process on the shared channel transmitted in downlink and a reception process such as an FFT process and a channel decoding process on the shared channel transmitted in uplink. The shared channel transmitted in uplink refers to, for example, a shared channel to which the Dynamic Scheduling is applied and a shared channel to which the Persistent Scheduling is applied.

Further, the layer 1 processing section 252 performs the transmission of the Downlink Scheduling Information and the Uplink Scheduling Grant, the Downlink Scheduling Information being control information for the downlink shared channel (DL-SCH), the Uplink Scheduling Grant being control information for the uplink shared channel (UL-SCH).

Further, the layer 1 processing section 252 performs the reception of control information transmitted in uplink, i.e., the control information including the CQI (Channel Quality Information) and the acknowledgement information with respect to the downlink shared channel. Such CQI and the acknowledgement information are transmitted to the user equipment status management section 254.

Further, the layer 1 processing section 252 detects uplink synchronization status based on the Sounding reference signal transmitted in uplink and the CQI signal and reports the detection result to the user equipment status management section 254.

Further, the layer 1 processing section 252 may estimate uplink reception timings based on the Sounding reference signal transmitted in uplink and the CQI signal and reports the estimation result of the uplink reception timings to the MAC control signal generation section 260 via, for example, the user equipment status management section 254.

Further, the layer 1 processing section 252 is connected to a radio interface. More specifically, in downlink, the baseband signal generated in the layer 1 processing section 252 is converted into a signal in radio frequency band. Then the converted signal is amplified in the amplifier and transmitted to user equipment (UE) via an antenna. On the other hand, in uplink, a radio-frequency signal received by the antenna is amplified in the amplifier, frequency-converted into a baseband signal, and is input to the layer 1 processing section 252.

The user equipment status management section 254 performs status management of the user equipment (UE) terminals. For example, the equipment status management section 254 performs status management of HARQ Entity, management and control of Mobility of UE, manages DRX status and uplink synchronization, whether Persistent scheduling is to be applied, whether MAC Control Block is to be transmitted, the downlink transmission status, and a buffer status. Further, in step S1024, the equipment status management section 254 calculates metrics necessary for the calculation of the Scheduling Coefficient and determines whether the Scheduling Coefficient is to be calculated. Namely the equipment status management section 254 performs processes in steps S1004 through S1022 in FIG. 10.

The Mobility of the UE described above refers to a handover switching a cell to which the UE is to be communicated, the handover including handover between the same frequency, between different frequencies, and between different systems. In cases of the handover between the different frequencies or between different systems, the management and control of the Management Gap is included in the management and control of Mobility of UE.

Further, the equipment status management section 254 performs the processes of steps S902, S904, and S906. More specifically, the equipment status management section 254 sets the maximum multiplexing number per a sub-frame with respect to the DL MAC of the sub-frame, counts the numbers of MCH, D-BCH, PCH, RACH response and RACH message4 in the sub-frame.

The scheduling coefficient counting section 256 performs the processes of steps S1002 and S1024 through S1032 in FIG. 10. More specifically, the scheduling coefficient counting section 256 calculates the scheduling coefficients of the user equipment (UE) terminals in the sub-frame (see FIG. 11). On the other hand, the UE selection section 258 selects the user equipment (UE) terminals to which radio resources are allocated based on the Dynamic scheduling based on the calculated Scheduling Coefficients. The UE selection section 258 reports the number "$N_{DL-SCH}$" of the user equipment (UE) terminals to which radio resources are allocated based on the Dynamic scheduling to the TFR (Transport Format Resource block) Selection section 268.

The TFR Selection section 268 performs the processes of steps S1110, S1112, S1114, S1116, and S1120. More specifically, the TFR Selection section 268 determines the transmission formats and allocates radio resources related to the downlink shared channel (DL-SCH) to which the Dynamic Scheduling is applied. The information of the transmission formats and radio resources related to the downlink shared channel (DL-SCH) to which the Dynamic Scheduling is applied determined by the TFR Selection section 268 is transmitted to the layer 1 processing section 252 to be used for the transmission processes of the DL Scheduling Information and the downlink shared channel (DL-SCH) in the layer 1 processing section 252.

The common channel/MCH resource management section 262 determines the transmission formats and allocates the radio resources for the MCH and common channels such as Synchronization channel (SCH), Primary Broadcast Channel (P-BCH), Dynamic Broadcast Channel (D-BCH), Paging Channel (PCH), Random Access Channel response (RACH response), and PACH message4. The common channel/MCH resource management section 262 reports the frequency resources among the radio resources to the frequency resource management section 264. The information of the transmission formats and allocated radio resources determined by the common channel/MCH resource management section 262 is transmitted to the layer 1 processing section 252 via the frequency resource management section 264 and the TFR Selection section 268, so that layer 1 processes of the MCH and the Common Channels are performed in the layer 1 processing section 252.

The frequency resource management section 264 is connected to the TFR Selection section 268, the common channel/MCH resource management section 262, and the persistent resource management section 26 and performs the management of the frequency resources. More specifically, the frequency resource management section 264 monitors remaining frequency resources usable for the downlink shared channel (Dl-SCH) to which Dynamic Scheduling is applied and provides information necessary for the process of step S1110 to the TFR Selection section 268.

The persistent resource management section 266 performs the status management of the downlink shared channel (DL-SCH) to which the Persistent Scheduling is applied and manages the radio resources. More specifically, the persistent resource management section 266 determines the transmission formats related to the downlink shared channel (DL-SCH) to which the Persistent Scheduling is applied and manages the radio resources. Further, the persistent resource management section 266 reports the frequency resources among the radio resources to the frequency resource management section 264. The information of the transmission formats and allocated radio resources determined by persistent resource management section 266 is transmitted to the layer 1 processing section 252 via the frequency resource management section 264 and the TFR Selection section 268, so that the process of the layer 1 of downlink shared channel (DL-SCH) to which the Persistent Scheduling is applied is performed in the layer 1 processing section 252.

Further, the persistent resource management section 266 sends the information necessary to perform the processes of steps S1012 through S1016 performed in the equipment status management section 254 to the equipment status management section 254.

The MAC control signal generation section 260 determines whether the MAC control signal is to be transmitted to each user equipment (UE) terminal, and when determining that the MAC control signal is to be transmitted, reports the result of determination to the equipment status management section 254. Further, when the MAC control signal is to be actually mapped, the MAC control signal generation section 260 sends the MAC control signal to the TFR Selection section 268.

The MAC control signal includes, for example, a control signal instructing the timing advance for adjusting the transmission timing of the uplink signal and the establishment of the uplink synchronization and a control signal instructing to go into DRX mode. Whether each of the control signals is to be transmitted is determined based on the information from the equipment status management section 254 or the layer 1 processing section 252.

The HARQ$_n$ control section 270 performs the control with respect to the HARQ of each user equipment (UE) terminal.

The RLC/PDCP processing section 272 performs the control of the RLC layer and the PDCP layer of each user equipment (UE) terminal. Further, the RLC/PDCP processing section 272 includes RLC Buf2721$_{n,k}$ which is the RLC Buffer related to the logical channel #k of UE #n so as to buffer the data of the PDCP layer to be transmitted in downlink.

In the above example, the RLC BUf2721$_{n,k}$ buffers the data of the RLC layer. However alternatively, the RLC BUf2721$_{n,k}$ may buffer the data of the RLC layer and the PDCP layer as well.

Namely, the data transmitted via the downlink shared channel (DL-SCH) in the sub-frame are extracted by the RLC BUf2721$_{n,k}$ in the RLC/PDCP processing section 272, HARQ-processed in the HARQ$_n$ control section 270, and transmitted to the layer 1 processing section 252 via the UE selection section 258 and the TFR Selection section 268, so that the transmission processes such as coding, IFFT, and the like in the layer 1 processing section 252.

The present invention is described above by referring to specific embodiments. However, it should not be understood that the descriptions and figures constituting the parts of the disclosure limit the present invention. Based on the disclosure, a person skilled in the art may think of examples of various modifications, transformations, alterations, operational technique, and the like.

For example, in the above embodiments, a system in which Evolved UTRA and UTRAN (a.k.a. Long term Evolution or Super 3G) is applied is described. However, a mobile station (user equipment (UE) terminal), a base station apparatus, a mobile communication system, and communication control method according to an embodiment of the present invention may also be applied to any other system capable of communicating using the shared channel.

Namely obviously, the present invention includes various embodiments not described herein. Therefore, a technical scope of the present invention is defined only by the invention specifying matters according to adequate scopes of the claims based on the descriptions.

For explanation purpose, plural embodiments are separately described. However, such separation of the embodiments is not essential to the present invention, and two or more embodiments may be used on an as needed basis.

Further, for explanation purpose, specific values are used to promote understanding the present invention. However, unless otherwise described, the values are for illustrative purpose only and any other suitable values may be used.

The present invention is described above by referring to specific embodiments. However, a person skilled in the art may understand that the above embodiments are described for illustrative purpose only and may think of examples of various modifications, transformations, alterations, changes, and the like. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application Nos. 2007-052115 filed on Mar. 1, 2007, 2007-161938 filed on Jun. 19, 2007, and 2007-329024 filed on Dec. 20, 2007, the entire contents of which Japanese Patent Application Nos. 2007-052115, 2007-161938, and 2007-329024 are hereby incorporated herein by reference.

The invention claimed is:

1. A base station apparatus capable of communicating with a user equipment terminal using a downlink shared channel, the base station apparatus comprising:
a resource allocation unit configured to allocate radio resources using a first resource allocation method for dynamically allocating the radio resources and a second resource allocation method for allocating the radio resources at a constant period, wherein
when a size of data to be transmitted is equal to or greater than a threshold value, the resource allocation unit allocates the radio resources using the first resource allocation method,
when the size of the data to be transmitted is less than the threshold value, the resource allocation unit allocates the radio resources using the second resource allocation method, and
when the size of the data to be transmitted is equal to or greater than a threshold value, the resource allocation unit allocates radio resources reserved as radio resources to be allocated using the second resource allocation method as radio resources to be allocated using the first resource allocation method.

2. A base station apparatus capable of communicating with a user equipment terminal using a downlink shared channel, the base station apparatus comprising:
a resource allocation unit configured to allocate radio resources using a first resource allocation method for dynamically allocating the radio resources and a second resource allocation method for allocating the radio resources at a constant period, wherein
in a case where a size of data to be transmitted is equal to or greater than a predetermined threshold value at a timing when resource allocation using the second resource allocation method is not performed or in a case where there are data to be retransmitted at a timing when resource allocation using the second resource allocation method is not performed, the resource allocation unit assumes that there are data to be transmitted using the first resource allocation method, and
in a case where the size of the data to be transmitted is less than the predetermined threshold value and there are no retransmittable data, the resource allocation unit assumes that there are no data to be transmitted using the first resource allocation method.

3. The base station apparatus according to claim 1, wherein when there is no data to be transmitted using the second resource allocation method, the resource allocation unit allocates the radio resources reserved as radio resources to be allocated using the second resource allocation method as the radio resources to be allocated using the first resource allocation method.

4. A communication control method of allocating radio resources using a first resource allocation method for dynamically allocating the radio resources and a second resource allocation method for allocating the radio resources at a constant period, the method being used in a base station apparatus capable of communicating with a user equipment terminal using a downlink shared channel, the method comprising:
a first radio resource allocating step of, when a size of data to be transmitted is equal to or greater than a threshold value, allocating the radio resources using the first resource allocation method;
a second radio resource allocating step of, when the size of the data to be transmitted is less than the threshold value, allocating the radio resources using the second resource allocation method; and
a third radio resource allocating step of, when the size of the data to be transmitted is equal to or greater than a threshold value, allocating radio resources reserved as radio resources to be allocated using the second resource allocation method as radio resources to be allocated using the first resource allocation method.

* * * * *